US012686837B2

(12) United States Patent
Knight et al.

(10) Patent No.: US 12,686,837 B2
(45) Date of Patent: Jul. 21, 2026

(54) WATER-SOLUBLE UNIT DOSE ARTICLE INCLUDING WATER-SOLUBLE CORE CONSTRUCTION

(71) Applicant: MONOSOL, LLC, Portage, IN (US)

(72) Inventors: Jonathon D. Knight, Portage, IN (US); Victoria Bridewell, Portage, IN (US); Ramya Ramaswamy, Portage, IN (US); Ryan Slopek, Portage, IN (US)

(73) Assignee: MONOSOL, LLC, Portage, IN (US)

( * ) Notice: Subject to any disclaimer, the term of this patent is extended or adjusted under 35 U.S.C. 154(b) by 1113 days.

(21) Appl. No.: 17/737,913

(22) Filed: May 5, 2022

(65) Prior Publication Data

US 2022/0356418 A1 Nov. 10, 2022

Related U.S. Application Data

(60) Provisional application No. 63/185,592, filed on May 7, 2021.

(51) Int. Cl.

*C11D 17/04* (2006.01)
*C11D 3/37* (2006.01)

(52) U.S. Cl.

CPC .......... *C11D 17/043* (2013.01); *C11D 3/3753* (2013.01); *C11D 3/3757* (2013.01); *C11D 3/378* (2013.01); *C11D 17/044* (2013.01)

(58) Field of Classification Search

None
See application file for complete search history.

(56) References Cited

U.S. PATENT DOCUMENTS

| | | | |
|---|---|---|---|
| 2,356,168 | A | 8/1944 | Mabley |
| 2,648,635 | A | 8/1953 | Jacques et al. |
| 3,468,096 | A | 9/1969 | Franz |
| 3,632,039 | A | 1/1972 | Gayle |
| 4,082,678 | A | 4/1978 | Pracht et al. |
| 4,108,600 | A | 8/1978 | Wong |
| 4,188,304 | A | 2/1980 | Clarke et al. |
| 4,348,293 | A | 9/1982 | Clarke et al. |
| 4,391,725 | A | 7/1983 | Bossu |
| 4,534,981 | A | 8/1985 | Zabotto et al. |

(Continued)

FOREIGN PATENT DOCUMENTS

| | | | |
|---|---|---|---|
| CA | 3037359 | A1 | 5/2018 |
| CN | 1365992 | A | 8/2002 |

(Continued)

OTHER PUBLICATIONS

European Chemicals Agency ("ECHA") Annex XV Restriction Report, "Microplastics," Version No. 1, Jan. 11, 2019.

(Continued)

*Primary Examiner* — Lorna M Douyon
(74) *Attorney, Agent, or Firm* — Benesch Friedlander Coplan & Aronoff LLP

(57) ABSTRACT

A single unit dose article includes a water-soluble core substrate comprising a water-soluble resin. The water-soluble core substrate contains a carrier solvent with an active cleaning formulation, wherein upon contact of the carrier solvent with the water-soluble core substrate, the water-soluble core substrate exhibits shrinkage or swelling. Also disclosed are methods of making the single unit dose article.

10 Claims, 18 Drawing Sheets

(56) References Cited

U.S. PATENT DOCUMENTS

| | | | |
|---|---|---|---|
| 4,648,510 | A | 3/1987 | Kuenzel |
| 4,714,643 | A | 12/1987 | Kuenzel |
| 4,745,021 | A | 5/1988 | Ping, III et al. |
| 4,765,916 | A | 8/1988 | Ogar, Jr. et al. |
| 4,875,575 | A | 10/1989 | Snyder et al. |
| 4,876,023 | A | 10/1989 | Dickenson et al. |
| 4,886,615 | A | 12/1989 | Dehan |
| 4,925,586 | A | 5/1990 | Baker et al. |
| 5,002,789 | A | 3/1991 | Graf et al. |
| 5,015,513 | A | 5/1991 | Newbold et al. |
| 5,017,485 | A | 5/1991 | Bringer-Meyer et al. |
| 5,053,270 | A | 10/1991 | Mack |
| 5,110,640 | A | 5/1992 | Mack |
| 5,112,688 | A | 5/1992 | Michael |
| 5,116,524 | A | 5/1992 | Carduck et al. |
| 5,145,842 | A | 9/1992 | Driedger et al. |
| 5,152,809 | A | 10/1992 | Mattesky |
| 5,190,869 | A | 3/1993 | Rehr et al. |
| 5,470,653 | A | 11/1995 | Honeycutt et al. |
| 5,609,431 | A | 3/1997 | Carroll |
| 5,646,206 | A | 7/1997 | Coffin et al. |
| 5,780,418 | A | 7/1998 | Niinaka et al. |
| 5,863,887 | A | 1/1999 | Gillette |
| 6,040,286 | A | 3/2000 | Huff |
| 6,184,340 | B1 | 2/2001 | Smith et al. |
| 6,458,754 | B1 | 10/2002 | Velaquez et al. |
| 6,525,014 | B1 | 2/2003 | Gorlin et al. |
| 6,649,584 | B2 | 11/2003 | Wisniewski et al. |
| 6,652,869 | B2 | 11/2003 | Suazon et al. |
| 6,699,826 | B1 | 3/2004 | Saijo et al. |
| 6,706,775 | B2 | 3/2004 | Hermann et al. |
| 6,720,301 | B2 | 4/2004 | Gorlin et al. |
| 6,818,606 | B1 | 11/2004 | Hanada et al. |
| 6,844,302 | B1 | 1/2005 | Boden et al. |
| 7,022,656 | B2 | 4/2006 | Verrall et al. |
| 7,214,722 | B2 | 5/2007 | Kinloch et al. |
| 7,226,899 | B2 | 6/2007 | Cole et al. |
| 7,351,560 | B2 | 4/2008 | Park et al. |
| 7,378,360 | B2 | 5/2008 | Clark et al. |
| 7,402,415 | B2 | 7/2008 | Nair et al. |
| 7,507,698 | B2 | 3/2009 | Franzolin et al. |
| 7,528,099 | B2 | 5/2009 | Wahl et al. |
| 7,531,185 | B2 | 5/2009 | Chen et al. |
| 7,754,943 | B2 | 7/2010 | Brumbley et al. |
| 8,061,919 | B2 | 11/2011 | Alarcon et al. |
| 8,197,830 | B2 | 6/2012 | Helfman et al. |
| 8,309,505 | B2 | 11/2012 | Fossum et al. |
| RE43,859 | E | 12/2012 | Karim et al. |
| 8,357,129 | B2 | 1/2013 | Graham et al. |
| 8,404,753 | B2 | 3/2013 | Hanlon, Jr. |
| 8,440,859 | B2 | 5/2013 | Dubois |
| 8,524,263 | B2 | 9/2013 | Suzuki et al. |
| 8,551,933 | B2 | 10/2013 | Parrish et al. |
| 8,628,844 | B2 | 1/2014 | Catalfamo |
| 8,673,447 | B2 | 3/2014 | Catalfamo |
| 8,691,257 | B2 | 4/2014 | Hartman et al. |
| 8,764,904 | B2 | 7/2014 | Bailey et al. |
| 8,785,361 | B2 | 7/2014 | Sivik et al. |
| 8,809,250 | B2 | 8/2014 | Parrish et al. |
| 8,980,816 | B2 | 3/2015 | Dreher et al. |
| 9,074,305 | B2 | 7/2015 | Glenn, Jr. et al. |
| 9,139,802 | B2 | 9/2015 | Weisman et al. |
| 9,163,205 | B2 | 10/2015 | Sivik et al. |
| 9,174,411 | B2 | 11/2015 | Ochiai et al. |
| 9,175,250 | B2 | 11/2015 | Sivik et al. |
| 9,259,506 | B2 | 2/2016 | Schmitz et al. |
| 9,271,920 | B2 | 3/2016 | Wurm et al. |
| 9,394,092 | B2 | 7/2016 | Lee et al. |
| 9,421,153 | B2 | 8/2016 | Sivik et al. |
| 9,458,573 | B2 | 10/2016 | Barnholtz et al. |
| 9,480,628 | B2 | 11/2016 | Sivik et al. |
| 9,506,022 | B2 | 11/2016 | Ronco et al. |
| 9,545,364 | B2 | 1/2017 | Glenn, Jr. et al. |
| 9,624,458 | B2 | 4/2017 | Weisman et al. |
| 9,719,213 | B2 | 8/2017 | Miller et al. |
| 9,758,643 | B2 | 9/2017 | Bayer et al. |
| 9,758,930 | B2 | 9/2017 | Cabell et al. |
| 9,775,917 | B2 | 10/2017 | Vile et al. |
| 9,827,173 | B2 | 11/2017 | Lynch et al. |
| 9,861,558 | B2 | 1/2018 | Lynch et al. |
| 9,861,559 | B2 | 1/2018 | Lynch et al. |
| 9,867,762 | B2 | 1/2018 | Lynch et al. |
| 9,877,899 | B2 | 1/2018 | Lynch et al. |
| 9,937,111 | B2 | 4/2018 | Lynch et al. |
| 10,045,915 | B2 | 8/2018 | Glenn, Jr. et al. |
| 10,092,673 | B2 | 10/2018 | Schmitz et al. |
| 10,143,292 | B2 | 12/2018 | Kim et al. |
| 10,294,586 | B2 | 5/2019 | Sivik et al. |
| 10,344,138 | B2 | 7/2019 | Johnson et al. |
| 10,349,800 | B2 | 7/2019 | Roe et al. |
| 10,351,505 | B2 | 7/2019 | Souvaliotis et al. |
| 10,351,808 | B2 | 7/2019 | Peltz et al. |
| 10,376,125 | B2 | 8/2019 | Dreher et al. |
| 10,470,983 | B2 | 11/2019 | Seo et al. |
| 10,477,947 | B2 | 11/2019 | Hasegawa |
| 10,487,066 | B2 | 11/2019 | Arai et al. |
| 10,494,767 | B2 | 12/2019 | Weisman et al. |
| 10,526,570 | B2 | 1/2020 | Dreher et al. |
| 10,549,006 | B2 | 2/2020 | Wetterer et al. |
| 10,603,230 | B2 | 3/2020 | Tong et al. |
| 10,646,413 | B2 | 5/2020 | Sivik et al. |
| 10,676,764 | B2 | 6/2020 | Aguila et al. |
| 10,683,618 | B2 | 6/2020 | Pratt et al. |
| 10,694,916 | B2 | 6/2020 | Gonzales et al. |
| 10,694,917 | B2 | 6/2020 | Dreher et al. |
| 10,704,013 | B2 | 7/2020 | Cho et al. |
| 10,717,839 | B2 | 7/2020 | Mao et al. |
| 10,717,954 | B2 | 7/2020 | Astete Boettcher |
| 10,743,638 | B2 | 8/2020 | Kim et al. |
| 10,752,869 | B2 | 8/2020 | Tan et al. |
| 10,759,727 | B2 | 9/2020 | Allen et al. |
| 10,786,980 | B2 | 9/2020 | Sekido et al. |
| 10,792,229 | B2 | 10/2020 | Pratt et al. |
| 10,842,242 | B2 | 11/2020 | Alary et al. |
| 10,857,756 | B2 | 12/2020 | Pratt et al. |
| 10,893,739 | B2 | 1/2021 | Hasegawa |
| 10,927,331 | B2 | 2/2021 | Sutherland, III et al. |
| 10,954,372 | B2 | 3/2021 | Cui et al. |
| 2002/0055449 | A1 | 5/2002 | Porta et al. |
| 2002/0093116 | A1 | 7/2002 | Hsieh |
| 2002/0150708 | A1 | 10/2002 | Dyter et al. |
| 2002/0187181 | A1 | 12/2002 | Godbey et al. |
| 2003/0008085 | A1 | 1/2003 | Davenet et al. |
| 2003/0134555 | A1 | 7/2003 | Krok et al. |
| 2003/0213500 | A1 | 11/2003 | Mangin et al. |
| 2003/0216098 | A1 | 11/2003 | Carlyle et al. |
| 2004/0147425 | A1 | 7/2004 | Castro et al. |
| 2005/0160543 | A1 | 7/2005 | Catalfamo et al. |
| 2005/0192201 | A1 | 9/2005 | Cornelio et al. |
| 2006/0052263 | A1 | 3/2006 | Roreger et al. |
| 2008/0069845 | A1 | 3/2008 | Makihara et al. |
| 2009/0241242 | A1 | 10/2009 | Beatty et al. |
| 2009/0287034 | A1 | 11/2009 | Siggelkow |
| 2010/0018641 | A1 | 1/2010 | Branham et al. |
| 2010/0144892 | A1 | 6/2010 | Wu et al. |
| 2013/0171421 | A1 | 7/2013 | Weisman et al. |
| 2013/0280310 | A1 | 10/2013 | Suzuki et al. |
| 2014/0352031 | A1 | 12/2014 | Choi et al. |
| 2014/0364365 | A1 | 12/2014 | Wu et al. |
| 2014/0366919 | A1 | 12/2014 | Cabirol et al. |
| 2015/0071572 | A1* | 3/2015 | Dreher .................. B65D 29/00 383/105 |
| 2015/0272855 | A1 | 10/2015 | Kim |
| 2015/0297494 | A1 | 10/2015 | Mao et al. |
| 2015/0313805 | A1 | 11/2015 | Lynch et al. |
| 2016/0101026 | A1 | 4/2016 | Pratt et al. |
| 2016/0101204 | A1 | 4/2016 | Lynch et al. |
| 2016/0258083 | A1 | 9/2016 | Weisman et al. |
| 2016/0287493 | A1 | 10/2016 | Agarwal et al. |
| 2016/0298063 | A1 | 10/2016 | Behr et al. |
| 2017/0298216 | A1* | 10/2017 | Labeque .................... C08J 5/18 |
| 2018/0098679 | A1 | 4/2018 | Gonzales |
| 2018/0186117 | A1 | 7/2018 | Seo et al. |
| 2018/0216050 | A1 | 8/2018 | Denome et al. |

(56) References Cited

U.S. PATENT DOCUMENTS

| | | | |
|---|---|---|---|
| 2018/0216051 A1 | 8/2018 | Thomas et al. | |
| 2018/0216052 A1 | 8/2018 | Denome et al. | |
| 2018/0216053 A1 | 8/2018 | Denome et al. | |
| 2018/0216285 A1 | 8/2018 | Pratt et al. | |
| 2018/0216286 A1 | 8/2018 | Glassmeyer et al. | |
| 2018/0216287 A1 | 8/2018 | Weisman et al. | |
| 2018/0216288 A1 | 8/2018 | Weisman et al. | |
| 2018/0295971 A1 | 10/2018 | Seo et al. | |
| 2018/0333339 A1 | 11/2018 | Hamersky et al. | |
| 2019/0142139 A1 | 5/2019 | Hasegawa | |
| 2019/0201298 A1 | 7/2019 | Reynoso | |
| 2019/0232604 A1 | 8/2019 | Pratt et al. | |
| 2019/0233780 A1 | 8/2019 | Huang et al. | |
| 2019/0233781 A1 | 8/2019 | Huang et al. | |
| 2019/0233782 A1 | 8/2019 | Sivik et al. | |
| 2019/0233783 A1 | 8/2019 | Sivik et al. | |
| 2019/0233784 A1 | 8/2019 | Sivik et al. | |
| 2019/0233785 A1 | 8/2019 | Sivik et al. | |
| 2019/0233970 A1 | 8/2019 | Reed et al. | |
| 2019/0233974 A1 | 8/2019 | Reed et al. | |
| 2019/0263575 A1 | 8/2019 | Jagannath et al. | |
| 2019/0282457 A1 | 9/2019 | Pratt et al. | |
| 2020/0032178 A1 | 1/2020 | Denome et al. | |
| 2020/0032179 A1 | 1/2020 | Sivik et al. | |
| 2020/0071644 A1 | 3/2020 | Sivik et al. | |
| 2020/0086099 A1 | 3/2020 | Seo et al. | |
| 2020/0093710 A1 | 3/2020 | Hamersky et al. | |
| 2020/0093711 A1 | 3/2020 | Hamersky et al. | |
| 2020/0170381 A1 | 6/2020 | Park et al. | |
| 2020/0190433 A1 | 6/2020 | Nyangiro et al. | |
| 2020/0190446 A1 | 6/2020 | Sivik et al. | |
| 2020/0270549 A1 | 8/2020 | Saquing | |
| 2020/0270772 A1 | 8/2020 | Saquing | |
| 2020/0277555 A1 | 9/2020 | Cho et al. | |
| 2020/0299622 A1 | 9/2020 | Sivik et al. | |
| 2020/0299623 A1 | 9/2020 | Sivik et al. | |
| 2020/0299878 A1 | 9/2020 | Beck et al. | |
| 2021/0038485 A1 | 2/2021 | Robinson et al. | |
| 2021/0046726 A1 | 2/2021 | Pratt et al. | |
| 2021/0054313 A1 | 2/2021 | Robillard et al. | |
| 2021/0115389 A1 | 4/2021 | Rosin | |
| 2022/0228305 A1* | 7/2022 | Bridewell | D04H 1/54 |
| 2023/0242848 A1* | 8/2023 | Matulla | C11D 17/044 510/296 |

FOREIGN PATENT DOCUMENTS

| | | | |
|---|---|---|---|
| CN | 1276135 | C | 9/2006 |
| CN | 101928532 | B | 12/2011 |
| CN | 102827560 | A | 12/2012 |
| CN | 102344580 | B | 1/2013 |
| CN | 101798265 | B | 9/2013 |
| CN | 105154477 | A | 12/2015 |
| CN | 104233515 | B | 4/2016 |
| CN | 105462124 | A | 4/2016 |
| CN | 107282136 | A | 10/2017 |
| CN | 107383726 | A | 11/2017 |
| CN | 108975457 | A | 12/2018 |
| CN | 109265737 | A | 1/2019 |
| CN | 109294138 | A | 2/2019 |
| CN | 109503317 | A | 3/2019 |
| CN | 109776259 | A | 5/2019 |
| CN | 109879996 | A | 6/2019 |
| CN | 110356065 | A | 10/2019 |
| CN | 110437501 | A | 11/2019 |
| CN | 110862298 | A | 3/2020 |
| CN | 110922703 | A | 3/2020 |
| CN | 107286547 | B | 5/2020 |
| CN | 111087729 | A | 5/2020 |
| CN | 111302893 | A | 6/2020 |
| CN | 111303571 | A | 6/2020 |
| CN | 112063084 | A | 12/2020 |
| DE | 3017246 | A1 | 11/1981 |
| DE | 29809749 | U1 | 10/1998 |
| DE | 202015003416 | U1 | 6/2015 |
| DE | 102018219413 | A1 | 5/2020 |
| DE | 102018219415 | A1 | 5/2020 |
| EP | 0011500 | A1 | 5/1980 |
| EP | 0011501 | A1 | 5/1980 |
| EP | 0011968 | A1 | 6/1980 |
| EP | 0118191 | B1 | 7/1987 |
| EP | 1375377 | B1 | 10/2005 |
| EP | 1560911 | B1 | 9/2006 |
| EP | 1860177 | A1 | 11/2007 |
| EP | 1221927 | B1 | 7/2010 |
| EP | 1795175 | B1 | 4/2012 |
| EP | 2784148 | A1 | 10/2014 |
| EP | 1676559 | B1 | 4/2016 |
| EP | 3094192 | A1 | 11/2016 |
| EP | 2995321 | B1 | 7/2017 |
| EP | 2800802 | B1 | 2/2018 |
| EP | 2589692 | B1 | 7/2018 |
| EP | 3694981 | A1 | 8/2020 |
| EP | 3725403 | A1 | 10/2020 |
| EP | 2800831 | B1 | 12/2020 |
| EP | 3743498 | A1 | 12/2020 |
| EP | 3743499 | A1 | 12/2020 |
| EP | 3743500 | A1 | 12/2020 |
| EP | 3743503 | A1 | 12/2020 |
| EP | 3743548 | A1 | 12/2020 |
| EP | 3572572 | B1 | 1/2021 |
| GB | 1003154 | A | 9/1965 |
| GB | 1298454 | A | 12/1972 |
| GB | 1522759 | A | 8/1978 |
| GB | 2073702 | B | 9/1983 |
| GB | 2283723 | B | 7/1997 |
| IN | 106543610 | A | 3/2017 |
| JP | 106172584 | A | 6/1994 |
| JP | 2002308931 | A | 10/2002 |
| JP | 2003181830 | A | 7/2003 |
| JP | 3957267 | B2 | 8/2007 |
| JP | 2007313892 | A | 12/2007 |
| JP | 4194068 | B2 | 12/2008 |
| JP | 2013112669 | A | 6/2013 |
| JP | 2020090467 | A | 6/2020 |
| KR | 20040023145 | A | 3/2004 |
| KR | 20050034654 | A | 4/2005 |
| KR | 100665090 | B1 | 1/2007 |
| KR | 20090100076 | A | 9/2009 |
| KR | 100970332 | B1 | 7/2010 |
| KR | 101732366 | B1 | 5/2017 |
| RO | 130509 | A2 | 8/2015 |
| SU | 1235881 | A1 | 6/1986 |
| WO | 0101816 | A1 | 1/2001 |
| WO | 02096370 | A1 | 12/2002 |
| WO | 03044152 | A1 | 5/2003 |
| WO | 03044155 | A1 | 5/2003 |
| WO | 03054134 | A1 | 7/2003 |
| WO | 2007093558 | A2 | 8/2007 |
| WO | 2012078021 | A1 | 6/2012 |
| WO | 2013060580 | A1 | 5/2013 |
| WO | 2017096354 | A1 | 6/2017 |
| WO | 2017096359 | A1 | 6/2017 |
| WO | 2018140472 | A1 | 8/2018 |
| WO | 2018169171 | A1 | 9/2018 |
| WO | 2019108142 | A2 | 6/2019 |
| WO | 2020072216 | A1 | 4/2020 |
| WO | 2020082510 | A1 | 4/2020 |
| WO | 2020096404 | A1 | 5/2020 |
| WO | 2020098008 | A1 | 5/2020 |
| WO | 2020147000 | A1 | 7/2020 |
| WO | 2020147211 | A1 | 7/2020 |
| WO | 2020150248 | A1 | 7/2020 |
| WO | 2020210893 | A1 | 10/2020 |
| WO | 2020210894 | A1 | 10/2020 |
| WO | 2020219930 | A1 | 10/2020 |
| WO | 2020223335 | A1 | 11/2020 |
| WO | 2020264063 | A1 | 12/2020 |
| WO | 2020264573 | A1 | 12/2020 |
| WO | 2021002820 | A1 | 1/2021 |
| WO | 2021022306 | A1 | 2/2021 |
| WO | 2021037100 | A1 | 3/2021 |
| WO | 2021081031 | A1 | 4/2021 |

(56) References Cited

FOREIGN PATENT DOCUMENTS

OTHER PUBLICATIONS

Oct. 10, 2022 International Search Report and Written Opinion of the International Searching Authority, or the Declaration issued by the International Searching Authority for PCT International Application No. PCT/US2022/028211.

* cited by examiner

WATER-SOLUBLE UNIT DOSE ARTICLE INCLUDING WATER-SOLUBLE CORE CONSTRUCTION

CROSS-REFERENCE TO RELATED APPLICATIONS

This application claims the benefit of U.S. Provisional Application No. 63/185,592, filed May 7, 2021, which application is expressly incorporated by reference herein in its entirety.

FIELD

The present disclosure relates generally to water-soluble unit dose articles including water-soluble core constructions. More particularly, the disclosure relates to water-soluble unit dose articles configured to contain a cleaning formulation.

BACKGROUND

Water-soluble packaging materials are commonly used to simplify dispersing, pouring, dissolving, and dosing of a material to be delivered. Traditional packaging materials include water-soluble films and pouches made from the water-soluble films are commonly used to package formulations, such as laundry detergents, dish detergents, or personal care formulations. A consumer can directly add the pouched formulation to water. Advantageously, this provides for accurate dosing while eliminating the need for the consumer to measure the formulation. However, some currently marketed pouches made of water-soluble polymeric films, for example, have an unpleasant rubbery or plastic-like feel when handled by the consumer. Additionally, bulk or concentrated detergents are not always stable and may contain relatively incompatible ingredients which destabilize when contacting other ingredients. For example, enzymes destabilize in various solvents, which can affect the properties of the film, for example, the mechanical properties of the film may deteriorate over time. As a result, traditional pouches, such as detergent pouches, include a limited number of cavities or compartments. Further, the construction of a traditional water-soluble, film-based unit dose is complicated and expensive, requiring the creation of the film, the detergent, and the pod separately.

Thus, there exists a need in the art for unit dose articles having a construction that is easily manufacturable and provides for chemical stability during shipping and storage, for example, but is pleasant to handle and dissolves quickly without leaving undesired residue during intended use, e.g., when the unit dose article is placed in a washing machine.

DETAILED DESCRIPTION

Figure 1:
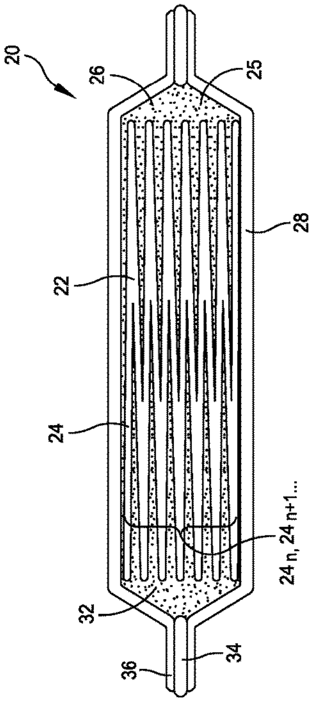
FIGS. 1-14 are sectional schematic views of example single unit dose (SUD) articles containing an active cleaning formulation, according to example embodiments.

In example embodiments described herein, single unit dose (SUD) articles include one or more core substrates, e.g., one or more open or closed foam core substrates or one or more nonwoven web core substrates, having precision dosing to deliver cleaning agents for washing clothes, for example. In example embodiments, the substrate includes a water-soluble polymer, such as polyvinyl alcohol (PVOH) based polymers and/or starch derivatives, for example, or blends thereof with otherwise water dispersible polymers that have a high degree of biodegradation activity or can be composted or recycled. In example embodiments, the core substrate(s) are contained within a water-soluble material, such as a water-soluble nonwoven material, a water-soluble foam material, and/or a water-soluble film material. As a result, the consumer simply places the SUD article, which includes the activated substrate pre-dosed with one or more active cleaning formulations for chemical and mechanical cleaning action, that will disperse, dissolve, and/or biodegrade during the washing cycle without leaving undesired residue.

The SUD article and, more specifically, in example embodiments, the water-soluble core substrate, is configured to contain a carrier solvent with one or more active cleaning formulations, such as a laundry detergent formulation. In example embodiments, the carrier solvent with the active cleaning formulation is disposed on or coats one or more surfaces of the water-soluble core substrate or is embedded in and/or adhered to the water-soluble core substrate. The water-soluble core substrate may include a single layer, for example, a single layer nonwoven core substrate or foam core substrate, or may include a plurality of layers, for example, a sheet of nonwoven core substrate or foam core substrate folded in a serpentine arrangement or plied to form layers with the carrier solvent with the active cleaning formulation disposed between adjacent layers of the water-soluble nonwoven core substrate, for example. As an example, the active cleaning formulation may include, without limitation, a laundry detergent, a soap, a fabric softener, a bleaching agent, a laundry booster, a stain remover, an optical brightener, or a water softener. Other examples include a dish detergent, soap or cleaner, a shampoo, a conditioner, a body wash, a face wash, a skin lotion, a skin treatment, a body oil, fragrance, a hair treatment, a bath salt, an essential oil, a bath bomb, or an enzyme. In certain example embodiments, the water-soluble core substrate is enclosed by a water-soluble nonwoven material, a water-soluble foam material, and/or a water-soluble film material. Further, the carrier solvent may include, without limitations, any suitable polar solvent, water, polyols such as glycerol, DPG, or any combination thereof. In example embodiments, the water-soluble core substrate includes a plurality of fibers including a water-soluble resin. Upon contact of a suitable amount of the carrier solvent, e.g., a saturation amount, with at least one fiber of the plurality of fibers, the at least one fiber exhibits a degree of shrinkage of 0.5% to 65%. The example process as disclosed herein to incorporate the active cleaning formulation in the water-soluble core substrate facilitates preservation of active agents, such as enzymes, and improves the overall performance of the SUD articles.

As used herein and unless specified otherwise, the term "water-dispersible" refers to any nonwoven substrate (or nonwoven web), foam substrate, film, or laminate wherein upon submersion in water at a specified temperature, the nonwoven substrate, foam substrate, film, or laminate physically disassociates into smaller constituent pieces. The smaller pieces may or may not be visible to the naked eye, may or may not remain suspended in the water, and may or may not ultimately dissolve. In example embodiments wherein a dispersion temperature is not specified, the nonwoven substrate, foam substrate, film, or laminate will disintegrate in 300 seconds or less at a temperature of about 100° C. or less, according to MSTM-205. For example, the disintegration time optionally can be 200 seconds or less, 100 seconds or less, 60 seconds or less, or 30 seconds or less at a temperature of about 80° C., about 70° C., about 60° C., about 50° C., about 40° C., about 20° C., or about 10° C., according to MSTM-205. For example, such dispersion parameters can be characteristic of a nonwoven substrate, foam substrate, film, or laminate structure having a thickness of 6 mil (about 152 μm).

As used herein and unless specified otherwise, the term "water-soluble" refers to any nonwoven web, foam, film, or laminate having a dissolution time of 300 seconds or less at a specified temperature as determined according to MSTM-205 as set forth herein. For example, the dissolution time of the nonwoven web, foam, film, or laminate optionally can be 200 seconds or less, 100 seconds or less, 60 seconds or less, or 30 seconds or less at a temperature of about 80° C., about 70° C., about 60° C., about 50° C., about 40° C., about 20° C., or about 10° C. according to MSTM-205. In embodiments wherein the dissolution temperature is not specified, the water-soluble nonwoven web, foam, film, or laminate has a dissolution time of 300 seconds or less at a temperature no greater than about 80° C. In example embodiments, "water-soluble film" means that at a thickness of 1.5 mil, the film dissolves in 300 seconds or less at a temperature no greater than 80° C. according to MSTM-205. For example, a 1.5 mil (about 38 μm) thick water-soluble film can have a dissolution time of 300 seconds or less, 200 seconds or less, 100 seconds or less, 60 seconds or less, or 30 seconds or less at a temperature of about 70° C., about 60° C., about 50° C., about 40° C., about 30° C., about 20° C., or about 10° C. according to MSTM-205.

As used herein and unless specified otherwise, the term "cold water-soluble" refers to any water-soluble nonwoven web, foam, film, or laminate having a dissolution time of 300 seconds or less at a temperature in a range of about 10° C. to about 20° C. as determined according to MSTM-205. For example, the dissolution time of the nonwoven web, foam, film, or laminate optionally can be 200 seconds or less, 100 seconds or less, 60 seconds or less, or 30 seconds at a temperature in a range of about 10° C. to about 20° C. according to MSTM-205. In embodiments, "cold water-soluble film" means that at a thickness of 1.5 mil (about 38 μm), the film dissolves in 300 seconds or less at a temperature not greater than 20° C. according to MSTM-205. For example, a 1.5 mil (about 38 μm) thick water-soluble film can have a dissolution time of 300 seconds or less, 200 seconds or less, 100 seconds or less, 60 seconds or less, or 30 seconds or less at a temperature of about 20° C. or about 10° C. according to MSTM-205.

As used herein and unless specified otherwise, the term "hot water-soluble" refers to any water-soluble nonwoven web, foam, film, or laminate having a dissolution time of 300 seconds or less at a temperature greater than about 20° C., for example in a range of about 21° C. to about 80° C., as determined according to MSTM-205. For example, the dissolution time of the nonwoven web, foam, film, or laminate optionally can be 200 seconds or less, 100 seconds or less, 60 seconds or less, or 30 seconds at a temperature greater than about 20° C. according to MSTM-205, for example, in a range of about 21° C. to about 80° C., about 25° C. to about 80° C., about 25° C. to about 60° C., about 30° C. to about 60° C., about 25° C. to about 45° C., about 30° C. to about 45° C., or about 25° C. to about 43° C., about 30° C. to about 43° C., about 25° C. to about 40° C., or about 30° C. to about 40° C. In example embodiments, "hot water-soluble film" means that at a thickness of 1.5 mil (about 38 μm), the film dissolves in 300 seconds or less at a temperature no less than about 21° C. according to MSTM-205. For example, a 1.5 mil (about 38 μm) thick water-soluble film can have a dissolution time of 300 seconds or less, 200 seconds or less, 100 seconds or less, 60 seconds or less, or 30 seconds or less at a temperature of about 80° C., 70° C., about 60° C., about 50° C., about 40° C., about 30° C., about 25° C., or about 21° C. according to MSTM-205. In example embodiments, a hot water-soluble substrate, such as a "hot water-soluble nonwoven substrate" or a "hot water-soluble nonwoven web," remains stable, e.g., does not dissolve, when contacted with water having a temperature less than its hot water-soluble temperature but is soluble, e.g., dissolves, when contacted with water having a temperature equal to its hot water-soluble temperature for a suitable dissolution time, e.g., not greater than 300 seconds.

As used herein and unless specified otherwise, the term "nonwoven web" refers to a web or sheet comprising, consisting of, or consisting essentially of fibers arranged (e.g., by a carding process) and bonded to each other. Thus, the term "nonwoven web" can be considered short hand for nonwoven fiber-based webs. Further, as used herein, "nonwoven web" includes any structure including a nonwoven web or sheet, including, for example, a nonwoven web or sheet having a film laminated to a surface thereof. Methods of preparing nonwoven webs from fibers are well known in the art, for example, as described in Nonwoven Fabrics Handbook, prepared by Ian Butler, edited by Subhash Batra et al., Printing by Design, 1999, herein incorporated by reference in its entirety. As used herein and unless specified otherwise, the term "film" refers to a continuous film or sheet, e.g., prepared by a casting or extrusion process.

As used herein, a "plurality of fibers" can consist of a sole fiber type or can comprise two or more different fiber types. In example embodiments wherein the plurality of fibers comprise two or more different fiber types, each fiber type can be included in generally any amount, for example, from about 0.5 wt. % to about 99.5 wt. % of the total weight of the plurality of fibers. In embodiments wherein the plurality of fibers consists of a sole fiber type, the plurality of fibers is substantially free of a second or more fiber types. A plurality of fibers is substantially free of a second or more fiber types when the plurality of fibers comprise less than about 0.5 wt. % of the second or more fiber types. In general, the difference between fiber types can be a difference in fiber length to diameter ratio (L/D), tenacity, shape, rigidness, elasticity, solubility, melting point, glass transition temperature ($T_g$), chemical composition, color, or a combination thereof.

As used herein, the terms "packet(s)" and "pouch(es)" should be considered interchangeable. In certain embodiments, the terms "packet(s)" and "pouch(es)," respectively, are used to refer to single unit dose articles including a water-soluble core substrate containing one or more active cleaning formulations. In certain embodiments, the pouches are sealed with an outer water-soluble material to enclose and contain the water-soluble core substrate containing the one or more active cleaning formulations. The sealed pouches can be made using any suitable method, including such processes and features such as heat sealing, solvent welding or sealing, and/or adhesive sealing (e.g., with use of a water-soluble adhesive).

As used herein, the terms "resin(s)" and "polymer(s)" should be considered interchangeable. In certain embodiments, the terms resin(s) and polymer(s), respectively are used to refer to a polymer optionally combined with one or more additional polymers, and to a single type of polymer, e.g., a resin can comprise more than one polymer.

As used herein and unless specified otherwise, the terms "wt. %" and "wt %" are intended to refer to the composition of the identified element in "dry" (non-water) parts by weight of the entire water-soluble film, for example, including residual moisture in the water-soluble film, or parts by weight of the entire composition, depending on context.

As used herein and unless specified otherwise, the term "PHR" ("phr") is intended to refer to the composition of the identified element in parts per one hundred parts water-soluble polymer resin(s) (whether PVOH or other polymer resins, unless specified otherwise) in the water-soluble film, or a solution used to make the water-soluble film.

As used herein and unless specified otherwise, the term "comprising" means that various components, ingredients, or steps can be conjointly employed in practicing the present disclosure. Accordingly, the term "comprising" encompasses the more restrictive terms "consisting essentially of" and "consisting of" The present compositions can comprise, consist essentially of, or consist of any of the required and optional elements disclosed herein. The disclosure illustratively disclosed herein suitably may be practiced in the absence of any element or step which is not specifically disclosed herein.

When values are expressed as approximations, by use of the antecedent "about," it will be understood that the particular value forms another embodiment. As used herein, "about X" (where X is a numerical value) in example embodiments refers to ±10% (for example, ±5%) of the recited value, inclusive.

The SUD articles, the water-soluble nonwoven materials, the water-soluble foam materials, and the water-soluble film materials, and related methods of making and using the SUD articles, the water-soluble nonwoven materials, the water-soluble foam materials, and the water-soluble film materials are contemplated to include embodiments including any combination of one or more of the additional optional elements, features, and steps further described below, unless stated otherwise.

In example embodiments, the single unit dose article includes a water-soluble core substrate including a water-soluble resin. In example embodiments, the water-soluble core substrate includes one of more of a water-soluble nonwoven core substrate, a water-soluble foam core substrate, or a water-soluble film core substrate, or any suitable combination of a water-soluble nonwoven core substrate, a water-soluble foam core substrate, and/or a water-soluble film core substrate. The water-soluble core substrate contains a carrier solvent with an active cleaning formulation. Upon contact with a suitable amount of the carrier solvent, e.g., a saturation amount, the water-soluble core substrate exhibits a degree of shrinkage of 0.5% to 65%. In example embodiments when the water-soluble core substrate includes a water-soluble nonwoven substrate including a plurality of fibers, the at least one fiber or the core substrate exhibits a degree of shrinkage of 0.5% to 65% upon contact with a suitable amount of the carrier solvent. In example embodiments, when the core substrate is contacted water having a temperature as low as 5° C. to 10° C., the core substrate is dispersible, i.e., disintegrates, to release the active cleaning formulation. In example embodiments, when the core substrate is contacted with water having a temperature greater than 20° C., the water-soluble core substrate is soluble, i.e., dissolves, to release the active cleaning formulation. In example embodiments, the active cleaning formulation is in the form of at least one of a solid, e.g., a powder or a plurality of granules or particles, a gel, a liquid, or a slurry form, or any suitable combination thereof. In certain embodiments, the water-soluble core substrate is saturated with the active cleaning formulation. In other embodiments, the active cleaning formulation is embedded in, coated on, or adhered to the water-soluble core substrate, e.g., the active cleaning formulation is disposed on a surface of the water-soluble core substrate. In example embodiments, the water-soluble core substrate is at least one of coated with the active cleaning formulation or impregnated with the active cleaning formulation. In example embodiments, the active cleaning formulation is present in the water-soluble core substrate, e.g., present in the fiber-forming composition, the foam-forming composition, or the film-forming composition.

In example embodiments, the single unit dose article includes a water-soluble nonwoven material, a water-soluble foam material, or a water-soluble film material, or a composite water-soluble material including a combination thereof, for example, a water-soluble film material laminated to a water-soluble nonwoven material or a water-soluble foam material, enclosing the water-soluble core substrate and/or the active cleaning formulation. In example embodiments, water-soluble outer material defines an interior volume in which the water-soluble core substrate and the active cleaning formulation is contained. A bonding interface is configured to create a seal to enclose the water-soluble core substrate and the active cleaning formulation within the interior volume. In certain embodiments, the water-soluble film is laminated to the water-soluble nonwoven material. For example, the water-soluble film is disposed on a first surface, e.g., an inner surface, of the water-soluble nonwoven material.

Figure 2:
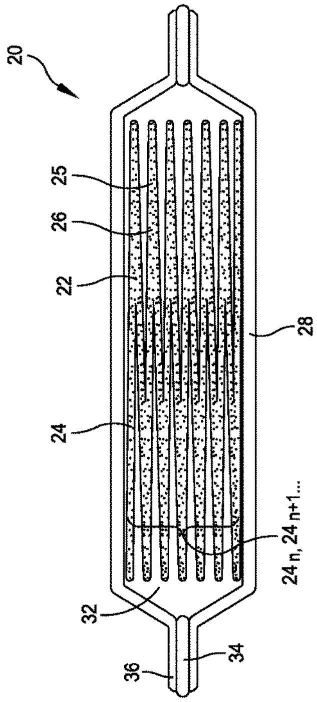
Figure 3:
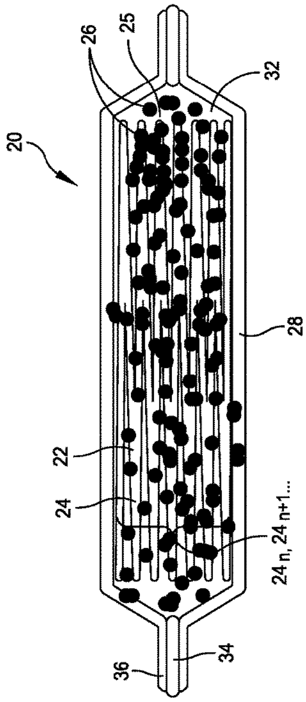

Referring to the Figures and, initially, to FIGS. 1-3, a single unit dose article 20 includes a water-soluble nonwoven substrate 22 comprising a plurality of fibers including a water-soluble resin. In example embodiments, water-soluble nonwoven substrate 22 includes any suitable fiber chemistry including, without limitation, PVOH fibers or PVOH fibers blended with up to 90 wt. % cellulose-type fibers. In alternative embodiments, the nonwoven substrate is made of water-dispersible fibers. In example embodiments, water-soluble nonwoven substrate 22 has a basis weight of 15 gsm (grams per square meter) to 150 gsm, and, more particularly, 30 gsm to 65 gsm, a fiber length of 10.0 millimeters (mm) to 150 mm, and a suitable fiber diameter. The fibers of water-soluble nonwoven substrate 22 may be bonded using any suitable method including, without limitation, heat, thermal, chemical, water, or solution bonding or any suitable bonding method known in the art of nonwoven fiber bonding. As described below and shown in FIGS. 1-3, water-soluble nonwoven substrate 22 may include any suitable number of layers or plies, for example, 1 layer or ply to 50 layers or plies, or more in certain embodiments. Water-soluble nonwoven substrate 22 may be porous or non-porous and cold water-soluble or hot water-soluble. Water-soluble nonwoven substrate 22 may be formed using any suitable manufacturing process known in the nonwoven manufacturing art including, without limitation, a carded process. The construction of water-soluble substrate 22 may include, for example, folded layers or plies, stacked layers or plies, or rolled layers or plies.

As shown in FIGS. 1-3, in example embodiments, water-soluble nonwoven substrate 22 includes a plurality of layers 24. For example, water-soluble nonwoven substrate 22 may include layers $\mathbf{24}_n$, $\mathbf{24}_{n+1}$, $\mathbf{24}_{n+2}$, $\mathbf{24}_{n+3}$, etc. In example embodiments, water-soluble nonwoven substrate 22 is a continuous sheet of a water-soluble nonwoven web folded in a serpentine construction to form the plurality of layers 24. In example alternative embodiments, water-soluble nonwoven substrate 22 includes a plurality of separate water-soluble nonwoven substrate sheets in a plied, stacked, or layered construction to form the plurality of layers 24. In example embodiments, each layer 24 may contain the same active cleaning formulation 26 or each layer 24 may contain a cleaning formulation 26 different from one or more other layers 24. For example, in particular embodiments, a first layer 24*n* contains protease, a second layer $\mathbf{24}_{n+1}$ contains amylase, a third layer $\mathbf{24}_{n+2}$ contains lipase, a fourth layer $\mathbf{24}_{n+3}$ contains a surfactant, a fifth layer $\mathbf{24}_{n+4}$ contains chelants, and a sixth layer $\mathbf{24}_{n+5}$ contains a builder.

In example embodiments, water-soluble nonwoven substrate 22 contains a carrier solvent 25 with an active cleaning formulation 26. In example embodiments, active cleaning formulation 26 is a liquid formulation. In example embodiments, upon contact of a suitable amount of carrier solvent 25, e.g., a saturation amount, with the water-soluble nonwoven substrate 22, e.g., one or more fibers of a plurality of fibers forming water-soluble nonwoven substrate 22, the one or more fibers exhibit the at least one fiber or the nonwoven substrate exhibits a degree of shrinkage of 0.5% to 65%. In example embodiments, the fibers will have a crystallinity of at least 25% and, more particularly, between 30% and 35%. In example embodiments, the carrier solvent 25 incudes any suitable polar solvent and may include, without limitation, water, polyols such as glycerol, DPG (dipropylene glycol), or any combination thereof. In other example embodiments, carrier solvent 25 is first disposed on, e.g., coated on or applied to, water-soluble nonwoven substrate 22 to shrink or swell the fibers of water-soluble nonwoven substrate 22 and then active cleaning formulation 26 is applied to water-soluble nonwoven substrate 22. In example embodiments, the carrier solvent 25 with the active cleaning formulation 26 facilitates containing the active cleaning in the core substrate, such as water-soluble nonwoven substrate 22, creating SUD article stability while maintaining acceptable detergency and solubility.

In example embodiments, when water-soluble nonwoven substrate 22 is contacted with water having a temperature of at least 10° C., water-soluble nonwoven substrate 22 is soluble to release active cleaning formulation 26 from water-soluble nonwoven substrate 22. Further, when water-soluble nonwoven substrate 22 is contacted with water having a temperature of at least 10° C. for not more than 300 seconds, active cleaning formulation 26 is substantially released from water-soluble nonwoven substrate 22. In alternative embodiments, when a water-dispersible nonwoven substrate is contacted with water having a temperature less than 10° C., the water-dispersible nonwoven substrate is dispersible to release the active cleaning formulation from the water-dispersible nonwoven substrate. When the water-dispersible nonwoven substrate is contacted with water having a temperature less than 10° C. for not more than 300 seconds, the active cleaning formulation is substantially released from the water-dispersible nonwoven substrate.

Active cleaning formulation 26 may be in the form of a solid, e.g., a powder or a plurality of granules or particles, a gel, a liquid, or a slurry formulation, or any suitable combination of a powder, a solid, a gel, a liquid, or a slurry formulation, for example. In example embodiments, active cleaning formulation 26 is in any suitable phase including, for example, a solid phase, a liquid phase, a slurry phase (a liquid containing solids and multiple phases), and any suitable combination of phases. For example, active cleaning formulation 26 may include fine powders or granules, gels, one or more liquids, or a slurry (e.g., a liquid containing solids and multiple phases), or multiple phases. Active cleaning formulation may include, without limitation, detergents, surfactants, emulsifiers, chelants, dirt suspenders, stain releasers, enzymes, pH adjusters, builders, soil release polymers, structurants, free fragrance, encapsulated fragrance, preservatives, solvent, minerals, and/or any ingredients suitable in personal care, laundry detergent, dish detergent, and/or home surface cleaners or cleansers. In example embodiments, single unit dose article 20 includes active cleaning formulation having a mass of 0.5 gram (g) to 250 grams and a volume of 1.0 milliliter (ml) to 250 ml. In embodiments wherein active cleaning formulation 26 is a solid phase, the particles or granules have a size of 1 micron to 100 microns, or may be in tablet form.

In example embodiments, carrier solvent 25 with active cleaning formulation 26 is contained by water-soluble nonwoven substrate 22, for example, by saturating water-soluble nonwoven substrate 22 with carrier solvent 25 with active cleaning formulation 26, as shown in FIGS. 1 and 2, by embedding carrier solvent 25 with active cleaning formulation 26 in a matrix of water-soluble nonwoven substrate 22, e.g., in one or more layers 24 of water-soluble nonwoven substrate 22, as shown in FIG. 3, and/or by disposing carrier solvent 25 with active cleaning formulation 26 between adjacent layers 24 of water-soluble nonwoven substrate 22, e.g., coating one or more surfaces of layer $\mathbf{24}_n$, one or more surfaces of layer $\mathbf{24}_{n+1}$, and/or one or more surfaces of layer $\mathbf{24}_{n+2}$, for example, with carrier solvent 25 with active cleaning formulation 26. Carrier solvent 25 with active cleaning formulation 26 may be adsorbed in and/or adhered or bonded to a surface of water-soluble nonwoven substrate 22, for example. In example embodiments such as shown in FIG. 1, single unit dose article 20 includes a multi-layer, water-soluble nonwoven substrate 22, carrier solvent 25 with active cleaning formulation 26 in a liquid phase surrounding water-soluble nonwoven substrate 22, and water-soluble nonwoven material 28 enclosing and containing water-soluble nonwoven substrate 22, carrier solvent 25, and active cleaning formulation 26. In example embodiments, such as shown in FIG. 2, single unit dose article 20 includes a multi-layer, water-soluble nonwoven substrate 22 containing carrier solvent 25 with active cleaning formulation 26 in a liquid phase, and water-soluble nonwoven material 28 enclosing and containing water-soluble nonwoven substrate 22 and carrier solvent 25 with active cleaning formulation 26. In example embodiments, such as shown in FIG. 3, single unit dose article 20 includes a multi-layer, water-soluble nonwoven substrate 22 containing active cleaning formulation 26 in a solid phase, and water-soluble nonwoven material 28 enclosing and containing water-soluble nonwoven substrate 22 and carrier solvent 25 with active cleaning formulation 26.

Referring further to FIGS. 1-3, in example embodiments, water-soluble nonwoven substrate 22 includes a plurality of fibers (detailed structures of fibers not shown in FIGS. 1-3). In example embodiments, one or more fibers of the plurality of fibers is saturated with carrier solvent 25 with active cleaning formulation 26. Carrier solvent 25 with active cleaning formulation 26 may be embedded in one or more of fibers of the plurality of fibers or carrier solvent 25 with active cleaning formulation 26 may be disposed on, e.g., coated on, a surface of one or more fibers of the plurality of fibers.

In example embodiments, a water-soluble nonwoven material 28, as shown in FIGS. 1-3, for example, and/or a water-soluble film (see, for example, FIGS. 13 and 14) at least partially encloses water-soluble nonwoven substrate 22 and defines an interior volume 32, in which water-soluble nonwoven substrate 22 and carrier solvent 25 with active cleaning formulation 26 are contained. For example, in certain embodiments, a water-soluble film (for example, as described in FIGS. 13 and 14) is laminated to a first surface, e.g., an inner surface, of water-soluble nonwoven material 28. In example embodiments, water-soluble nonwoven material 28 includes any suitable fiber chemistry including, without limitation, PVOH fibers or PVOH fibers blended with up to 90 wt. % cellulose-type fibers. In alternative embodiments, the nonwoven material is made of water-dispersible fibers. In example embodiments, water-soluble nonwoven material 28 has a basis weight of 15 gsm to 150 gsm, a fiber length of 10.0 millimeters (mm) to 150 mm, and a suitable fiber diameter. The fibers of water-soluble nonwoven material 28 may be bonded using any suitable method including, without limitation, heat, thermal, chemical, water, or solution bonding or any suitable bonding method known in the art of nonwoven fiber bonding. Water-soluble nonwoven material 28 may include any suitable number of layers or plies, for example, 1 layer or ply to 50 layers or plies, or more in certain embodiments. Water-soluble nonwoven material 28 may be porous or non-porous and cold water-soluble or hot water-soluble. Water-soluble nonwoven material 28 may be formed using any suitable manufacturing process known in the nonwoven manufacturing art including, without limitation, a carded process. The construction of water-soluble material 28 may include, for example, folded layers or plies, stacked layers or plies, or rolled layers or plies. In example embodiments, a first side or surface may have a fibrous appearance and a second side or surface, e.g., opposing first side or surface, may be smooth or coated with water to create a continuous layer using heat and/or water. The first surface is the inner surface and the second surface is the outer surface in certain embodiments.

As shown in FIGS. 1-3, a bonding interface 34 is formed or configured to create a seal 36 to enclose water-soluble nonwoven substrate 22 and carrier solvent 25 with active cleaning formulation 26 within interior volume 32. A suitable bonding interface or seal 36 may be formed using a liquid, solvent, heat, chemical, through-air, or mechanical entanglement (needle punch) bond or seal 36. For example, as shown in FIG. 1, carrier solvent 25 with a liquid active cleaning formulation 26 is contained within interior volume 32.

Figure 4:
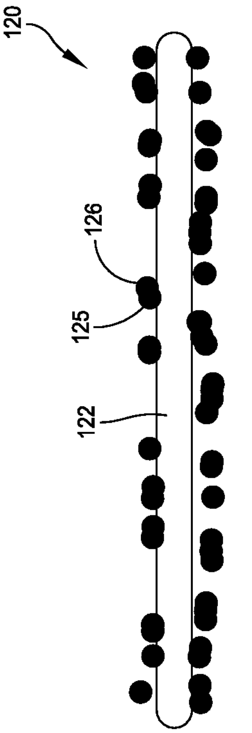
Figure 5:
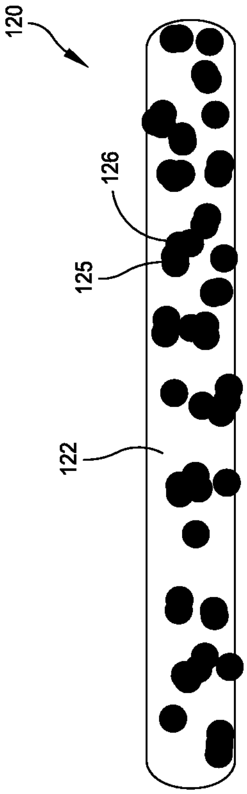

Referring now to FIGS. 4 and 5, a single unit dose article 120 includes a water-soluble nonwoven substrate 122 comprising a water-soluble resin. In example embodiments, water-soluble nonwoven substrate 122 includes any suitable fiber chemistry including, without limitation, PVOH fibers or PVOH fibers blended with up to 90 wt. % cellulose-type fibers. In alternative embodiments, the nonwoven substrate is made of water-dispersible fibers. In example embodiments, water-soluble nonwoven substrate 122 has a basis weight of 15 gsm to 150 gsm, a fiber length of 10.0 millimeters (mm) to 150 mm, and a suitable fiber diameter. The fibers of water-soluble nonwoven substrate 122 may be bonded using any suitable method including, without limitation, heat, thermal, chemical, water, or solution bonding or any suitable bonding method known in the art of nonwoven fiber bonding. In example embodiments, water-soluble nonwoven substrate 122 may include any suitable number of layers or plies, for example, 1 layer or ply to 50 layers or plies, or more in certain embodiments. Water-soluble nonwoven substrate 122 may be porous or non-porous and cold water-soluble or hot water-soluble. Water-soluble nonwoven substrate 122 may be formed using any suitable manufacturing process known in the nonwoven manufacturing art including, without limitation, a carded process. The construction of water-soluble nonwoven substrate 122 may include, for example, folded layers or plies, stacked layers or plies, rolled layers or plies, or a high loft nonwoven substrate.

In example embodiments, water-soluble nonwoven substrate 122 contains a carrier solvent 125 with an active cleaning formulation 126. In example embodiments, when water-soluble nonwoven substrate 122 is contacted with water having a temperature greater than 20° C., water-soluble nonwoven substrate 122 is soluble to release active cleaning formulation 126. Active cleaning formulation 126 may be in the form of a solid, a gel, a liquid, or a slurry formulation, or any suitable combination of a solid, a gel, a liquid, or a slurry formulation, for example. In example embodiments, such as shown in FIGS. 4 and 5, active cleaning formulation 126 is in a solid phase, e.g., tablets, solid particles, granules, or fine powders. Active cleaning formulation 126 may include, without limitation, actives, detergents, surfactants, emulsifiers, chelants, dirt suspenders, stain releasers, enzymes, pH adjusters, builders, soil release polymers, structurants, free fragrance, encapsulated fragrance, preservatives, solvent, minerals, and/or any ingredients suitable in personal care, laundry detergent, dish detergent, and/or home surface cleaners or cleansers. In example embodiments, single unit dose article 120 includes active cleaning formulation having a mass of 0.5 gram (g) to 250 grams and a volume of 1.0 milliliter (ml) to 250 ml, and a particle or granule size of 1.0 micron to 100 microns. In example embodiments, carrier solvent 125 with active cleaning formulation 126 is contained by water-soluble nonwoven substrate 122, for example, by the solid particles or granules of active cleaning formulation 126 being embedded or adsorbed in or bound to a surface of water-soluble nonwoven substrate 122, as shown in FIG. 4, and/or by the solid particles or granules of active cleaning formulation 126 being embedded, adsorbed, or bound within a matrix of water-soluble nonwoven substrate 122, as shown in FIG. 5. Example single unit dose article 120 is shown in FIGS. 4 and 5 for demonstration purposes only. Water-soluble nonwoven substrate 122, carrier solvent 125, and active cleaning formulation 126 can be examples of or the same as water-soluble nonwoven substrate 22, carrier solvent 25, and active cleaning formulation 26, respectively, as described in FIGS. 1-3. Single unit dose article 120 as shown in FIGS. 4 and 5 can be a part of single unit dose article 20, as shown in FIGS. 1-3.

Referring now to FIGS. 6-9, in example embodiments, a single unit dose article 220 includes a water-soluble foam substrate 222 comprising a water-soluble resin. In example embodiments, water-soluble foam substrate 222 includes any suitable resin chemistry, such as a PVOH homopolymer; a PVOH copolymer; a modified PVOH copolymer such as maleic anhydride (MA) modified PVOH copolymer, monomethyl maleate (MMM) Modified PVOH copolymer, 2-acrylamido-2-methylpropanesulfonic acid (AMPS) Modified PVOH copolymer, cellulose and cellulose derivatives, polyvinylpyrrolidone (PVP), proteins, casein, soy, or any water-dispersible or water-soluble resin. In certain embodiments, water-soluble foam substrate 222 has a thickness of 3 microns to 3000 microns and can be formed using any suitable manufacturing process known in the foam manufacturing art including, without limitation, a cast, extruded, melt processed, coated, chemically blown, mechanically aerated, air injected, turbulent extrusion process. Water-soluble foam substrate 222 may be porous or non-porous and cold water-soluble or hot water-soluble. The construction of water-soluble foam substrate 222 may include, for example, folded layers or plies, stacked layers or plies, or rolled layers or plies.

Figure 6:
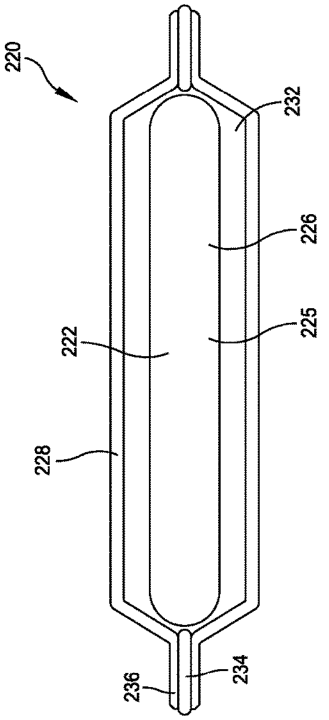
Figure 7:
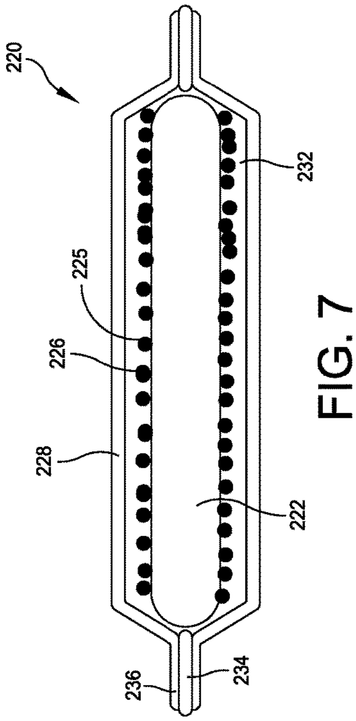
Figure 8:
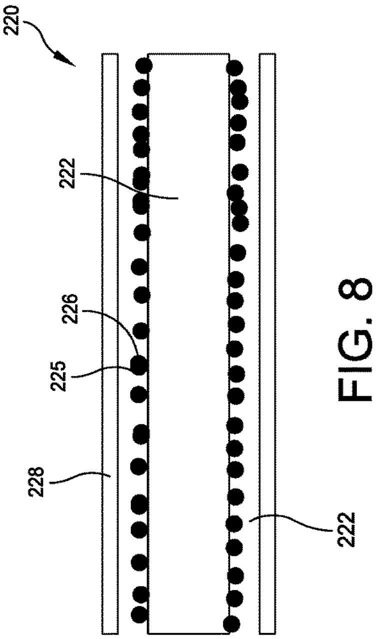
Figure 9:
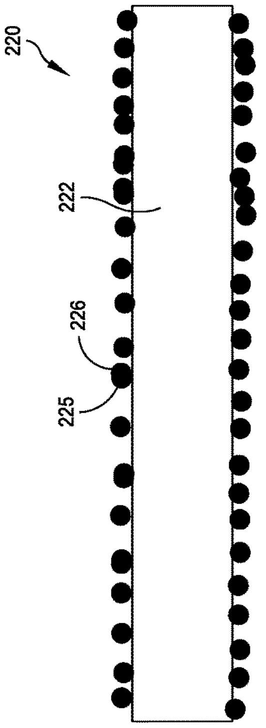

Water-soluble foam substrate 222 is configured to contain a carrier solvent 225 with an active cleaning formulation 226. In example embodiments, upon contact of carrier solvent 25 with water-soluble foam substrate 222, water-soluble foam substrate 222 exhibits a carrier solvent absorptive capacity of 1% to 1300%. Further, when the water-soluble foam substrate 222 is contacted with water having a temperature greater than 20° C., water-soluble foam substrate 222 is soluble to release active cleaning formulation 226. In certain embodiments, as shown in FIGS. 6-8, a water-soluble nonwoven material 228 at least partially encloses and contains water-soluble foam substrate 222 and carrier solvent 225 with active cleaning formulation 226. Active cleaning formulation 226 may be in the form of a solid, a liquid, a gel, or a slurry formulation, or any suitable combination of a solid, a liquid, a gel, or a slurry formulation, for example. In example embodiments, such as shown in FIGS. 6-9, active cleaning formulation 226 is in a solid phase but, in certain embodiments, may be in any suitable phase including, for example, a liquid phase, a slurry phase (a liquid containing solids and multiple phases), and any suitable combination of phases. Active cleaning formulation may include, without limitation, actives, detergents, surfactants, emulsifiers, chelants, dirt suspenders, stain releasers, enzymes, pH adjusters, builders, soil release polymers, structurants, free fragrance, encapsulated fragrance, preservatives, solvent, minerals, and/or any ingredients suitable in personal care, laundry detergent, dish detergent, and/or home surface cleaners or cleansers. In example embodiments, single unit dose article 220 includes a structurant or an adhesive material for holding solid, liquid, or gel active cleaning formulations 226, which is bonded to water-soluble foam substrate 222 to provide a barrier to the consumer's hand. In example embodiments, single unit dose article 220 includes active cleaning formulation 226 having a mass of 0.5 gram (g) to 250 grams and a volume of 1.0 milliliter (ml) to 250 ml. In example embodiments, such as shown in FIGS. 7-9, active cleaning formulation 226 includes fine powder or granules having a particle size of 1 micron to 100 microns, or solid active cleaning formulations 226 in tablet form.

In example embodiments, carrier solvent 225 with active cleaning formulation 226 is contained by water-soluble foam substrate 222, for example, by saturating water-soluble foam substrate 222 with carrier solvent 225 with active cleaning formulation 226, as shown in FIG. 6, or by adhering, adsorbing, or bonding solid, e.g., powder or granules, carrier solvent 225 with active cleaning formulations 226 to a surface of water-soluble foam substrate 222, as shown in FIGS. 7-9, or disposing or embedding carrier solvent 225 with active cleaning formulation 226 in one or more layers or surfaces, or a matrix of water-soluble foam substrate 222, e.g., coating one or more surfaces with carrier solvent 225 with a solid active cleaning formulation 226. In example embodiments such as shown in FIG. 6, single unit dose article 20 includes water-soluble foam substrate 222 and carrier solvent 225 with active cleaning formulation 226 contained in water-soluble foam substrate 222, and a water-soluble nonwoven material 228 enclosing and containing water-soluble foam substrate 222 and carrier solvent 225 with active cleaning formulation 226. In example embodiments, such as shown in FIGS. 7 and 8, single unit dose article 220 includes water-soluble foam substrate 222 containing carrier solvent 225 with active cleaning formulation 226 in a solid phase, e.g., powder or granular form, and water-soluble nonwoven material 228 at least partially enclosing and containing water-soluble foam substrate 222 and carrier solvent 225 with active cleaning formulation 226. In the example shown in FIG. 7, a bonding interface 234 is formed or configured to create a seal 236 to enclose water-soluble foam substrate 222 and carrier solvent 225 with active cleaning formulation 226 within an interior volume 232 of water-soluble nonwoven material 228. In example embodiments, such as shown in FIG. 9, single unit dose article 220 includes water-soluble foam substrate 222 containing carrier solvent 225 with active cleaning formulation 226 in a solid phase, e.g., a powder or granular form, adhered or bonded to a surface of water-soluble foam substrate 222, without a water-soluble nonwoven material 228 enclosing water-soluble foam substrate 222 and carrier solvent 225 with active cleaning formulation 226. Example single unit dose article 220 is shown in FIGS. 6-9 for demonstration purposes only. Water-soluble nonwoven substrate 222, carrier solvent 225, active cleaning formulation 226, and water-soluble nonwoven material 228 may be made of the same materials as water-soluble nonwoven substrate 22, carrier solvent 25, active cleaning formulation 26, and water-soluble nonwoven material 28, respectively, as described in FIGS. 1-3. Bonding interface 234 and seal 236 may be the same as bonding interface 34 and seal 36, respectively, as shown in FIGS. 1-3.

In example embodiments, a water-soluble nonwoven material 228, as shown in FIGS. 6-8, for example, and/or a water-soluble film (see, for example, FIGS. 13 and 14) at least partially encloses water-soluble foam substrate 222 defining an interior volume 232 in which water-soluble foam substrate 222 and carrier solvent 225 with active cleaning formulation 226 are contained. For example, in certain embodiments, a water-soluble film is laminated to a first surface, e.g., an inner surface, of water-soluble nonwoven material 228. In example embodiments, water-soluble nonwoven material 228 includes any suitable fiber chemistry, such as PVOH fibers or PVOH fibers blended with up to 90 wt. % cellulose-type fibers. In alternative embodiments, the nonwoven material is made of water-dispersible fibers. In example embodiments, water-soluble nonwoven material 28 has a basis weight of 15 gsm to 150 gsm, a fiber length of 10.0 millimeters (mm) to 150 mm, and a suitable fiber diameter. The fibers of water-soluble nonwoven material 28 may be bonded using any suitable method including, without limitation, heat, thermal, chemical, water, or solution bonding or any suitable bonding method known in the art of nonwoven fiber bonding. Water-soluble nonwoven material 228 may include any suitable number of layers or plies, for example, 1 layer or ply to 50 layers or plies, or more in certain embodiments. Water-soluble nonwoven material 228 may be porous or non-porous and cold water-soluble or hot water-soluble. Water-soluble nonwoven material 228 may be formed using any suitable manufacturing process known in the nonwoven manufacturing art including, without limitation, a carded process. The construction of water-soluble material 228 may include, for example, folded layers or plies, stacked layers or plies, or rolled layers or plies. In example embodiments, a first side or surface may have a fibrous appearance and a second side or surface, e.g., opposing first side or surface, may be smooth or coated with water to create a continuous layer using heat and/or water.

In example embodiments such as shown in FIGS. 8 and 9, for example, a single use laundry bag or hamper liner includes a water-soluble foam substrate alone or in combination with a water-soluble film substrate and/or a water-soluble nonwoven substrate containing a suitable amount of one or more active cleaning formulations for washing a load of laundry. The active cleaning formulation may be embedded in or contained in the polymer matrix of the water-soluble foam substrate and/or disposed on one or more surfaces of the water-soluble foam substrate. The consumer can simply place the laundry bag or hamper liner containing dirty laundry into the washing machine and start the washing cycle. In example embodiments, the water-soluble single use laundry bag or hamper liner dissolves complete, or otherwise disperse to release the active cleaning formulations to clean the dirty laundry. In other example embodiments, a single unit dose article, e.g., in the form of tag or sticker, may be sewn on or otherwise adhered to an article of clothing to be cleaned. The consumer may benefit from a high performance cleaning ability to separate otherwise incompatible cleaning agents or actives, natural or more sustainable appearance, and convenience.

Figure 10:
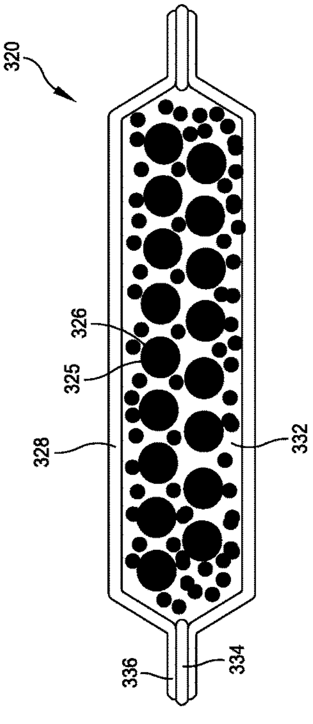

Referring now to FIG. 10, in example embodiments, a single unit dose article 320 includes a carrier solvent 325 with an active cleaning formulation 326. Active cleaning formulation 326 may be in the form of a solid, a powder or granules, a gel, a liquid, or a slurry formulation, or any suitable combination of a powder, a solid, a liquid, or a slurry formulation, for example. In example embodiments, such as shown in FIG. 10, active cleaning formulation 326 is in a solid phase including a plurality of solid particles or granules but, in certain embodiments, active cleaning formulation 326 may be in any suitable phase including, for example, a liquid phase, a slurry phase (a liquid containing solids and multiple phases), or any suitable combination of phases. Active cleaning formulation may include, without limitation, actives, detergents, surfactants, emulsifiers, chelants, dirt suspenders, stain releasers, enzymes, pH adjusters, builders, soil release polymers, structurants, free fragrance, encapsulated fragrance, preservatives, solvent, minerals, and/or any ingredients suitable in personal care, laundry detergent, dish detergent, and/or home surface cleaners or cleansers. In example embodiments, single unit dose article 20 includes active cleaning formulation having a mass of 0.5 gram (g) to 250 grams and a volume of 1.0 milliliter (ml) to 250 ml. In example embodiments, active cleaning formulation 326 includes a plurality of fine powder particles or granules having a particle size of 1 micron to 100 microns or tablet form. The particles, granules, or tablets in active cleaning formulation 326 may have different particle sizes in one or dual particle size distribution, for example.

In example embodiments, a water-soluble nonwoven material 328, as shown in FIG. 10, for example, and/or a water-soluble film (see, for example, FIGS. 13 and 14) defines an interior volume 332 to contain carrier solvent 325 with active cleaning formulation 326. In example embodiments, water-soluble nonwoven material 328 includes any suitable fiber chemistry, such as PVOH fibers or PVOH fibers blended with up to 90 wt % cellulose-type fibers. In alternative embodiments, the nonwoven material is made of water-dispersible fibers. In example embodiments, water-soluble nonwoven material 328 has a basis weight of 15 gsm to 150 gsm, a fiber length of 10.0 millimeters (mm) to 150 mm, and a suitable fiber diameter. The fibers of water-soluble nonwoven material 328 may be bonded using any suitable method including, without limitation, heat, thermal, chemical, water, or solution bonding or any suitable bonding method known in the art of nonwoven fiber bonding. Water-soluble nonwoven material 328 may include any suitable number of layers or plies, for example, 1 layer or ply to 50 layers or plies, or more in certain embodiments. Water-soluble nonwoven material 328 may be porous or nonporous and cold water-soluble or hot water-soluble. Water-soluble nonwoven material 328 may be formed using any suitable manufacturing process known in the nonwoven manufacturing art including, without limitation, a carded process. The construction of water-soluble material 328 may include, for example, folded layers or plies, stacked layers or plies, or rolled layers or plies. In example embodiments, a first side or surface may have a fibrous appearance and a second side or surface, e.g., opposing first side or surface, may be smooth or coated with water to create a continuous layer using heat and/or water.

As shown in FIG. 10, a bonding interface 334 is formed or configured to create a seal 336 to enclose carrier solvent 325 with active cleaning formulation 326 within interior volume 332. A suitable bonding interface 334 or seal 336 may be formed using a liquid, solvent, heat, chemical, through-air, or mechanical entanglement (needle punch) bond or seal 336. In example embodiments, when water-soluble nonwoven material 328 is contacted with water having a temperature greater than 20° C., water-soluble nonwoven material 328 is soluble to release active cleaning formulation 326. Example single unit dose article 320 is shown in FIG. 10 for demonstration purposes only. Carrier solvent 325, active cleaning formulation 326, and water-soluble nonwoven material 328 may be made of the same materials as carrier solvent 25, active cleaning formulation 26, and water-soluble nonwoven material 28, respectively, as described in FIGS. 1-3. Bonding interface 334 and seal 336 may be the same as bonding interface 34 and seal 36, respectively, as shown in FIGS. 1-3. The particles, granules, or tablets in active cleaning formulation 326 having different particle sizes in one or dual particle size distribution, for example, are also applicable to single unit dose article 20 shown in FIGS. 1-3.

Figure 11:
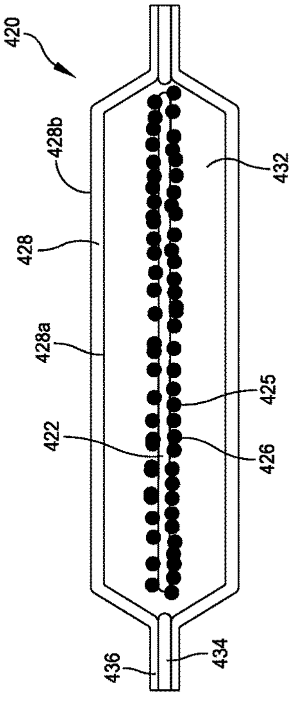
Figure 12:
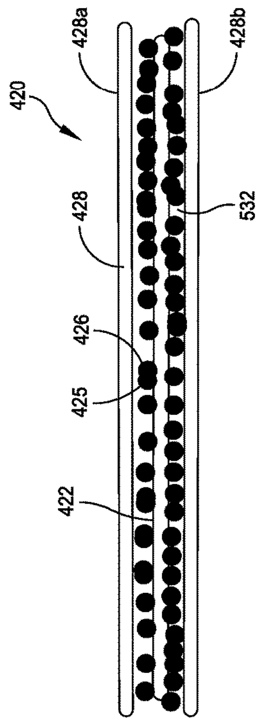

As shown in FIGS. 11 and 12, a single unit dose article 420 includes a water-soluble nonwoven material 428 having a first water-soluble nonwoven web **428*a* including a first water-soluble resin and an opposing second water-soluble nonwoven web 428*b*, the same or different than the first water-soluble nonwoven web, including a second water-soluble resin. An active cleaning formulation 426 is disposed between the first water-soluble nonwoven web and the second water-soluble nonwoven web, wherein, when the first water-soluble nonwoven web and/or the second water-soluble nonwoven web is contacted with water having a temperature greater than 20° C., the first water-soluble nonwoven web and/or the second water-soluble nonwoven web is soluble to release the active cleaning formulation. A water-soluble film substrate 422 disposed between the first water-soluble nonwoven web 428*a* and the second water-soluble nonwoven web 428*b*, and carrier solvent 425 with an active cleaning formulation 426 is disposed on a surface of, e.g., embedded in or bonded to, water-soluble film substrate 422**.

In example embodiments, water-soluble film substrate 422 includes a water-soluble resin. In example embodiments, water-soluble film substrate 422 includes any suitable chemistry, such as a PVOH homopolymer, a PVOH copolymer, MA modified PVOH copolymer, MMM Modified PVOH copolymer, AMPS Modified PVOH copolymer, cellulose and cellulose derivatives, PVP, proteins, casein, soy, or any water-dispersible or water-soluble resin. Water-soluble film substrate 422 has a thickness of 3 microns to 3000 microns and can be formed using any suitable manufacturing process known in the foam manufacturing art including, without limitation, a cast, extruded, melt processed, coated process. Water-soluble film substrate 422 may be cold water-soluble or hot water-soluble. In example embodiments, water-soluble film substrate 422 includes a suitable structurant or an adhesive material to hold or bond a solid, liquid, and/or gel active cleaning formulation 426 to water-soluble film substrate 422.

In example embodiments, water-soluble film substrate 422 contains carrier solvent 425 with active cleaning formulation 426. In example embodiments, when water-soluble film substrate 422 is contacted with water having a temperature greater than 20° C., water-soluble film substrate 422 is soluble to release active cleaning formulation 426. Active cleaning formulation 426 may be in the form of a solid, e.g., fine powder or granules, a powder, a liquid, or a slurry formulation, or any suitable combination of a solid, e.g., fine powder or granules, a liquid, or a slurry formulation, for example. In example embodiments, such as shown in FIGS. 11 and 12, active cleaning formulation 426 is in a solid phase, but may be in any suitable phase including, for example, a liquid phase, a slurry phase (a liquid containing solids and multiple phases), and any suitable combination of phases. Active cleaning formulation may include, without limitation, actives, detergents, surfactants, emulsifiers, chelants, dirt suspenders, stain releasers, enzymes, pH adjusters, builders, soil release polymers, structurants, free fragrance, encapsulated fragrance, preservatives, solvent, minerals, and/or any ingredients suitable in personal care, laundry detergent, dish detergent, and/or home surface cleaners or cleansers. In example embodiments, single unit dose article 20 includes active cleaning formulation having a mass of 0.5 gram (g) to 250 grams and a volume of 1.0 milliliter (ml) to 250 ml. In example embodiments, active cleaning formulation 426 includes a fine powder or granules having a particle size of 1 micron to 100 microns or tablet form. The powder or granules may have different sizes with a particle size distribution or bimodal particle size distribution, for example.

In example embodiments such as shown in FIGS. 11 and 12, single unit dose article 420 includes water-soluble film substrate 422 and carrier solvent 425 with active cleaning formulation 426 in a solid phase adhered, adsorbed, or bound to a surface of water-soluble film substrate 422, and water-soluble nonwoven material 428 at least partially enclosing and containing water-soluble film substrate 422 and carrier solvent 425 with active cleaning formulation 426. In example embodiments, such as shown in FIG. 11, single unit dose article 420 includes water-soluble film substrate 422 containing carrier solvent 425 with active cleaning formulation 426 in a solid phase, and water-soluble nonwoven material 428 enclosing and containing water-soluble film substrate 422 with carrier solvent 425 with active cleaning formulation 426. In example embodiments, such as shown in FIG. 12, single unit dose article 420 includes water-soluble film substrate 422 containing carrier solvent 425 with active cleaning formulation 426 in a solid phase, and water-soluble nonwoven material 428 partially enclosing and containing water-soluble film substrate 422 with carrier solvent 425 with active cleaning formulation 426. Example single unit dose article 420 is shown in FIG. 10 for demonstration purposes only. Carrier solvent 425, active cleaning formulation 426, and water-soluble nonwoven material 428 may be made of the same materials as carrier solvent 25, active cleaning formulation 26, and water-soluble nonwoven material 28, respectively, as described with reference to FIGS. 1-3.

In example embodiments, water-soluble nonwoven material 428 includes any suitable fiber chemistry, such as PVOH fibers or PVOH fibers blended with up to 90 wt. % cellulose-type fibers. In alternative embodiments, the nonwoven material is made of water-dispersible fibers. In example embodiments, water-soluble nonwoven material 428 has a basis weight of 15 gsm to 150 gsm, a fiber length of 10.0 millimeters (mm) to 150 mm, and a suitable fiber diameter. The fibers of water-soluble nonwoven material 428 may be bonded using any suitable method including, without limitation, heat, thermal, chemical, water, or solution bonding or any suitable bonding method known in the art of nonwoven fiber bonding. Water-soluble nonwoven material 428 may include any suitable number of layers or plies, for example, 1 layer or ply to 50 layers or plies, or more in certain embodiments. Water-soluble nonwoven material 428 may be porous or non-porous and cold water-soluble or hot water-soluble. Water-soluble nonwoven material 428 may be formed using any suitable manufacturing process known in the nonwoven manufacturing art including, without limitation, a carded process. The construction of water-soluble nonwoven material 428 may include, for example, folded layers or plies, stacked layers or plies, or rolled layers or plies. In example embodiments, a first side or surface may have a fibrous appearance and a second side or surface, e.g., opposing first side or surface, may be smooth or coated with water to create a continuous layer using heat and/or water. The first surface may be an interior surface and the second surface may be an exterior surface of single unit dose article 420 in certain embodiments.

As shown in FIG. 11, a bonding interface 434 is formed or configured to create a seal 436 to enclose water-soluble film substrate 422 and carrier solvent 425 with active cleaning formulation 426 within an interior volume 432 defined by water-soluble nonwoven material 428. A suitable bonding interface or seal 436 may be formed using a liquid, solvent, heat, chemical, through-air, or mechanical entanglement (needle punch) bond or seal 436. Bonding interface 434 and seal 436 may be the same as bonding interface 34 and seal 36, respectively, as shown in FIGS. 1-3

Figure 13:
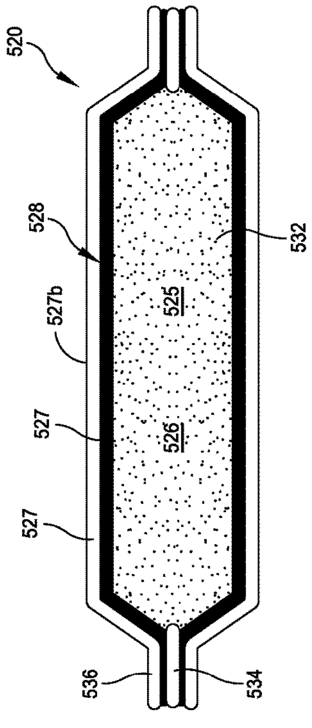
Figure 14:
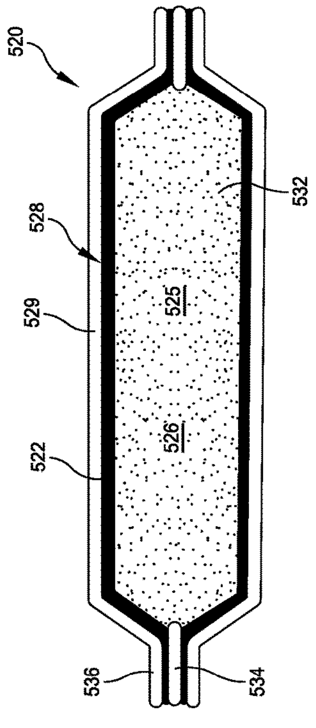

Referring now to FIGS. 13 and 14, a single unit dose article 520 includes a water-soluble composite material 528 including, for example, a water-soluble film 522 material made of a water-soluble resin, as described herein, coupled, bonded, or laminated to a water-soluble nonwoven material 527 or a water-soluble foam material 529 made of water-soluble resin, as described herein. For example, as shown in FIG. 13, water-soluble composite material 528 includes a water-soluble nonwoven web 527 having a first surface 527*a* facing interior volume 532 and an opposing second surface 527*b*, e.g., an outer surface, with a water-soluble film material 522 disposed on the first surface. Water-soluble composite material 528 is bonded at a bonding interface 534 along an edge of the water-soluble material to define an interior volume 532 of single unit dose article 520. A seal 536 is also formed. An active cleaning formulation 526 is disposed in interior volume 532. In example embodiments, when water-soluble composite material 528 is contacted with water having a temperature greater than 20° C., at least a portion of water-soluble composite material 528 is soluble to release active cleaning formulation 526.

In example embodiments, as shown in FIG. 13, for example, the water-soluble nonwoven material 527 of water-soluble composite material 528 includes any suitable fiber chemistry, such as PVOH fibers or PVOH fibers blended with up to 90 wt. % cellulose-type fibers. In alternative embodiments, the nonwoven material 527 is made of water-dispersible fibers. In example embodiments, water-soluble nonwoven material 527 has a basis weight of 15 gsm to 150 gsm, a fiber length of 10.0 millimeters (mm) to 150 mm, and a suitable fiber diameter. The fibers of water-soluble nonwoven material 527 may be bonded using any suitable method including, without limitation, heat, thermal, chemical, water, or solution bonding or any suitable bonding method known in the art of nonwoven fiber bonding. The water-soluble nonwoven material 527 may include any suitable number of layers or plies, for example, 1 layer or ply to 50 layers or plies, or more in certain embodiments. The water-soluble nonwoven material 527 may be porous or non-porous and cold water-soluble or hot water-soluble. The water-soluble nonwoven material may be formed using any suitable manufacturing process known in the nonwoven manufacturing art including, without limitation, a carded process. The construction of the water-soluble nonwoven material may include, for example, folded layers or plies, stacked layers or plies, or rolled layers or plies. In example embodiments, a first side or surface may have a fibrous appearance and a second side or surface, e.g., opposing first side or surface, may be smooth or coated with water to create a continuous layer using heat and/or water.

In example embodiments, as shown in FIG. 14, for example, the water-soluble foam substrate 529 of water-soluble composite material 528 includes any suitable resin chemistry, such as a homopolymer, MA modified PVOH copolymer, MMM Modified PVOH copolymer, AMPS Modified PVOH copolymer, cellulose and cellulose derivatives, PVP, proteins, casein, soy, or any water-dispersible or water-soluble resin. The water-soluble foam material 529 has a thickness of 3 microns to 3000 microns and can be formed using any suitable manufacturing process known in the foam manufacturing art including, without limitation, a cast, extruded, melt processed, coated, chemically blown, mechanically aerated, air injected, turbulent extrusion process. The water-soluble foam material 529 may be porous or non-porous and cold water-soluble or hot water-soluble. The construction of the water-soluble foam material 529 may include, for example, folded layers or plies, stacked layers or plies, or rolled layers or plies.

In example embodiments, carrier solvent 525 with active cleaning formulation 526 may be in the form of a solid, e.g., a powder or granules, a liquid, or a slurry formulation, or any suitable combination of a solid, a liquid, or a slurry formulation, for example. In example embodiments, such as shown in FIGS. 13 and 14, active cleaning formulation 526 is in a liquid phase but, in certain embodiments, may be in any suitable phase including, for example, a liquid phase, a slurry phase (a liquid containing solids and multiple phases), a solid phase, and any suitable combination of phases. Active cleaning formulation may include, without limitation, actives, detergents, surfactants, emulsifiers, chelants, dirt suspenders, stain releasers, enzymes, pH adjusters, builders, soil release polymers, structurants, free fragrance, encapsulated fragrance, preservatives, solvent, minerals, and/or any ingredients suitable in personal care, laundry detergent, dish detergent, and/or home surface cleaners or cleansers. In example embodiments, single unit dose article 520 includes active cleaning formulation 526 having a mass of 0.5 gram (g) to 250 grams and a volume of 1.0 milliliter (ml) to 250 ml. In example embodiments, active cleaning formulation 526 includes a fine powder or granules having a particle size of 1 micron to 100 microns or tablet form.

In example embodiments such as shown in FIG. 13, single unit dose article 520 includes carrier solvent 525 with active cleaning formulation 526 in a liquid phase contained within water-soluble composite material 528 including a water-soluble film material laminated to a water-soluble nonwoven material enclosing and containing carrier solvent 525 with active cleaning formulation 526. In example embodiments, such as shown in FIG. 14, single unit dose article 520 includes carrier solvent 525 with active cleaning formulation 526 in a liquid phase contained within water-soluble composite material 528 including a water-soluble film material laminated to a water-soluble foam material enclosing and containing carrier solvent 525 with active cleaning formulation 526. FIGS. 13 and 14 are shown for demonstration purposes. Carrier solvent 525 and active cleaning formulation 526 may be the same as those described with reference to FIGS. 2-12. Carrier solvent 525 and active cleaning formulation 526 may also be adsorbed on, embedded in, or loaded, applied or layered between one or more layers of water-soluble core substrates, such as nonwoven, foam and/or film, with one of the configurations described with reference to FIGS. 2-12 inside the pouch.

In example embodiments, a single unit dose article includes a water-soluble nonwoven material, for example, and/or a water-soluble film defines an interior volume to contain an active cleaning formulation. In example embodiments, the water-soluble nonwoven material includes any suitable fiber chemistry, such as PVOH fibers or PVOH fibers blended with up to 90 wt % cellulose-type fibers. In alternative embodiments, the nonwoven material is made of water-dispersible fibers. In example embodiments, the water-soluble nonwoven material has a basis weight of 15 gsm to 150 gsm, a fiber length of 10.0 millimeters (mm) to 150 mm, and a suitable fiber diameter. The fibers of the water-soluble nonwoven material may be bonded using any suitable method including, without limitation, heat, thermal, chemical, water, or solution bonding or any suitable bonding method known in the art of nonwoven fiber bonding. The water-soluble nonwoven material may include any suitable number of layers or plies, for example, 1 layer or ply to 50 layers or plies, or more in certain embodiments. The water-soluble nonwoven material may be porous or non-porous and cold water-soluble or hot water-soluble. The water-soluble nonwoven material may be formed using any suitable manufacturing process known in the nonwoven manufacturing art including, without limitation, a carded process. The construction of the water-soluble material may include, for example, folded layers or plies, stacked layers or plies, or rolled layers or plies. In example embodiments, a first side or surface may have a fibrous appearance and a second side or surface, e.g., opposing first side or surface, may be smooth or coated with water to create a continuous layer using heat and/or water.

In example embodiments, the active cleaning formulation is in the form of a solid, e.g., a powder, but the active cleaning formulation may be in the form of a gel, a liquid, or a slurry formulation, or any suitable combination of a solid, a liquid, or a slurry formulation, for example. The active cleaning formulation may include, without limitation, actives, detergents, surfactants, emulsifiers, chelants, dirt suspenders, stain releasers, enzymes, pH adjusters, builders, soil release polymers, structurants, free fragrance, encapsulated fragrance, preservatives, solvent, minerals, and/or any ingredients suitable in personal care, laundry detergent, dish detergent, and/or home surface cleaners or cleansers. In example embodiments, the single unit dose article includes the active cleaning formulation having a mass of 0.5 gram (g) to 250 grams and a volume of 1.0 milliliter (ml) to 250 ml. In example embodiments, the active cleaning formulation includes a plurality of fine powder particles or granules having a particle size of 1 micron to 100 microns or tablet form.

A bonding interface 534 is formed or configured to create a seal 536 to enclose the active cleaning formulation within the interior volume. A suitable bonding interface or seal may be formed using a liquid, solvent, heat, chemical, through-air, or mechanical entanglement (needle punch) bond or seal. In example embodiments, when the water-soluble nonwoven material is contacted with water having a temperature greater than 20° C., the water-soluble nonwoven material is soluble to release the active cleaning formulation from the interior volume.

A consumer is able to place one or more single unit dose articles, e.g., single unit dose article 20, 120, 220, 320, 420, or 520, into a washing vessel, such as washer or wash basin, for example, to deliver or introduce an active cleaning formulation, e.g., active cleaning formulation 26, 126, 226, 326, 426, 526, into the washing vessel to wash a person's body or articles including, without limitation, clothes, dishes, and/or surfaces. In example embodiments, the materials of the single unit dose article dissolve completely or substantially completely, or otherwise disperses without negatively affecting a perceived appearance of cleanliness by the consumer. In certain example embodiments, the single unit dose article is coupled to or attached to, e.g., sewn on or adhered to, an article, such as a piece of clothing, to be cleaned. Other examples include a single unit dose article in the form of a tag attached to clothing or a sticker adhesively coupled to a surface to be cleaned.

Further, the single unit dose article 520 may be configured as a bag or a container for dirty articles for unit washing, and an overall simplified washing process, e.g., a laundry bag containing an active cleaning formulation. The laundry bag containing the dirty articles can be placed in the washing machine and will dissolve completely or substantially completely, or otherwise disperse, as the dirty articles are being washed. Consumer perceived benefits of the single unit dose article include, for example, high performance cleaning, ability to physically separate otherwise incompatible cleaning agents, a natural and more sustainable appearance, convenience, and/or product differentiation and novelty.

Figure 15:
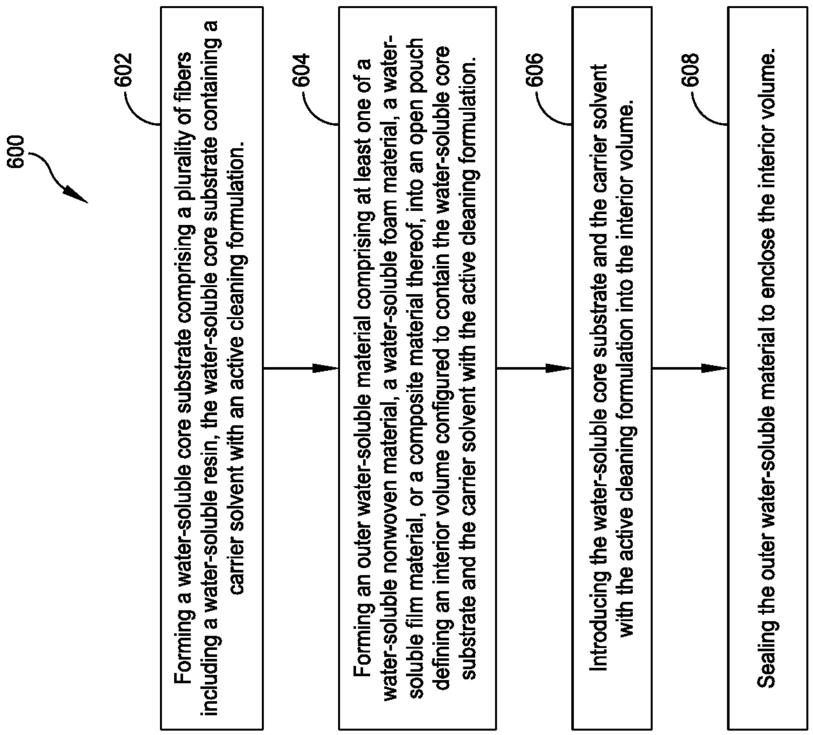
FIG. 15 illustrates an example method for making a SUD article, according to an example embodiment.

Referring now to FIG. 15, in example embodiments, a method 600 for making a single unit dose article containing a carrier solvent with an active cleaning formulation includes any or all of steps 602, 604, 606, and 608. At step 602, a water-soluble core substrate comprising a water-soluble resin is formed. In example embodiments, forming a water-soluble core substrate comprising a water-soluble resin, the water-soluble core substrate containing a carrier solvent with an active cleaning formulation, includes forming one of a water-soluble nonwoven substrate, a water-soluble foam substrate, or a water-soluble film substrate. In example embodiments, the water-soluble nonwoven substrate is formed into a plurality of layers with the carrier solvent with the active cleaning formulation disposed between adjacent layers of the plurality of layers. The plurality of layers may be formed by folding a continuous sheet of a water-soluble nonwoven web in a serpentine construction or by stacking a plurality of separate substrate sheets in a plied construction, for example.

The water-soluble core substrate contains a carrier solvent with an active cleaning formulation, such as described herein. In example embodiments, the water-soluble core substrate is saturated with the carrier solvent with the active cleaning formulation, the carrier solvent with the active cleaning formulation is disposed on a surface of the water-soluble core substrate, a surface of the water-soluble core substrate is coated with the carrier solvent with the active cleaning formulation, the carrier solvent with the active cleaning formulation is embedded in the water-soluble core substrate, and/or the water-soluble core substrate is impregnated with the carrier solvent with the active cleaning formulation.

In example embodiments, method 600 includes applying the carrier solvent comprising glycerol with the active cleaning formulation to a surface of the water-soluble nonwoven sheet, e.g., a 30 gsm water-soluble nonwoven sheet, to a maximum coat weight of 120 gsm for the carrier solvent with the active cleaning formulation, which limits an amount of active cleaning formulation that can be applied to each water-soluble nonwoven sheet and dictates the number of plies of water-soluble nonwoven sheets required to construct the water-soluble core substrate. The carrier solvent comprising a maximum amount of solvent, e.g., glycerol solvent, with the active cleaning formulation is applied to the surface of the water-soluble nonwoven substrate until the single unit dose article comprises 55% by weight of the active cleaning formulation. In example embodiments, the water-soluble nonwoven substrate is formed into a number of layers such that the single unit dose article comprises 55% by weight of the active cleaning formulation.

In example embodiments, method 600 includes forming a water-soluble core substrate comprising a plurality of fibers including a water-soluble resin. The water-soluble core substrate contains a carrier solvent with an active cleaning formulation. Upon contact of the carrier solvent with at least one fiber of the plurality of fibers, the at least one fiber or the water-soluble core substrate exhibits a degree of shrinkage of 0.5% to 65%. In example embodiments, method 600 includes contacting the carrier solvent with the water-soluble solid substrate, wherein upon contact with the carrier solvent, the at least one fiber or the substrate exhibits a degree of shrinkage of 0.5% to 65%. In example embodiments, when the water-soluble core substrate is contacted with water having a temperature greater than 10° C., the water-soluble core substrate is soluble to release the active cleaning formulation from the water-soluble core substrate. Further, when the water-soluble core substrate is contacted with water having a temperature of at least 10° C. for not more than 300 seconds, the active cleaning formulation is substantially released from the water-soluble core substrate.

At step 604, an outer water-soluble material is formed into an open pouch defining an interior volume configured to contain the water-soluble core substrate and the carrier solvent with the active cleaning formulation. The outer water-soluble material includes a water-soluble nonwoven material, a water-soluble foam material, a water-soluble film material, or a composite material including a water-soluble nonwoven material, a water-soluble foam material, and/or a water-soluble film material. In example embodiments, the outer water-soluble material includes a dispersible barrier coating layer on an inner surface of the outer water-soluble material facing the water-soluble core substrate, e.g., formed of a film layer, formed by bonding the inner surface of the outer water-soluble material to form a substantially continuous smooth surface, or formed by applying a wax coating or a hydrophobic material to the inner surface of the outer water-soluble material. Any suitable dispersible barrier coating is applied to the outer water-soluble material to facilitate decreasing hand transfer of the active cleaning formulation, e.g., laundry detergent, to a hand of user. At step 606, the water-soluble core substrate and the carrier solvent with the active cleaning formulation are introduced into the interior volume. In example embodiments, at step 608, the outer water-soluble material is sealed to enclose the interior volume. For example, a seal is formed at a bonding interface to enclose the water-soluble core substrate and the active cleaning formulation in the interior volume.

In example embodiments, forming a water-soluble core substrate comprising a plurality of fibers including a water-soluble resin comprises forming a water-soluble nonwoven substrate into a plurality of layers, with the carrier solvent and the active cleaning formulation disposed between adjacent layers of the plurality of layers. In example embodiments, a continuous sheet of a water-soluble nonwoven web is folded in a serpentine construction to form the plurality of layers or a plurality of separate substrate sheets is stacked in a plied construction. A carrier solvent comprising glycerol with the active cleaning formulation is applied to a surface of the water-soluble nonwoven substrate to a maximum coat weight of 120 gsm for the carrier solvent with the active cleaning formulation until the single unit dose article comprises 55% by weight of the active cleaning formulation, for example. In example embodiments, the water-soluble nonwoven substrate is formed into 25 layers to 110 layers.

In example embodiments, a method for making a single unit dose article containing a carrier solvent with an active cleaning formulation includes forming a water-soluble foam substrate including a water-soluble resin. The water-soluble foam substrate contains a carrier solvent with an active cleaning formulation, wherein upon contact of the carrier solvent with the water-soluble foam substrate, the water-soluble foam substrate exhibits a carrier solvent absorptive capacity of 1% to 1300%. For example, the water-soluble foam substrate exhibits a carrier solvent absorptive capacity in a range of from 10% to 1000%, from 10% to 500%, from 10% to 200%, or from 10% to 100%. In example embodiments, an outer water-soluble material comprising at least one of a water-soluble nonwoven material, a water-soluble foam material, a water-soluble film material, or a composite material thereof, is formed into an open pouch defining an interior volume configured to contain the water-soluble foam substrate and the carrier solvent with the active cleaning formulation. The water-soluble foam substrate and the carrier solvent with the active cleaning formulation are introduced into the interior volume and, in example embodiments, the outer water-soluble material is sealed to enclose the interior volume.

Water-Soluble Film and Fiber-Forming Materials

Water-soluble polymers for use in the water-soluble fibers, water-soluble nonwoven webs, water-soluble foams, and water-soluble films include, but are not limited to, a polyvinyl alcohol (PVOH) polymer, polyacrylate, water-soluble acrylate copolymer, polyvinyl pyrrolidone, polyethyleneimine, pullulan, water-soluble natural polymers including, but not limited to, guar gum, gum Acacia, xanthan gum, carrageenan, and starch, water-soluble polymer derivatives including, but not limited to, modified starches, ethoxylated starch, and hydroxypropylated starch, copolymers of the forgoing and combinations of any of the foregoing. Other water-soluble polymers can include polyalkylene oxides, polyacrylamides, polyacrylic acids and salts thereof, celluloses, cellulose ethers, cellulose esters, cellulose amides, polyvinyl acetates, polycarboxylic acids and salts thereof, polyaminoacids, polyamides, gelatines, methylcelluloses, carboxymethylcelluloses and salts thereof, dextrins, ethylcelluloses, hydroxyethyl celluloses, hydroxypropyl methylcelluloses, maltodextrins, polymethacrylates, and combinations of any of the foregoing. Such water-soluble polymers, whether PVOH polymers or otherwise, are commercially available from a variety of sources.

In general, the fibers, foams, and films as described herein include polyvinyl alcohol. Polyvinyl alcohol is a synthetic polymer generally prepared by the alcoholysis, usually termed "hydrolysis" or "saponification," of polyvinyl acetate. Fully hydrolyzed PVOH, where virtually all the acetate groups have been converted to alcohol groups, is a strongly hydrogen-bonded, highly crystalline polymer which dissolves only in hot water—greater than about 140° F. (about 60° C.). If a sufficient number of acetate groups are allowed to remain after the hydrolysis of polyvinyl acetate, that is the PVOH polymer is partially hydrolyzed, then the polymer is more weakly hydrogen-bonded, less crystalline, and is generally soluble in cold water—less than about 50° F. (about 10° C.). As such, the partially hydrolyzed polymer is a vinyl alcohol-vinyl acetate copolymer that is a PVOH copolymer, but is commonly referred to as PVOH.

In certain embodiments, suitable examples of such a polymer include, without limitation, a polyvinyl alcohol homopolymer, a polyvinyl alcohol copolymer, a modified polyvinyl alcohol copolymer, and combinations thereof. For example, the polyvinyl alcohol copolymer is a copolymer of vinyl acetate and vinyl alcohol in some embodiments. For example, in some embodiments, the modified polyvinyl alcohol copolymer comprises an anionically modified copolymer, which may be a copolymer of vinyl acetate and vinyl alcohol further comprising additional groups, such as a carboxylate, a sulfonate, or combinations thereof. As such, the partially hydrolyzed polymer is a vinyl alcohol-vinyl acetate copolymer that is a PVOH copolymer, but is commonly referred to as "polyvinyl alcohol (PVOH)" or "PVOH polymer." For brevity, the term "PVOH polymer" used herein is understood to encompass a homopolymer, a copolymer, and a modified copolymer comprising vinyl alcohol moieties, for example, 50% or higher of vinyl alcohol moieties. The term "PVOH fiber" used herein refers to fiber comprising a PVOH polymer.

The fibers, foams, and/or films described herein can include one or more polyvinyl alcohol (PVOH) homopolymers, one or more polyvinyl alcohol copolymers, one or more modified polyvinyl alcohol copolymers, or a combination thereof. As used herein, the term "homopolymer" generally includes polymers having a single type of monomeric repeating unit (e.g., a polymeric chain consisting of or consisting essentially of a single monomeric repeating unit). For the particular case of PVOH, the term "PVOH polymer") further includes copolymers consisting of a distribution of vinyl alcohol monomer units and vinyl acetate monomer units, depending on the degree of hydrolysis (e.g., a polymeric chain consisting of or consisting essentially of vinyl alcohol and vinyl acetate monomer units). In the limiting case of 100% hydrolysis, a PVOH homopolymer can include a true homopolymer having only vinyl alcohol units. In some embodiments, the fibers, foams, and/or films of the disclosure include polyvinyl alcohol copolymers. In some embodiments, the fibers, foams, and/or films of the disclosure include cold-water soluble or hot water-soluble polyvinyl alcohol copolymers.

Unless expressly indicated otherwise, the term "degree of hydrolysis" is understood as a percentage (e.g., a molar percentage) of hydrolyzed moieties among all hydrolyzable moieties of an initial polymer. For example, for a polymer comprising at least one of a vinyl acetate moiety or a vinyl alcohol moiety, partial replacement of an ester group in vinyl acetate moieties with a hydroxyl group occurs during hydrolysis, and a vinyl acetate moiety becomes a vinyl alcohol moiety. The degree of hydrolysis of a polyvinyl acetate homopolymer may be considered as zero, while the degree of hydrolysis of a polyvinyl alcohol homopolymer may be considered 100%. The degree of hydrolysis of a copolymer of vinyl acetate and vinyl alcohol is equal to a percentage of vinyl alcohol moieties among a total of vinyl acetate and vinyl alcohol moieties, and is between zero and 100%.

In some embodiments, the polyvinyl alcohol polymer includes a modified polyvinyl alcohol, for example, a copolymer. The modified polyvinyl alcohol can include a copolymer or higher polymer (e.g., ter-polymer) including one or more monomers in addition to the vinyl acetate/vinyl alcohol groups. Optionally, the modification is neutral, e.g., provided by an ethylene, propylene, N-vinylpyrrolidone or other non-charged monomer species. Optionally, the modification is a cationic modification, e.g., provided by a positively charged monomer species. Optionally, the modification is an anionic modification. Thus, in some embodiments, the polyvinyl alcohol polymer includes an anionic modified polyvinyl alcohol.

An anionic modified polyvinyl alcohol can include a partially or fully hydrolyzed PVOH copolymer that includes an anionic monomer unit, a vinyl alcohol monomer unit, and optionally a vinyl acetate monomer unit (i.e., when not completely hydrolyzed). In some embodiments, the modified PVOH copolymer can include two or more types of anionic monomer units. General classes of anionic monomer units which can be used for the PVOH copolymer include the vinyl polymerization units corresponding to sulfonic acid vinyl monomers and their esters, monocarboxylic acid vinyl monomers, their esters and anhydrides, dicarboxylic monomers having a polymerizable double bond, their esters and anhydrides, and alkali metal salts of any of the foregoing. Examples of suitable anionic monomer units include the vinyl polymerization units corresponding to vinyl anionic monomers including vinyl acetic acid, maleic acid, monoalkyl maleate, dialkyl maleate, maleic anhydride, fumaric acid, monoalkyl fumarate, dialkyl fumarate, itaconic acid, monoalkyl itaconate, dialkyl itaconate, citraconic acid, monoalkyl citraconate, dialkyl citraconate, citraconic anhydride, mesaconic acid, monoalkyl mesaconate, dialkyl mesaconate, glutaconic acid, monoalkyl glutaconate, dialkyl glutaconate, alkyl acrylates, alkyl alkacrylates, vinyl sulfonic acid, allyl sulfonic acid, ethylene sulfonic acid, 2-acrylamido-1-methyl propane sulfonic acid, 2-acrylamide-2-methylpropanesulfonic acid, 2-methylacrylamido-2-methylpropanesulfonic acid (AMPS), 2-sulfoethyl acrylate, alkali metal salts of the foregoing (e.g., sodium, potassium, or other alkali metal salts), esters of the foregoing (e.g., methyl, ethyl, or other $C_1$-$C_4$ or $C_6$ alkyl esters), and combinations of the foregoing (e.g., multiple types of anionic monomers or equivalent forms of the same anionic monomer). In some embodiments, the modified PVOH copolymer can include two or more types of monomer units selected from neutral, anionic, and cationic monomer units.

The level of incorporation of the one or more anionic monomer units in the PVOH copolymers is not particularly limited. In certain embodiments, the one or more anionic monomer units are present in the PVOH copolymer in an amount in a range of about 1 mol. % or 2 mol. % to about 6 mol. % or 10 mol. % (e.g., at least 1.0, 1.5, 2.0, 2.5, 3.0, 3.5, or 4.0 mol. % and/or up to about 3.0, 4.0, 4.5, 5.0, 6.0, 8.0, or 10 mol. % in various embodiments).

Polyvinyl alcohols can be subject to changes in solubility characteristics. The acetate group in the co-poly(vinyl acetate vinyl alcohol) polymer (PVOH copolymer) is known by those skilled in the art to be hydrolysable by either acid or alkaline hydrolysis. As the degree of hydrolysis increases, a polymer composition made from the PVOH copolymer will have increased mechanical strength but reduced solubility at lower temperatures (e.g., requiring hot water temperatures for complete dissolution). Accordingly, exposure of a PVOH copolymer to an alkaline environment (e.g., resulting from a laundry bleaching additive) can transform the polymer from one which dissolves rapidly and entirely in a given aqueous environment (e.g., a cold-water medium) to one which dissolves slowly and/or incompletely in the aqueous environment, potentially resulting in undissolved polymeric residue.

The degree of hydrolysis (DH) of the PVOH homopolymers and PVOH copolymers (including modified PVOH copolymers) included in the water-soluble fibers, foams, and films of the present disclosure can be in a range of about 75% to about 99.9% (e.g., about 79% to about 92%, about 75% to about 89%, about 80% to about 90%, about 88% to 92%, about 86.5% to about 89%, or about 88%, 90% or 92% such as for cold-water-soluble compositions; about 90% to about 99.9%, about 90% to about 99% about 92% to about 99%, about 95% to about 99%, about 98% to about 99%, about 98% to about 99.9%, about 96%, about 98%, about 99%, or greater than 99%). As the degree of hydrolysis is reduced, a fiber, foam, or film made from the polymer will have reduced mechanical strength but faster solubility at temperatures below about 20° C. As the degree of hydrolysis increases, a fiber, foam, or film made from the polymer will tend to be mechanically stronger and the thermoformability will tend to decrease. The degree of hydrolysis of the PVOH can be chosen such that the water-solubility of the polymer is temperature dependent, and thus the solubility of a film, foam, or fiber made from the polymer and additional ingredients is also influenced. In certain embodiments, the film, foam, and/or fibers are cold water-soluble. For a co-poly (vinyl acetate vinyl alcohol) polymer that does not include any other monomers (e.g., a copolymer not copolymerized with an anionic monomer) a cold water-soluble fiber, foam, or film, soluble in water at a temperature of less than 10° C., can include PVOH with a degree of hydrolysis in a range of about 75% to about 90%, about 75% to about 89%, or in a range of about 80% to about 90%, or in a range of about 85% to about 90%. In another embodiment, the fiber, foam, or film is hot water-soluble. For a co-poly(vinyl acetate vinyl alcohol) polymer that does not include any other monomers (e.g., a copolymer not copolymerized with an anionic monomer) a hot water-soluble fiber, foam, or film that is soluble in water at a temperature of at least about 60° C., can include PVOH with a degree of hydrolysis of at least about 98%. In embodiments, one of more of the plurality of fibers comprise a polyvinyl alcohol polymer having a degree of hydrolysis in a range of about 75% to about 99.9%. In embodiments, one or more of the plurality of fibers comprise a polyvinyl alcohol polymer having a degree of hydrolysis in a range of about 75% to about 98%. In embodiments, one of more of the plurality of fibers comprise a polyvinyl alcohol polymer having a degree of hydrolysis in a range of about 75% to about 89%. In embodiments, one of more of the plurality of fibers comprise a polyvinyl alcohol polymer having a degree of hydrolysis in a range of about 90% to about 99.9%. In embodiments, the water-soluble film comprises a polyvinyl alcohol copolymer or a modified PVOH copolymer having a degree of hydrolysis in a range of about 75% to about 99.9%. In embodiments, the water-soluble film comprises a polyvinyl alcohol homopolymer or a polyvinyl alcohol copolymer having a degree of hydrolysis in a range of about 75% to about 98%.

The degree of hydrolysis of a polymer blend can also be characterized by the arithmetic weighted, average degree of hydrolysis ($\overline{H^\circ}$). For example, $\overline{H}^\circ$ for a PVOH polymer that includes two or more PVOH polymers is calculated by the formula $\overline{H^\circ}=\Sigma(W_i \cdot H_i)$ where $W_i$ is the molar percentage of the respective PVOH polymer and $H_i$ is the respective degrees of hydrolysis. When a polymer is referred to as having (or not having) a specific degree of hydrolysis, the polymer can be a single polyvinyl alcohol polymer having the specified degree of hydrolysis or a blend of polyvinyl alcohol polymers having an average degree of hydrolysis as specified.

The viscosity of a PVOH polymer (μ) is determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20° C. All viscosities specified herein in Centipoise (cP) should be understood to refer to the viscosity of 4% aqueous polyvinyl alcohol solution at 20° C., unless specified otherwise. Similarly, when a polymer is described as having (or not having) a particular viscosity, unless specified otherwise, it is intended that the specified viscosity is the average viscosity for the polymer, which inherently has a corresponding molecular weight distribution, i.e., the weighted natural log average viscosity. It is well known in the art that the viscosity of PVOH polymers is correlated with the weight average molecular weight ($\overline{M}_w$) of the PVOH polymer, and often the viscosity is used as a proxy for the $\overline{M}_w$.

In embodiments, the PVOH resin may have a viscosity of about 1.0 to about 50.0 cP, about 1.0 to about 40.0 cP, or about 1.0 to about 30.0 cP, for example, about 4 cP, 8 cP, 15 cP, 18 cP, 23 cP, or 26 cP. In embodiments, the PVOH homopolymers and/or copolymers may have a viscosity of about 1.0 to about 40.0 cP, or about 5 cP to about 23 cP, for example, about 1 cP, 1.5 cP, 2 cP, 2.5 cP, 3 cP, 3.5 cP, 4 cP, 4.5 cP, 5 cP, 5.5 cP, 6 cP, 6.5 cP, 7 cP, 7.5 cP, 8 cP, 8.5 cP, 9 cP, 9.5 cP, 10 cP, 11 cP, 12 cP, 13 cP, 14 cP, 15 cP, 17.5 cP, 18 cP, 19 cP, 20 cP, 21 cP, 22 cP, 23 cP, 24 cP, 25 cP, 26 cP, 27 cP, 28 cP, 29 cP, 30 cP, 31 cP, 32 cP, 33 cP, 34 cP, 35 cP, or 40 cP. In embodiments, the PVOH homopolymers and/or copolymers may have a viscosity of about 21 cP to 26 cP. In embodiments, the PVOH homopolymers and/or copolymers can have a viscosity of about 5 cP to about 14 cP. In embodiments, the PVOH homopolymers and/or copolymers can have a viscosity of about 5 cP to about 23 cP.

The water-soluble polymers, whether polyvinyl alcohol polymers or otherwise, can be blended. When the polymer blend includes a blend of polyvinyl alcohol polymers, the PVOH polymer blend can include a first PVOH polymer ("first PVOH polymer") which can include a PVOH copolymer or a modified PVOH copolymer including one or more types of anionic monomer units (e.g., a PVOH ter- (or higher co-) polymer) and a second PVOH polymer ("second PVOH polymer") which can include a PVOH copolymer or a modified PVOH copolymer including one or more types of anionic monomer units (e.g., a PVOH ter- (or higher co-) polymer). In some embodiments, the PVOH polymer blend includes only the first PVOH polymer and the second PVOH polymer (e.g., a binary blend of the two polymers). Alternatively, or additionally, the PVOH polymer blend or a fiber, foam, or film made therefrom can be characterized as being free or substantially free from other polymers (e.g., other water-soluble polymers generally, other PVOH-based polymers specifically, or both). As used herein, "substantially free" means that the first and second PVOH polymers make up at least 95 wt. %, at least 97 wt. %, or at least 99 wt. % of the total amount of water-soluble polymers in the water-soluble fiber, foam, or film. In other embodiments, the water-soluble fiber, foam, or film can include one or more additional water-soluble polymers. For example, the PVOH polymer blend can include a third PVOH polymer, a fourth PVOH polymer, a fifth PVOH polymer, etc. (e.g., one or more additional PVOH copolymers or modified PVOH copolymers, with or without anionic monomer units). For example, the water-soluble film can include at least a third (or fourth, fifth, etc.) water-soluble polymer which is other than a PVOH polymer (e.g., other than PVOH copolymers or modified PVOH copolymers, with or without anionic monomer units). A PVOH homopolymer may also be included in each blend.

Biodegradability

Polyvinyl alcohol polymers are generally biodegradable as they decompose in the presence of water and enzymes under aerobic, anaerobic, soil, and compost conditions. In general, as the degree of hydrolysis of a polyvinyl alcohol polymer increases up to about 80%, the biodegradation activity of the polyvinyl alcohol polymer increases. Without intending to be bound by theory, it is believed that increasing the degree of hydrolysis above 80% does not appreciably affect biodegradability. Additionally, the stereoregularity of the hydroxyl groups of polyvinyl alcohol polymers has a large effect on the biodegradability activity level and the more isotactic the hydroxyl groups of the polymer sequence, the higher the degradation activity becomes. Without intending to be bound by theory, for soil and/or compost biodegradation, it is believed that a nonwoven web prepared from a polyvinyl alcohol fiber will have higher biodegradation activity levels relative to a water-soluble film prepared from a similar polyvinyl alcohol polymer, due to the increase in the polymer surface area provided by the nonwoven web relative to a film. Further, without intending to be bound by theory, it is believed that while the degree of polymerization of the polyvinyl alcohol polymer has little to no effect on the biodegradability of a film, foam, or nonwoven web prepared with the polymer, the polymerization temperature may have an effect on the biodegradability of a film, foam, or nonwoven because the polymerization temperature can affect the crystallinity and aggregating status of a polymer. As the crystallinity decreases, the polymer chain hydroxyl groups become less aligned in the polymer structure and the polymer chains become more disordered allowing for chains to accumulate as amorphous aggregates, thereby decreasing availability of ordered polymer structures such that the biodegradation activity is expected to decrease for soil and/or compost biodegradation mechanisms wherein the polymer is not dissolved. Without intending to be bound by theory, it is believed that because the stereoregularity of the hydroxyl groups of polyvinyl alcohol polymers has a large effect on biodegradability activity levels, the substitution of functionalities other than hydroxyl groups (e.g., anionic AMPS functional groups, carboxylate groups, or lactone groups) is expected to decrease the biodegradability activity level, relative to a polyvinyl alcohol copolymer having the same degree of hydrolysis, unless the functional group itself is also biodegradable, in which case biodegradability of the polymer can be increased with substitution. Further, it is believed that while the biodegradability activity level of a substituted polyvinyl alcohol can be less than that of the corresponding homopolymer or copolymer, the substituted polyvinyl alcohol will still exhibit biodegradability.

Methods of determining biodegradation activity are known in the art, for example, as described in Chiellini et al., Progress in Polymer Science, Volume 28, Issue 6, 2003, pp. 963-1014, which is incorporated herein by reference in its entirety. Further methods and standards can be found in ECHA's Annex XV Restriction Report—Microplastics, Version number 1, Jan. 11, 2019, which is incorporated herein by reference in its entirety. Suitable standards include OECD 301B (ready biodegradation), OECD 301B (enhanced biodegradation), OECD 302B (inherent biodegradation), OECD 311(anaerobic), and ASTM D5988 (soil).

In example embodiments, the fibers described herein can be of the standard ready biodegradation or enhanced degradation. As used herein, the term "ready biodegradation" refers to a standard that is met if the material (e.g., a fiber) reached 60% biodegradation (mineralization) within 28 days of the beginning of the test, according to the OECD 301B test as described in said ECHA's Annex XV. As used herein, the term "enhanced biodegradation" refers to a standard that is met if the material (e.g., a fiber) reaches 60% biodegradation within 60 days from the beginning of the test, according to the OECD 301B test as described in said ECHA's Annex XV. In example embodiments, the fibers meet the standards of ready biodegradation. In example embodiments, the films herein meet the standards of ready biodegradation or enhanced degradation. In example embodiments, the laminate (nonwoven and film or foam and film) as used herein meet the standards of ready biodegradation or enhanced biodegradation.

Carrier Solvent

In example embodiments, the carrier solvent comprises a polar solvent. In example embodiments, the solvent comprises octanol, heptanol, hexanol, pentanol, butanol, propanol, tetrahydrofuran, dichloromethane, acetone, ethanol, N-methylpyrrolidone, methanol, acetonitrile, ethylene glycol, N,N-dimethylformamide, glycerol, dimethyl sulfoxide, formic acid, water, or a combination thereof. In example embodiments, the carrier solvent comprises n-octanol, n-heptanol, n-hexanol, n-pentanol, n-butanol, isobutanol, sec-butanol, tent-butanol, n-propanol, isopropanol, acetone, ethanol, N-methylpyrrolidone, methanol, acetonitrile, N,N-dimethylformamide, dimethyl sulfoxide, formic acid, water, or a combination thereof. In example embodiments, the carrier solvent comprises n-propanol, acetone, ethanol, N-methylpyrrolidone, methanol, acetonitrile, N,N-dimethylformamide, dimethyl sulfoxide, formic acid, water, or a combination thereof. In example embodiments, the carrier solvent comprises an alcohol that is a liquid under the admixing conditions. In example embodiments, the carrier solvent comprises methanol. In example embodiments, the carrier solvent comprises methanol and at least one additional solvent. In embodiments, the carrier solvent comprises methanol and water. In example embodiments, the carrier solvent comprises at least one of butanol, pentanol, hexanol, heptanol, and octanol in combination with water. In example embodiments, the carrier solvent comprises DMSO and water. In example embodiments, the carrier solvent comprises DMSO and water and the DMSO and water are provided in a weight ratio of about 40/60 to 80/20. Without intending to be bound by theory, it is believed that as the amount of water increases above 60% or the amount of DMSO increases above about 80%, the interaction of the respective solvents with polyvinyl alcohol increases, resulting in increased swelling and gelling of the polymer.

In example embodiments, the carrier solvent comprises a nonpolar solvent. In example embodiments, the carrier solvent comprises hexanes, cyclohexane, methylpentane, pentane, cyclopropane, dioxane, benzene, pyridine, xylene, toluene, diethyl ether, chloroform, or a combination thereof.

In example embodiments, the carrier solvent comprises a mixture of a first carrier solvent and a second carrier solvent. In example embodiments, the first carrier solvent comprises a polar solvent and the second carrier solvent comprises a nonpolar solvent. In example embodiments, the first carrier solvent has a first dielectric constant and the second carrier solvent has a second dielectric constant and the dielectric constant of the first carrier solvent is different from, e.g., higher than, the dielectric constant of the second carrier solvent. In example embodiments, the first dielectric constant is 5 or less, 4 or less, 3 or less, or 2 or less. In example embodiments, the second dielectric constant is greater than 5, greater than 7.5, greater than 10, greater than 15, greater than 18, greater than 20, greater than 25, or greater than 30. In example embodiments, the difference between the first dielectric constant and the second dielectric constant is at least 3, at least 5, at least 8, or at least 10. In example embodiments, wherein the carrier solvent comprises a mixture of a first carrier solvent and a second carrier solvent, the first carrier solvent and the second carrier solvent can be provided in any ratio provided the fiber is not soluble in the mixture prior to treatment, during treatment, and after treatment. In example embodiments, the first carrier solvent and the second carrier solvent can be provided in a weight ratio of about 99/1 to about 1/99, about 95/5 to about 5/95, about 90/10 to 10/90, about 85/15 to about 15/85, about 80/20 to about 20/80, about 75/25 to about 25/75, about 70/30 to about 30/70, about 65/35 to about 35/65, about 60/40 to about 40/60, about 55/45 to about 45/55, or about 50/50.

Active Cleaning Formulations

In example embodiments, the SUD article and, more specifically, the water-soluble core substrate, is configured to contain one or more active cleaning formulations, such as a laundry detergent formulation. In example embodiments, the active cleaning formulation is disposed on or coats one or more surfaces of the water-soluble core substrate or is embedded in and/or adhered to the water-soluble core substrate. The water-soluble core substrate may include a single layer, for example, a single layer foam core substrate, or may include a plurality of layers, for example, a sheet of nonwoven core substrate folded in a serpentine arrangement or plied to form layers with the active cleaning formulation disposed between adjacent layers of the water-soluble nonwoven core substrate, for example. As an example, the active cleaning formulation may include, without limitation, an active, a laundry detergent, a soap, a fabric softener, a bleaching agent, a laundry booster, a stain remover, an optical brightener, or a water softener. Other examples include a dish detergent, soap or cleaner, a shampoo, a conditioner, a body wash, a face wash, a skin lotion, a skin treatment, a body oil, fragrance, a hair treatment, a bath salt, an essential oil, a bath bomb, or an enzyme. In certain example embodiments, the water-soluble core substrate is enclosed by a water-soluble nonwoven material, a water-soluble foam material, and/or a water-soluble film material.

Auxiliary Agents

In general, along with the film-, foam-, and/or fiber-forming material, the fibers, nonwoven webs, foam, and/or water-soluble films of the disclosure can include auxiliary agents such as, but not limited to, plasticizers, plasticizer compatibilizers, surfactants, lubricants, release agents, fillers, extenders, cross-linking agents, antiblocking agents, antioxidants, detackifying agents, antifoams, nanoparticles such as layered silicate-type nanoclays (e.g., sodium montmorillonite), bleaching agents (e.g., sodium metabisulfite, sodium bisulfite or others), aversive agents such as bitterants (e.g., denatonium salts such as denatonium benzoate, denatonium saccharide, and denatonium chloride; sucrose octaacetate; quinine; flavonoids such as quercetin and naringen; and quassinoids such as quassin and brucine) and pungents (e.g., capsaicin, piperine, allyl isothiocyanate, and resinferatoxin), and other functional ingredients, in amounts suitable for their intended purposes. As used herein and unless specified otherwise, "auxiliary agents" include secondary additives, processing agents, and active agents. Specific such auxiliary agents can be selected from those suitable for use in water-soluble fibers, non-water-soluble fibers, nonwoven webs, foams, or those suitable for use in water-soluble films.

In example embodiments, the fibers, foams, and/or films can be free of auxiliary agents. As used herein and unless specified otherwise, "free of auxiliary agents" with respect to the fiber means that the fiber includes less than about 0.01 wt. %, less than about 0.005 wt. %, or less than about 0.001 wt. % of auxiliary agents, based on the total weight of the fiber. As used herein and unless specified otherwise, "free of auxiliary agents" with respect to the film or nonwoven web means that the nonwoven web includes less than about 0.01 wt. %, less than about 0.005 wt. %, or less than about 0.001 wt. % of auxiliary agents, based on the total weight of the film, foam, or nonwoven web. In embodiments, the water-soluble fibers comprise a plasticizer. In embodiments, the water-soluble fibers comprise a surfactant. In embodiments, the non-water-soluble fibers comprise a plasticizer. In embodiments, the non-water-soluble fibers comprise a surfactant. In embodiments, the nonwoven web includes a plasticizer. In embodiments, the nonwoven web includes a surfactant.

A plasticizer is a liquid, solid, or semi-solid that is added to a material (usually a resin or elastomer) making that material softer, more flexible (by decreasing the glass-transition temperature of the polymer), and easier to process. A polymer can alternatively be internally plasticized by chemically modifying the polymer or monomer. In addition, or in the alternative, a polymer can be externally plasticized by the addition of a suitable plasticizing agent. Water is recognized as a very efficient plasticizer for PVOH polymers and other polymers including, but not limited to, water-soluble polymers; however, the volatility of water makes its utility limited because polymer films need to have at least some resistance (robustness) to a variety of ambient conditions including low and high relative humidity.

The plasticizer can include, without limitation, glycerin, diglycerin, sorbitol, xylitol, maltitol, ethylene glycol, diethylene glycol, triethylene glycol, dipropylene glycol, tetraethylene glycol, propylene glycol, polyethylene glycols up to 1000 MW, neopentyl glycol, trimethylolpropane, polyether polyols, sorbitol, 2-methyl-1,3-propanediol (MPDiolg), ethanolamines, and a mixture thereof.

Surfactants for use in films are well known in the art and can suitably be used in the fibers, foam, films, and/or compositions of the disclosure. Optionally, surfactants are included to aid in the dispersion of the fibers during carding. Optionally, surfactants are included as cleaning aids. Suitable surfactants can include the nonionic, cationic, anionic and zwitterionic classes. Suitable surfactants include, but are not limited to, sodium alkyl sulfates (sodium dodecyl sulfate) and other surfactants suitable for laundry applications as cleaning aids, propylene glycols, diethylene glycols, monoethanolamine, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), alkali metal salts of higher fatty acids containing about 8 to 24 carbon atoms, alkyl sulfates, alkyl polyethoxylate sulfates and alkylbenzene sulfonates (anionics), and amine oxides, N-alkylbetaines and sulfobetaines (zwitterionics).

Other suitable surfactants include dioctyl sodium sulfosuccinate, lactylated fatty acid esters of glycerin and propylene glycol, lactylic esters of fatty acids, sodium alkyl sulfates, polysorbate 20, polysorbate 60, polysorbate 65, polysorbate 80, lecithin, acetylated fatty acid esters of glycerin and propylene glycol, and odium lauryl sulfate, acetylated esters of fatty acids, myristyl dimethylamine oxide, trimethyl tallow alkyl ammonium chloride, quaternary ammonium compounds, alkali metal salts of higher fatty acids containing about 8 to 24 carbon atoms, alkyl sulfates, alkyl polyethoxylate sulfates, alkylbenzene sulfonates, monoethanolamine, lauryl alcohol ethoxylate, propylene glycol, diethylene glycol, sodium cocoyl isethionate, sodium lauryl sulfate, glucotain, phoenamids, cola lipid, cocamides, such as cocamide ethanolamines, ethylene oxide based surfactants, saponified oils of avocado and palm, salts thereof and combinations of any of the foregoing. In embodiments, the surfactant comprises a cocamide. Without intending to be bound by theory, it is believed that a cocamide can aid in foam formation, enhancing the foaming experience of an article comprising a personal care composition. In various embodiments, the amount of surfactant in the fiber is in a range of about 0.01 wt. % to about 10 wt. %, about 0.1 wt. % to about 5 wt. %, about 1.0 wt. % to about 2.5 wt. %, about 0.01 wt. % to about 1.5 wt. %, about 0.1 wt. % to about 1 wt. %, about 0.01 wt. % to 0.25 wt. %, or about 0.10 wt. % to 0.20 wt. %. In various embodiments, the amount of surfactant in a personal care composition contained within the pouch can be in a range of about 5 wt. % to about 50 wt. %, about 10 wt. % to about 45 wt. %, or about 10 wt. % to about 40 wt. %.

In embodiments, the nonwoven webs, foam, and/or films of the disclosure can further comprise auxiliary agents such as one or more auxiliary agents in the group of: an exfoliant (chemical exfoliants and mechanical exfoliants), a fragrance and/or perfume microcapsule, an aversive agent, a surfactant, a colorant, an enzyme, a skin conditioner, a de-oiling agent, and a cosmetic agent.

In embodiments, an auxiliary agent is provided in or on one or more of the nonwoven web, the foam, the plurality of fibers, and the water-soluble film. In embodiments, an active cleaning formulation is provided on or in one or more of the group of the nonwoven web, the plurality of fibers, and the water-soluble film. In embodiments, one or more auxiliary agents can be provided on the surface of the nonwoven web. In embodiments, one or more auxiliary agents can be dispersed among the fibers of the nonwoven web. In embodiments, one or more auxiliary agents can be dispersed on a face of the nonwoven web. In embodiments, one or more auxiliary agents can be dispersed in the fibers. In embodiments, one or more auxiliary agents can be dispersed on the fibers. In embodiments, one or more auxiliary agents can be provided on a face of the water-soluble film. In embodiments, one or more auxiliary agents can be dispersed within the water-soluble film. In embodiments, the nonwoven web in the form of a pouch has an exterior face facing away from the interior volume, and an active cleaning formulation is provided on the exterior face. In embodiments, the nonwoven web in the form of a pouch has an exterior face facing away from the interior volume, and one or more auxiliary agents is provided on the exterior face.

The chemical exfoliants, mechanical exfoliants, fragrances and/or perfume microcapsules, aversive agents, surfactants, colorants, proteins, peptides, enzymes, skin conditioners, de-oiling agents, cosmetic agents, or a combination thereof, when present, can be provided in an amount of at least about 0.1 wt. %, or in a range of about 0.1 wt. % to about 99 wt. % based on the weight of the polymeric mixture (e.g., fiber-forming material or film-forming material). In embodiments, the chemical exfoliants, mechanical exfoliants, fragrances and/or perfume microcapsules, aversive agents, surfactants, colorants, enzymes, skin conditioners, de-oiling agents, and/or cosmetic agents can be provided in an amount sufficient to provide additional functionality to the fiber and/or film, such as exfoliation of human skin. The chemical exfoliants, mechanical exfoliants, fragrances and/or perfume microcapsules, aversive agents, surfactants, colorants, enzymes, skin conditioners, de-oiling agents, cosmetic agents, or a combination thereof, can take any desired form, including as a solid (e.g., powder, granulate, crystal, flake, or ribbon), a liquid, a mull, a paste, a gas, etc., and optionally can be encapsulated, such as microcapsules.

In certain embodiments, the nonwoven web, foam, and/or film can comprise an enzyme. Suitable enzymes include enzymes categorized in any one of the six conventional Enzyme Commission (EC) categories, i.e., the oxidoreductases of EC 1 (which catalyze oxidation/reduction reactions), the transferases of EC 2 (which transfer a functional group, e.g., a methyl or phosphate group), the hydrolases of EC 3 (which catalyze the hydrolysis of various bonds), the lyases of EC 4 (which cleave various bonds by means other than hydrolysis and oxidation), the isomerases of EC 5 (which catalyze isomerization changes within a molecule) and the ligases of EC 6 (which join two molecules with covalent bonds). Examples of such enzymes include dehydrogenases and oxidases in EC 1, transaminases and kinases in EC 2, lipases, cellulases, amylases, mannanases, and peptidases (a.k.a. proteases or proteolytic enzymes) in EC 3, decarboxylases in EC 4, isomerases and mutases in EC 5 and synthetases and synthases of EC 6. Suitable enzymes from each category are described in, for example, U.S. Pat. No. 9,394,092, the entire disclosure of which is herein incorporated by reference. In certain embodiments, enzymes can include bromeline (pineapple extract), papain (papaya), ficin (fig), actinidin (kiwi), hyaluronidase, lipase, peroxidase, superoxide dismutase, tyrosinase, alkaline phosphatase, or a combination thereof. In embodiments, the enzyme can be encapsulated in the form of, for example, nanoemulsions, nanocapsules, granules or a combination thereof.

Enzymes for use in laundry and dishwashing applications can include one or more of protease, amylase, lipase, dehydrogenase, transaminase, kinase, cellulase, mannanase, peptidase, decarboxylase, isomerase, mutase, synthetase, synthase, and oxido-reductase enzymes, including oxido-reductase enzymes that catalyze the formation of bleaching agents.

It is contemplated that an enzyme for use herein can come from any suitable source or combination of sources, for example, bacterial, fungal, plant, or animal sources. In one embodiment, a mixture of two or more enzymes will come from at least two different types of sources. For example, a mixture of protease and lipase can come from a bacterial (protease) and fungal (lipase) sources.

Optionally, an enzyme for use herein, including but not limited to any enzyme class or member described herein, is one which works in alkaline pH conditions, e.g., a pH in a range of about 8 to about 11. Optionally, an enzyme for use herein, including but not limited to any enzyme class or member described herein, is one which works in a temperature in a range of about 5° C. to about 45° C.

In embodiments, the nonwoven web, foam, and/or film can comprise a protein and/or peptide. Suitable proteins and/or peptides can include, but are not limited to, collagen and/or collagen peptides, or amino acids, for example, aspartic acid, glutamic acid, serine, histidine, glycine, threonine, arginine, alanine, tyrosine, cysteine, valine, methionine, phenylalanine, isoleucine, leucine, lysine, hydroxyproline, or proline.

In embodiments, the nonwoven web, foam, and/or film can comprise a colorant. Suitable colorants can include an indicator dye, such as a pH indicator (e.g., thymol blue, bromothymol, thymolphthalein, and thymolphthalein), a moisture/water indicator (e.g., hydrochromic inks or leuco dyes), or a thermochromic ink, wherein the ink changes color when temperature increases and/or decreases. Suitable colorants include, but are not limited to, a triphenylmethane dye, an azo dye, an anthraquinone dye, a perylene dye, an indigoid dye, a food, drug and cosmetic (FD&C) colorant, an organic pigment, an inorganic pigment, or a combination thereof. Examples of colorants include, but are not limited to, FD&C Red #40; Red #3; FD&C Black #3; Black #2; Mica-based pearlescent pigment; FD&C Yellow #6; Green #3; Blue #1; Blue #2; titanium dioxide (food grade); brilliant black; and a combination thereof. Other examples of suitable colorants can be found in U.S. Pat. No. 5,002,789, hereby incorporated by reference in its entirety.

Other embodiments can include one or more fragrances in the nonwoven webs, foams, and/or films of the disclosure. As used herein, the term "fragrance" refers to any applicable material that is sufficiently volatile to produce a scent. Embodiments including fragrances can include fragrances that are scents pleasurable to humans, or alternatively fragrances that are scents repellant to humans, animals, and/or insects. Suitable fragrances include, but are not limited to, fruits including, but not limited to, lemon, apple, cherry, grape, pear, pineapple, orange, strawberry, raspberry, musk, and flower scents including, but not limited to, lavender-like, rose-like, iris-like and carnation-like. Optionally, the fragrance is one which is not also a flavoring. Other fragrances include herbal scents including, but not limited to, rosemary, thyme, and sage; and woodland scents derived from pine, spruce, and other forest smells. Fragrances may also be derived from various oils, including, but not limited to, essential oils, or from plant materials including, but not limited to, peppermint, spearmint, and the like or any combination thereof. Suitable fragrant oils can be found in U.S. Pat. No. 6,458,754, hereby incorporated by reference in its entirety. Suitable fragrant oils include, but are not limited to, 4-(2,2,6-trimethylcyclohex-1-enyl)-2-en-4-one, acetaldehyde phenyletheyl propyl acetal, 2,6,10-trimethyl-9-undecenal, hexanoic acid 2-propenyl ester, 1-octen-3-ol, trans-anethole, iso butyl (z)-2-methyl-2-butenoate, anisaldehyde diethyl acetal, 3-methyl-5-propyl-cyclohezen-1-one, 2,4-dimethyl-3-cyclohexene-1-carbaldehyde, trans-4-decenal, decanal, 2-pentylcyclopentanone, ethyl anthranilate, eugenol, 3-(3-isopropylphenyl)butanoal, methyl 2-octynoate, isoeugenol, cis-3-hexenyl methyl carbonate, linalool, methyl-2-nonynonate, benzoic acid 2-hydroxymethyl ester, nonal, octanal, 2-nonennitrile, 4-nonanolide, 9-decen-1-ol, and 10-undecen-1-al. Applicable fragrances can also be found in U.S. Pat. Nos. 4,534,981; 5,112,688; 5,145,842; 6,844,302; and Perfumes Cosmetics and Soaps, Second Edition, edited by W. A. Poucher, 1959, all hereby incorporated by reference in their entireties. These fragrances include acacia, cassie, chypre, cyclamen, fern, gardenia, hawthorn, heliotrope, honeysuckle, hyacinth, jasmine, lilac, lily, magnolia, mimosa, narcissus, freshly-cut hay, orange blossom, orchids, reseda, sweet pea, trefle, tuberose, vanilla, violet, wallflower, and the like, or any combination thereof.

Fragrances can include perfumes. The perfume may comprise neat perfume, encapsulated perfume, or mixtures thereof. In example embodiments, the perfume includes neat perfume. A portion of the perfume may be encapsulated in a core-shell encapsulate. In other embodiments, the perfume will not be encapsulated in a core/shell encapsulate.

As used herein, the term "perfume" encompasses the perfume raw materials (PRMs) and perfume accords. The term "perfume raw material" as used herein refers to compounds having a molecular weight of at least about 100 g/mol and which are useful in imparting an odor, fragrance, essence or scent, either alone or with other perfume raw materials. As used herein, the terms "perfume ingredient" and "perfume raw material" are interchangeable. The term "accord" as used herein refers to a mixture of two or more PRMs. In embodiments, any of the perfume accords, perfume raw materials, or fragrances can be encompassed in a microcapsule, termed "perfume microcapsules" as used herein.

Typical PRM comprise inter alia alcohols, ketones, aldehydes, esters, ethers, nitrites, and alkenes, such as terpene. A listing of common PRMs can be found in various reference sources, for example, "Perfume and Flavor Chemicals," Vols. I and II; Steffen Arctander Allured Pub. Co. (1994) and "Perfumes: Art, Science and Technology," Miller, P. M. and Lamparsky, D., Blackie Academic and Professional (1994). The PRMs are characterized by their boiling points (B.P.) measured at the normal pressure (760 mm Hg), and their octanol/water partitioning coefficient (P). Based on these characteristics, the PRMS may be categorized as Quadrant I, Quadrant II, Quadrant III, or Quadrant IV perfumes.

In embodiments, the nonwoven web, foam, and/or film can include an exfoliant. In embodiments, the exfoliant can comprise a chemical exfoliant or a mechanical exfoliant. Suitable mechanical exfoliants for use herein can include, but are not limited to, apricot shells, sugar, oatmeal, salt, silica, diatomaceous earth, clay, aluminum hydrates, PVOH microbeads, pumice, or a combination thereof. Suitable chemical exfoliants for use herein can include, but are not limited to, alpha hydroxyl acid, beta hydroxyl acid, enzyme, salicylic acid, glycolic acid, citric acid, malic acid, or a combination thereof.

In certain embodiments, the aversive agents, surfactants, colorants, enzymes, skin conditioners, de-oiling agents, cosmetic agents, or a combination thereof, are encapsulated, allowing for controlled release. Suitable microcapsules can include or be made from one or more of melamine formaldehyde, polyurethane, urea formaldehyde, chitosan, polymethyl methacrylate, polystyrene, polysulfone, poly tetrahydrofuran, gelatin, gum arabic, starch, polyvinyl pyrrolidone, carboxymethylcellulose, hydroxyethylcellulose, methylcellulose, arabinogalactan, polyvinyl alcohol, polyacrylic acid, ethylcellulose, polyethylene, polymethacrylate, polyamide, poly (ethylenevinyl acetate), cellulose nitrate, silicones, poly(lactideco-glycolide), paraffin, carnauba, spermaceti, beeswax, stearic acid, stearyl alcohol, glyceryl stearates, shellac, cellulose acetate phthalate, zein, and combinations thereof. In one type of embodiment, the microcapsule is characterized by a mean particle size (e.g., Dv50) of at least about 0.1 micron, or in a range of about 0.1 micron to about 200 microns, for example. In alternate embodiments, the microcapsules can form agglomerates of individual particles, for example wherein the individual particles have a mean particle size of at least about 0.1 micron, or in a range of about 0.1 micron to about 200 microns.

Water-Soluble Fibers

Water-soluble fibers include fibers and/or fiber-forming materials made of any material that, when provided as the sole resin in a film or foam, or sole fiber-forming material in a nonwoven, the film, foam, or nonwoven dissolves in 300 seconds or less at temperatures of 80° C. or less, as determined by MSTM-205. The water-soluble fibers can include a single water-soluble polymer or a blend of water-soluble polymers. Suitable water-soluble polymers include, but are not limited to, polyvinyl alcohol homopolymer, polyvinyl alcohol copolymer, modified polyvinyl alcohol copolymer, polyacrylate, water-soluble acrylate copolymer, polyvinyl pyrrolidone, polyethyleneimine, pullulan, water-soluble natural polymer including, but not limited to, guar gum, gum Acacia, xanthan gum, carrageenan, and starch, water-soluble polymer derivatives including, but not limited to, modified starches, ethoxylated starch, and hydroxypropylated starch, copolymers of the forgoing and combinations of any of the foregoing. Yet other water-soluble fibers can include polyalkylene oxides, polyacrylamides, polyacrylic acids and salts thereof, celluloses, cellulose ethers, cellulose esters, cellulose amides, polyvinyl acetates, polycarboxylic acids and salts thereof, polyaminoacids, polyamides, gelatines, methylcelluloses, carboxymethylcelluloses and salts thereof, dextrins, ethylcelluloses, hydroxyethyl celluloses, hydroxypropyl methylcelluloses, maltodextrins, polymethacrylates, and combinations of any of the foregoing. In embodiments, the water-soluble fibers can include a PVOH copolymer fiber-forming material, modified PVOH copolymer fiber-forming material, or a combination thereof. In embodiments, the water-soluble fibers can comprise a sole PVOH homopolymer fiber-forming material or a blend of PVOH copolymer fiber-forming materials. In embodiments, the water-soluble fibers can comprise a hot water-soluble PVOH copolymer fiber-forming material. In further embodiments, the water-soluble fibers can comprise a PVOH copolymer fiber-forming material with a viscosity in a range of 5 cP to 23 cP and a degree of hydrolysis in a range of 86% to 92%.

In embodiments, the water-soluble fibers can include an auxiliary agent as described above. In embodiments, the water-soluble fibers can be substantially free of auxiliary agents as described above. In embodiments, the water-soluble fibers can include a plasticizer as described above. The total amount of the non-water plasticizer provided in the water-soluble fiber can be in a range of about 1 wt. % to about 45 wt. %, or about 5 wt. % to about 45 wt. %, or about 10 wt. % to about 40 wt. %, or about 20 wt. % to about 30 wt. %, about 1 wt. % to about 4 wt. %, or about 1.5 wt. % to about 3.5 wt. %, or about 2.0 wt. % to about 3.0 wt. %, for example about 1 wt. %, about 2.5 wt. %, about 5 wt. %, about 10 wt. %, about 15 wt. %, about 20 wt. %, about 25 wt. %, about 30 wt. %, about 35 wt. %, or about 40 wt. %, based on total fiber weight. In embodiments, the water-soluble fibers comprise glycerin, sorbitol, or a combination thereof. In embodiments, the water-soluble fibers comprise glycerin. In embodiments, the water-soluble fibers comprise sorbitol. In certain embodiments, the water-soluble fibers can include glycerin, for example, in about 10 wt. % based on total fiber weight, and sorbitol, for example, in about 5 wt. % based on the total fiber weight.

In embodiments, the water-soluble fibers can include a surfactant as described above. In various embodiments, the amount of surfactant in the water-soluble fiber is in a range of about 0.01 wt. %, to about 2.5 wt. %, about 0.1 wt. % to about 2.5 wt. %, about 1.0 wt. % to about 2.0 wt. %, about 0.01 wt. % to 0.25 wt. %, or about 0.10 wt. % to 0.20 wt. %.

In embodiments, any of the auxiliary agents disclosed herein can be added to the fibers of the disclosure. In refinements of the forgoing embodiment, the auxiliary agents can be added to the fiber-forming material prior to formation of the fiber such that the auxiliary agents are dispersed in the fiber. In addition, and/or in the alternative, auxiliary agents can be added to the surface of a fiber after fiber formation (e.g., dispersed on the fibers).

When included in the water-soluble fiber, a colorant can be provided in an amount of 0.01% to 25% by weight of the polymer mixture, such as, 0.02%, 0.05%, 0.1%, 0.5%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, and 24% by weight of the polymer mixture.

Non-Water-Soluble Fibers

Non-water-soluble fibers include fibers and/or fiber-forming materials made of any material that, when provided in a film as the sole film-forming material or provided in a nonwoven web or foam as the sole fiber-forming material, the film, the nonwoven web, or the foam does not dissolve in 300 seconds or less at temperatures of 80° C. or less, as determined by MSTM-205. The non-water-soluble fibers can include a sole non-water-soluble polymer fiber-forming material or a blend of non-water-soluble polymer fiber-forming materials. Suitable non-water-soluble fibers and/or non-water-soluble fiber-forming materials include, but are not limited to, cotton, polyester, polyethylene (e.g., high density polyethylene and low density polyethylene), polypropylene, wood pulp, fluff pulp, abaca, viscose, polylactic acid, polyester, nylon 6, insoluble cellulose, insoluble starch, hemp, jute, flax, ramie, sisal, bagasse, banana fiber, lacebark, silk, sinew, catgut, wool, sea silk, mohair, angora, cashmere, collagen, actin, nylon, dacron, rayon, bamboo fiber, modal, diacetate fiber, triacetate fiber, and combinations thereof. In embodiments, the non-water-soluble fiber-forming material and/or non-water-soluble fibers comprise one or more of the group of: cotton, hemp, jute, flax, ramie, sisal, bagasse, banana, lacebark, silk, sinew, catgut, wool, sea silk, mohair, angora, cashmere, collagen, actin, nylon, dacron, rayon, bamboo, modal, diacetate fiber, triacetate fiber, or a combination thereof.

In embodiments, the non-water-soluble fibers can include an auxiliary agent as described above. In embodiments, the non-water-soluble fibers can be substantially free of auxiliary agents as described above. In embodiments, the non-water-soluble fibers can include a plasticizer as described above. The total amount of the non-water plasticizer provided in the non-water-soluble fiber can be in a range of about 1 wt. % to about 45 wt. %, or about 5 wt. % to about 45 wt. %, or about 10 wt. % to about 40 wt. %, or about 20 wt. % to about 30 wt. %, about 1 wt. % to about 4 wt. %, or about 1.5 wt. % to about 3.5 wt. %, or about 2.0 wt. % to about 3.0 wt. %, for example, about 1 wt. %, about 2.5 wt. %, about 5 wt. %, about 10 wt. %, about 15 wt. %, about 20 wt. %, about 25 wt. %, about 30 wt. %, about 35 wt. %, or about 40 wt. %, based on total fiber weight. In embodiments, the non-water-soluble fibers comprise glycerin, sorbitol, or a combination thereof. In embodiments, the non-water-soluble fibers comprise glycerin. In embodiments, the non-water-soluble fibers comprise sorbitol. In certain embodiments, the non-water-soluble fibers can include a plasticizer such as glycerin, for example in about 10 wt % based on total fiber weight, and sorbitol, for example in about 5 wt % based on the total fiber weight.

In embodiments, the non-water-soluble fibers can include a surfactant as described above. In various embodiments, the amount of surfactant in the water-soluble fiber is in a range of about 0.01 wt. %, to about 2.5 wt. %, about 0.1 wt. % to about 2.5 wt. %, about 1.0 wt. % to about 2.0 wt. %, about 0.01 wt. % to 0.25 wt. %, or about 0.10 wt. % to 0.20 wt. %.

In embodiments, any of the auxiliary agents disclosed herein can be added to the fibers of the disclosure. In refinements of the forgoing embodiment can be added to the fiber-forming material prior to formation of the fiber such that the auxiliary agents can be added to the surface of a fiber after fiber formation. In refinements of the foregoing embodiments, the auxiliary agents can be added to a surface of the fiber after fiber formation.

When included in the non-water-soluble fiber, the colorant can be provided in an amount of 0.01% to 25% by weight of the polymer mixture, such as, 0.02%, 0.05%, 0.1%, 0.5%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, and 24% by weight of the polymer mixture.

Nonwoven Webs or Substrates

The nonwoven web or nonwoven substrates of the disclosure can be water-soluble, non-water-soluble, or at least partially non-water-soluble. The unit dose article of the disclosure can include a nonwoven web, wherein at least a portion of the nonwoven web is soluble in water at a temperature in a range of about 0° C. to about 20° C. according to MSTM 205, or at least a portion of the nonwoven web is not soluble in water at a temperature of 20° C. or less according to MSTM 205, or the nonwoven web is not soluble in water at a temperature of 20° C. or less according to MSTM 205, or the nonwoven web is soluble in water at a temperature in a range of about 0° C. to about 20° C. according to MSTM 205. It will be understood that "at least a portion" of a nonwoven web is soluble (or not soluble) at a given temperature if the nonwoven web includes in the plurality of the fibers, a fiber type which when provided in a nonwoven as the sole fiber type, the nonwoven web consisting of that fiber type is soluble (or not soluble) at the given temperature, according to MSTM-205.

The nonwoven web of the disclosure includes a plurality of fibers. A nonwoven web refers to an arrangement of fibers bonded to one another, wherein the fibers are neither woven nor knitted. The plurality of fibers can be arranged in any orientation. In embodiments, the plurality of fibers are arranged randomly (i.e., do not have an orientation). In embodiments, the plurality of fibers are arranged in a unidirectional orientation. In embodiments, the plurality of fibers are arranged in a bidirectional orientation. In some embodiments, the plurality of fibers are multi-directional, having different arrangements in different areas of the nonwoven web.

The plurality of fibers in any given nonwoven web can include any fiber-forming materials disclosed herein. The nonwoven web can include (1) a single fiber type including a single fiber-forming material, (2) a single fiber type including a blend of fiber-forming materials, (3) a blend of fiber types, each fiber type including a single fiber-forming material, (4) a blend of fiber types, each fiber type including a blend of fiber-forming materials, or (5) a blend of fiber types, each fiber type including a single fiber-forming material or a blend of fiber-forming materials. In embodiments including a blend of fiber types, the different fiber types can have a difference in one or more of the group of length to diameter ratio (LID), tenacity, shape, rigidness, elasticity, solubility, melting point, glass transition temperature ($T_g$), fiber-forming material chemistries, and color. In certain embodiments, the plurality of fibers can comprise two or more types of water-soluble fibers. In embodiments, the plurality of fibers can comprise at least one fiber type comprising at least one type of water-soluble fiber-forming materials and at least one fiber type comprising at least type of one non-water-soluble fiber. In embodiments, the plurality of fibers can comprise two or more fiber types comprising at least one type of non-water-soluble fiber-forming material.

In embodiments, the nonwoven web can further comprise any auxiliary agents as disclosed herein for fibers and/or films. In embodiments, the auxiliary agents can be added to the fiber itself, to the nonwoven web during carding of the nonwoven web, to the nonwoven web prior to bonding (e.g., after carding), to the nonwoven web after bonding, or a combination thereof. The auxiliary agents added to the fibers during carding can be distributed throughout the nonwoven web. The auxiliary agents added to the nonwoven web after carding but prior to bonding can be selectively added to one or both faces of the nonwoven web.

The auxiliary agents can be applied to one or more faces of a nonwoven web or to an article containing same, e.g., a packet, by any suitable means. In embodiments, the auxiliary agents are in powder form. In refinements of the foregoing embodiment, one or more stationary powder spray guns are used to direct the powder stream towards the web or a packet, from one or more than one direction, while the web or packet is transported through the coating zone by means of a belt conveyor. In embodiments, a web or packet is conveyed through a suspension of the powder in air. In embodiments, the webs or packets are tumble-mixed with the powder in a trough-like apparatus. In embodiments, which can be combined with any other embodiment, electrostatic forces are employed to enhance the attraction between the powder and the packet or web. This type of process may be based on negatively charging the powder particles and directing these charged particles to the grounded packets or webs. In other alternative embodiments, the powder is applied to the web or packet by a secondary transferring tool including, but not limited to, rotating brushes, which are in contact with the powder or by powdered gloves, which can transfer the powder from a container to the web or packet. In yet another embodiment, the powder is applied by dissolving or suspending the powder in a non-aqueous solvent or carrier, which is then atomized and sprayed onto the web or packet. In one embodiment, the solvent or carrier subsequently evaporates, leaving the active agent powder behind. In certain embodiments, the powder is applied to the web or packet in an accurate dose. These embodiments utilize closed-system dry lubricant application machinery, such as PekuTECH's powder applicator PM 700 D. In this process, the powder, optionally batch-wise or continuously, is fed to a feed trough of application machinery. The webs or packets are transferred from the output belt of a standard rotary drum pouch machine onto a conveyor belt of the powder application machine, wherein a controlled dosage of the powder is applied to the web or packet. The web or packet can thereafter be conveyed to a suitable secondary packaging process.

In embodiments wherein the auxiliary agents are in liquid form or in a solution, the foregoing can be dispersed among the fibers, dispersed on a face of the nonwoven web, or a combination thereof, for example, by spin casting, spraying a solution such as an aerosolized solution, roll coating, flow coating, curtain coating, extrusion, knife coating, and combinations thereof.

The auxiliary agents, such as chemical exfoliants, mechanical exfoliants, fragrances and/or perfume microcapsules, aversive agents, surfactants, colorants, enzymes, skin conditioners, de-oiling agents, cosmetic agents, or a combination thereof, when present in the nonwoven web, are in an amount of at least about 0.1 wt. %, or in a range of about 0.1 wt. % to about 99 wt. %, provides additional functionality to the nonwoven web. The chemical exfoliants, mechanical exfoliants, fragrances and/or perfume microcapsules, aversive agents, surfactants, colorants, enzymes, skin conditioners, de-oiling agents, cosmetic agents, or a combination thereof, can take any desired form, including as a solid (e.g., powder, granulate, crystal, flake, or ribbon), a liquid, a mull, a paste, a gas, etc., and optionally can be encapsulated.

In embodiments, the nonwoven web can be colored, pigmented, and/or dyed to provide an improved aesthetic effect relative to water-soluble films. Suitable colorants for use in the nonwoven web can include an indicator dye, such as a pH indicator (e.g., thymol blue, bromothymol, thymolphthalein, and thymolphthalein), a moisture/water indicator (e.g., hydrochromic inks or leuco dyes), or a thermochromic ink, wherein the ink changes color when temperature increases and/or decreases. Suitable colorants include, but are not limited to, a triphenylmethane dye, an azo dye, an anthraquinone dye, a perylene dye, an indigoid dye, a food, drug and cosmetic (FD&C) colorant, an organic pigment, an inorganic pigment, or a combination thereof. Examples of colorants include, but are not limited to, FD&C Red #40; Red #3; FD&C Black #3; Black #2; Mica-based pearlescent pigment; FD&C Yellow #6; Green #3; Blue #1; Blue #2; titanium dioxide (food grade); brilliant black; and a combination thereof.

In embodiments, the nonwoven web can include any of the surfactants disclosed herein. In embodiments, the nonwoven web can comprise one or more of the group of: sodium cocoyl isethionate, glucotain, phoenamids, cola lipid, cocamides, such as cocamide ethanolamines, ethylene oxide-based surfactants, and saponified oils of avocado and palm.

The nonwoven webs of the disclosure can have any thickness. Suitable thicknesses can include, but are not limited to, about 5 microns (μm) to about 10,000 μm (1 cm), about 5 μm to about 5,000 μm, about 5 μm to about 1,000 μm, about 5 μm to about 500 μm, about 200 μm to about 500 μm, about 5 μm to about 200 μm, about 20 μm to about 100 μm, or about 40 μm to about 90 μm, or about 50 μm to 80 μm, or about or about 60 μm to 65 μm, for example, 50 μm, 65 μm, 76 μm, or 88 μm. The nonwoven webs of the disclosure can be characterized as high loft or low loft. "Loft" refers to a ratio of thickness to mass per unit area (i.e., basis weight). High loft nonwoven webs can be characterized by a high ratio of thickness to mass per unit area. As used herein, "high loft" refers to a nonwoven web of the disclosure having a basis weight as defined herein and a thickness exceeding 200 μm. The thickness of the nonwoven web can be determined according to ASTM D5729-97, ASTM D5736, and/or ISO 9073-2:1995 and can include, for example, subjecting the nonwoven web to a load of 2 N and measuring the thickness. High loft materials can be used according to known methods in the art, for example, cross-lapping, which uses a cross-lapper to fold the unbonded web over onto itself to build loft and basis weight. Without intending to be bound by theory, in contrast to water-soluble films wherein the solubility of the film can be dependent on the thickness of the film, the solubility of a nonwoven web is not believed to be dependent on the thickness of the web. In this regard, it is believed that because the individual fibers provide a higher surface area than a water-soluble film, regardless of the thickness of the nonwoven web, the parameter that limits approach of water to the fibers and, thereby, dissolution of the fibers is the basis weight (i.e., fiber density in the nonwoven).

In general, the coefficient of dynamic friction and the ratio of the coefficient of static friction to the coefficient of dynamic friction for a nonwoven web of the disclosure will be lower than the coefficient of dynamic friction and the ratio of the coefficient of static friction to the coefficient of dynamic friction for a water-soluble film due to the increased surface roughness of the nonwoven web relative to a water-soluble film, which provides decreased surface contact to the nonwoven web. Advantageously, this surface roughness can provide an improved feel to the consumer (i.e., a cloth-like hand-feel instead of a rubbery hand-feel), improved aesthetics (i.e., less glossy than a water-soluble film), and/or facilitate processability in preparing thermoformed, and/or vertical formed, filled, and sealed, and/or multichamber packets which require drawing the web along a surface of the processing equipment/mold. Accordingly, the water-soluble fibers and/or non-water-soluble fibers should be sufficiently coarse to provide a surface roughness to the resulting nonwoven web without being so coarse as to produce drag.

The solubility in water of the nonwoven webs of the disclosure is a function of the type of fiber(s) used to prepare the web as well as the basis weight of the web. Without intending to be bound by theory, it is believed that the solubility profile of a nonwoven web follows the same solubility profile of the fiber(s) used to prepare the nonwoven web, and the solubility profile of the fiber generally follows the same solubility profile of the polymer(s) from which the fiber is prepared. For example, for nonwoven webs comprising PVOH fibers, the degree of hydrolysis of the PVOH polymer can be chosen such that the water-solubility of the nonwoven web is also influenced. At a given temperature, as the degree of hydrolysis of the PVOH polymer increases from partially hydrolyzed (88% DH) to fully hydrolyzed (≥98% DH), water solubility of the polymer generally decreases. Thus, in example embodiments, the nonwoven web can be cold water-soluble. For a co-poly(vinyl acetate vinyl alcohol) polymer that does not include any other monomers (e.g., not copolymerized with an anionic monomer) a cold water-soluble web, soluble in water at a temperature of less than 10° C., can include fibers of PVOH with a degree of hydrolysis in a range of about 75% to about 90%, or in a range of about 75% to about 89%, or in a range of about 80% to about 90%, or in a range of about 85% to about 90%, or in a range of about 90% to about 99.5%. In other example embodiments, the nonwoven web can be hot water-soluble. For example, a co-poly(vinyl acetate vinyl alcohol) polymer that does not include any other monomers (e.g., not copolymerized with an anionic monomer), a hot water-soluble web can be soluble in water at a temperature of at least about 60° C., by including fibers of PVOH with a degree of hydrolysis of at least about 98%.

Modification of a PVOH polymer increases the solubility of the PVOH polymer. Thus, it is expected that at a given temperature the solubility of a nonwoven web or film prepared from a modified PVOH copolymer would be higher than that of a nonwoven web or film prepared from a PVOH copolymer having the same degree of hydrolysis as the modified PVOH copolymer. Following these trends, a nonwoven web having specific solubility characteristics can be designed by blending polymers within the fibers and/or blending fibers within the nonwoven web. Further, as described herein, the nonwoven web includes a plurality of fibers that may, in some cases, include two or more fiber types that differ in solubility.

Inclusion of non-water-soluble fiber and/or non-water-soluble fiber-forming material in the plurality of fibers of a nonwoven web can also be used to design a nonwoven web having specific solubility and/or prolonged release properties. Without intending to be bound by theory, it is believed that as the weight percent of non-water-soluble fiber included in a nonwoven web is increased (based on the total weight of the nonwoven web), the solubility of the nonwoven web generally decreases and the prolonged release properties of a pouch comprising a nonwoven web generally increases. Upon contact with water at a temperature at or above the solubility temperature of the water-soluble fiber, a nonwoven web comprising water-soluble fiber and non-water-soluble fiber will begin to disperse as the water-soluble fiber dissolves, thereby breaking down the web structure and/or increasing the pore size of the pores of the nonwoven web. The larger the break-down of the web structure or increase in the pore size, the faster the water can access the contents of the pouch and the faster the contents of the pouch will be released. Similarly, prolonged release of the contents of a pouch comprising the nonwoven web of the disclosure can be achieved by using a blend of water-soluble fibers having different solubility properties and/or different solubility temperatures. Once the faster dissolving fiber has dissolved, thereby breaking up the web, the less soluble fibers will have a larger surface area exposed, facilitating dissolution of the less soluble fibers and release of the pouch contents. In embodiments wherein the nonwoven web includes water-soluble fibers and non-water-soluble fibers, the ratio of soluble fibers to non-water-soluble fibers is not particularly limited. The water-soluble fibers can comprise about 1% to about 99%, about 20% to about 80%, about 40% to about 90%, about 50% to about 90%, or about 60% to about 90% by weight, of the total weight of the plurality of fibers, and the non-water-soluble fibers can comprise about 1% to about 99%, about 20% to about 80%, about 10% to about 60%, about 10% to about 50%, or about 10% to about 40% by weight, of the total weight of the fibers. In embodiments, the plurality of fibers comprise about 10% to about 80% water-soluble fibers by weight, based on the total weight of the fibers and the balance being non-water-soluble fibers.

In embodiments, the nonwoven web, the plurality of fibers, the foam, the water-soluble film, or a combination thereof, disclosed herein can comprises a biodegradable polymer. In certain embodiments, the plurality of fibers can comprise non-water-soluble fiber-forming materials that are biodegradable. In embodiments, the plurality of fibers can comprise first fibers that are non-water-soluble biodegradable fibers, and second fibers that are soluble in water at a temperature of about 10° C. to about 20° C. according to MSTM 205 or not soluble in water at a temperature of about 30° C. or less according to MSTM 205, according to MSTM 205. In embodiments, the nonwoven web is non-water-soluble and biodegradable.

In embodiments, the nonwoven web is biodegradable. As used herein, when the nonwoven web is said to be biodegradable, at least 50% of the nonwoven web is biodegradable, for example, at least 60%, at least 70%, at least 80%, at least 90%, or 100%, of the nonwoven web is biodegradable.

The nonwoven web as disclosed herein can comprise a composite material including the plurality of fibers comprising a first fiber type and a second fiber type, wherein the first and second fiber types have a difference in diameter, length, tenacity, shape, rigidness, elasticity, solubility, melting point, glass transition temperature ($T_g$), chemical composition, color, or a combination thereof. In embodiments, the first fiber type can comprise a PVOH homopolymer fiber-forming material, a PVOH copolymer fiber-forming material, a modified PVOH copolymer fiber-forming material, or a combination thereof. In embodiments, the first fiber type can comprise two or more PVOH homopolymer fiber-forming materials, two or more PVOH copolymer fiber-forming materials, two or more modified PVOH copolymer fiber-forming materials, or a combination thereof. In embodiments, the second fiber type can comprise a PVOH homopolymer fiber-forming material, a PVOH copolymer fiber-forming material, a modified PVOH copolymer fiber-forming material, or a combination thereof. In embodiments, the second fiber type can comprise two or more PVOH homopolymer fiber-forming materials, two or more PVOH copolymer fiber-forming materials, two or more modified PVOH copolymer fiber-forming materials, or a combination thereof. In embodiments, the first fiber type and/or the second fiber type are non-water-soluble fiber-forming material. In embodiments, the first fiber type can comprise a non-water-soluble polymer fiber-forming material and the second fiber type can comprise a polyvinyl alcohol fiber-forming material that, when provided as the sole fiber-forming material of a nonwoven web or as a film, the resulting web or film is soluble in water at a temperature in a range of about 0° C. to about 20° C. according to MSTM 205. In embodiments, the first fiber type can comprise a non-water-soluble polymer fiber-forming material and the second fiber type can comprise a PVOH homopolymer or copolymer fiber-forming material that, when provided as the sole fiber-forming material of a nonwoven web or as a film, the resulting web or film is not soluble in water at a temperature of 20° C. or less according to MSTM 205. In embodiments, the first fiber type comprises two or more PVOH copolymer fiber-forming materials, two or more modified PVOH copolymer fiber-forming materials, or a combination of PVOH copolymer fiber-forming materials and modified PVOH copolymer fiber-forming materials. In embodiments, the second fiber type comprises two or more PVOH copolymer fiber-forming materials, two or more modified PVOH copolymer fiber-forming materials, or a combination of PVOH copolymer fiber-forming materials and modified PVOH copolymer fiber-forming materials.

The plurality of fibers comprised in the nonwoven webs of the disclosure can have any tenacity. The tenacity of the fiber correlates to the coarseness of the fiber. As the tenacity of the fiber decreases, the coarseness of the fiber increases. Fibers used to prepare the nonwoven webs of the disclosure can have a tenacity in a range of about 1 to about 100 cN/dtex, or about 1 to about 75 cN/dtex, or about 1 to about 50 cN/dtex, or about 1 to about 45 cN/dtex, or about 1 to about 40 cN/dtex, or about 1 to about 35 cN/dtex, or about 1 to about 30 cN/dtex, or about 1 to about 25 cN/dtex, or about 1 to about 20 cN/dtex, or about 1 to about 15 cN/dtex, or about 1 to about 10 cN/dtex, or about 3 to about 8 cN/dtex, or about 4 to about 8 cN/dtex, or about 6 to about 8 cN/dtex, or about 4 to about 7 cN/dtex, or about 10 to about 20, or about 10 to about 18, or about 10 to about 16, or about 1 cN/dtex, about 2 cN/dtex, about 3 cN/dtex, about 4 cN/dtex, about 5 cN/dtex, about 6 cN/dtex, about 7 cN/dtex, about 8 cN/dtex, about 9 cN/dtex, about 10 cN/dtex, about 11 cN/dtex, about 12 cN/dtex, about 13 cN/dtex, about 14 cN/dtex, or about 15 cN/dtex. In embodiments, the plurality of fibers can have a tenacity in a range of about 3 cN/dtex to about 15 cN/dtex, or about 5 cN/dtex to about 12 cN/dtex, or about 5 cN/dtex to about 10 cN/dtex.

The tenacity of the nonwoven web can be the same or different from the tenacity of the plurality of fibers used to prepare the web. Without intending to be bound by theory, it is believed that the tenacity of the nonwoven web is related to the strength of the nonwoven web, wherein a higher tenacity provides a higher strength to the nonwoven web. The tenacity of the nonwoven web can be modified by using fibers having different tenacities. The tenacity of the nonwoven web may also be affected by processing. The nonwoven webs of the disclosure have relatively high tenacities, i.e., the nonwoven web is a self-supporting web that can be used as the sole material for preparing an article and/or pouch. In contrast, nonwoven webs prepared according to melt blown, electro-spinning, and/or rotary spinning processes may have low tenacities and may not be self-supporting or capable of being used as a sole web for forming an article or pouch.

The fibers used to prepare the nonwoven webs of the disclosure can have any fineness. The fineness of the fiber correlates to how many fibers are present in a cross-section of a yarn of a given thickness. The fineness of a fiber can be measured by the linear mass density, a measure of the ratio of fiber mass per unit length. The main physical unit of linear mass density is 1 tex, which is equal to 1000 m of fiber weighing 1 g. The unit dtex is used, representing 1 g/10,000 m of fiber. The linear mass density can be selected to provide a nonwoven web having suitable stiffness/hand-feel of the nonwoven web, torsional rigidity, reflection and interaction with light, absorption of dye and/or other actives/additives, ease of fiber spinning in the manufacturing process, and uniformity of the finished article. As the linear mass density of the fibers increases the nonwovens resulting therefrom demonstrate higher uniformity, improved tensile strengths, extensibility, and luster. Additionally, without intending to be bound by theory it is believed that finer fibers will lead to slower dissolution times as compared to larger fibers based on density. Further, without intending to be bound by theory, when a blend of fiber types is used, the average linear mass density can be determined using a weighted average of the individual fiber types. Fibers can be characterized as very fine (dtex≤1.22), fine (1.22≤dtex≤1.54), medium (1.54≤dtex≤1.93), slightly coarse (1.93≤dtex≤2.32), and coarse (dtex≥2.32). The nonwoven web of the disclosure can include fibers that are very fine, fine, medium, slightly coarse, or a combination thereof. In embodiments, the nonwoven web has an average linear mass density in a range of about 1 dtex to about 5 dtex, or about 1 dtex to about 3 dtex, or about 1.5 dtex to about 2.5 dtex. In embodiments, the nonwoven web comprises a blend of fibers wherein first fiber comprises 1.7 dtex average linear mass density and second fiber comprises 2.2 dtex average linear mass density.

The plurality of fibers used to prepare the nonwoven webs of the disclosure have a diameter in a range of about 10 microns to 300 microns, for example, at least 10 microns, at least 25 microns, at least 50 microns, at least 100 microns, or at least 125 microns and up to about 300 microns, up to about 275 microns, up to about 250 microns, up to about 225 microns, or up to about 200 microns. In embodiments, the plurality of fibers used to prepare the nonwoven webs of the disclosure can have a diameter greater than 100 microns to about 300 microns. In embodiments, the diameters of the plurality of fibers used to prepare the nonwoven webs of the disclosure have diameters that are substantially uniform. In embodiments, the one or more fiber types can have a mean diameter in a range of about 10 microns to about 300 microns, or about 50 microns to 200 microns, or about 50 microns to about 100 microns.

The plurality of fibers used to prepare the nonwoven webs of the disclosure can be of any length. In embodiments, the length of the plurality of fibers can be in a range of about 30 millimeters (mm) to about 100 mm, about 10 mm to about 60 mm, or about 30 mm to about 60 mm, for example, at least about 30 mm, at least about 35 mm, at least about 40 mm, at least about 45 mm, or at least about 50 mm, and up to about 100 mm, up to about 95 mm, up to about 90 mm, up to about 80 mm, up to about 70 mm, or up to about 60 mm. In embodiments, the length of the plurality of fibers can be less than about 30 mm or in a range of about 0.25 mm to less than about 30 mm, for example, at least about 0.25 mm, at least about 0.5 mm, at least about 0.75 mm, at least about 1 mm, at least about 2.5 mm, at least about 5 mm, at least about 7.5 mm, or at least about 10 mm and up to about 29 mm, up to about 28 mm, up to about 27 mm, up to about 26 mm, up to about 25 mm, up to about 20 mm, or up to about 15 mm. In embodiments, the fibers have an average length of about 30 mm to about 100 mm, or about 30 mm to about 60 mm. In embodiments, the nonwoven web comprises a blend of fiber types wherein first fiber type comprises a length of about 38 mm and second fiber type comprises a length of about 54 mm.

The plurality of fibers used to prepare the nonwoven webs of the disclosure can have any length to diameter (L/D) ratio. Advantageously, the tactility of a nonwoven web of the disclosure can be controlled using the L/D ratio of the fibers and the respective amounts of fibers having various L/D ratios in the nonwoven composition. As the L/D of the fiber decreases, the stiffness and resistance to bending increases, providing a rougher hand feel. The fibers of the disclosure impart a rough feel to a nonwoven web including same, when the fibers have a low L/D ratio in a range of about 0.5 to about 15, or about 0.5 to about 25, or about 1 to about 5. Such low L/D fibers can be provided in a nonwoven web in an amount in a range of about 0 to about 50% by weight, based on the total weight of the fibers in the nonwoven web, for example, in a range of about 0.5 wt. % to about 25 wt. %, or about 1 wt. % to about 15 wt. %. If the amount of low L/D fibers in a nonwoven web is not known, the amount can be estimated by visual inspection of a micrograph of a nonwoven web. In embodiments wherein a first fiber includes a blend of fiber-forming materials including a first polyvinyl alcohol fiber-forming material, at least a portion of the first fibers can have a L/D ratio of about 0.5 to about 25, or about 0.5 to about 15, or about 1 to about 5.

Pore sizes can be determined using high magnification and ordered surface analysis techniques including, but not limited to Brunauer-Emmett-Teller theory (BET), and molecular adsorption.

Nonwoven webs can be characterized by basis weight. The basis weight of a nonwoven web is the mass per unit area of the nonwoven web. Basis weight can be modified by varying manufacturing conditions, as is known in the art. A nonwoven web can have the same basis weight prior to and after bonding. Alternatively, the bonding method can change the basis weight of the nonwoven web. For example, wherein bonding occurs through the application of heat and pressure, the thickness of the nonwoven (and, thus, the area of the nonwoven) can be decreased, thereby increasing the basis weight. Accordingly, as used herein and unless specified otherwise, the basis weight of a nonwoven refers to the basis weight of the nonwoven after bonding.

The nonwoven webs of the disclosure can have any basis weight in a range of about 0.1 g/m$^2$ to about 700 g/m$^2$, about $0.5 g/m^2$ to about $600 g/m^2$, about $1 g/m^2$ to about $500 g/m^2$, about $1 g/m^2$ to about $400 g/m^2$, about $1 g/m^2$ to about $300 g/m^2$, about $1 g/m^2$ to about $200 g/m^2$, about $1 g/m^2$ to about $100 g/m^2$, about $30 g/m^2$ to about $100 g/m^2$, about $20 g/m^2$ to about $100 g/m^2$, about $20 g/m^2$ to about $80 g/m^2$, or about $25 g/m^2$ to about $70 g/m^2$.

Further, as the basis weight of the web increases, the rate of dissolution of the web decreases, provided the fiber composition and web thickness remain constant, as there is more material to be dissolved. For example, at a given temperature, a water-soluble web prepared from fibers comprising PVOH polymer(s) and having a basis weight of, e.g., $40 g/m^2$, is expected to dissolve slower than an otherwise-identical water-soluble web having a basis weight of, e.g., $30 g/m^2$. Accordingly, basis weight can also be used to modify the solubility characteristics of the nonwoven web. The nonwoven web can have any basis weight in a range of about $1 g/m^2$ to about $700 g/m^2$, about $1 g/m^2$ to about $600 g/m^2$, about $1 g/m^2$ to about $500 g/m^2$, about $1 g/m^2$ to about $400 g/m^2$, about $1 g/m^2$ to about $300 g/m^2$, about $1 g/m^2$ to about $200 g/m^2$, about $10 g/m^2$ to about $100 g/m^2$, about $30 g/m^2$ to about $100 g/m^2$, about $20 g/m^2$ to about $100 g/m^2$, about $20 g/m^2$ to about $80 g/m^2$, about $25 g/m^2$ to about $70 g/m^2$, or about $40 g/m^2$ to about $60 g/m^2$.

The nonwoven web of the disclosure can be used as a single layer or can be layered with other nonwoven webs or can be in the form of a laminate with a water-soluble film. In some embodiments, the nonwoven web includes a single layer of nonwoven web. In some embodiments, the nonwoven web is a multilayer nonwoven web comprising two or more layers of nonwoven webs. The two or more layers can be laminated to each other. In refinements of the foregoing embodiment, the two or more layers can be the same (e.g., be prepared from the same fibers and basis weight). In refinements of the foregoing embodiment, the two or more layers can be different (e.g., be prepared from different types of fibers, fiber chemistries, and/or have different basis weights).

A multilayer nonwoven web can have a basis weight that is the sum of the basis weights of the individual layers. Accordingly, a multilayer nonwoven web will take longer to dissolve than any of the individual layers provided as a single layer.

Water-Soluble Foams

In example embodiments, a suitable water-soluble foam includes any suitable resin chemistry, such as a PVOH homopolymer; a PVOH copolymer; a modified PVOH copolymer, such as maleic anhydride (MA) modified PVOH copolymer, monomethyl maleate (MMM), Modified PVOH copolymer, and AMPS (2-methylacrylamido-2-methylpropanesulfonic acid) Modified PVOH copolymer; cellulose and cellulose derivatives; PVP; proteins; casein; soy; or any water-dispersible or water-soluble resin. In certain embodiments, the water-soluble foam substrate has a thickness of 3 microns to 3000 microns and can be formed using any suitable manufacturing process known in the foam manufacturing art including, without limitation, a cast, extruded, melt processed, coated, chemically blown, mechanically aerated, air injected, turbulent extrusion process. The water-soluble foam substrate may be porous or non-porous and cold water-soluble or hot water-soluble. The construction of the water-soluble foam substrate may include, for example, folded layers or plies, stacked layers or plies, or rolled layers or plies.

In example embodiments, the water-soluble foam substrate can further comprise any auxiliary agents as disclosed herein for nonwoven webs, fibers and/or films. The auxiliary agents can be applied to one or more faces of a water-soluble foam substrate or to an article containing same, e.g., a packet, by any suitable means. In embodiments, the auxiliary agents are in powder form. In refinements of the foregoing embodiment, one or more stationary powder spray guns are used to direct the powder stream towards the water-soluble foam substrate or a packet, from one or more than one direction, while the water-soluble foam substrate or packet is transported through the coating zone by means of a belt conveyor. In embodiments, a water-soluble foam substrate or packet is conveyed through a suspension of the powder in air. In embodiments, the water-soluble foam substrate or packets are tumble-mixed with the powder in a trough-like apparatus. In embodiments, which can be combined with any other embodiment, electrostatic forces are employed to enhance the attraction between the powder and the packet or water-soluble foam substrate. This type of process may be based on negatively charging the powder particles and directing these charged particles to the grounded packets or water-soluble foam substrates. In other alternative embodiments, the powder is applied to the water-soluble foam substrate or packet by a secondary transferring tool including, but not limited to, rotating brushes which are in contact with the powder or by powdered gloves which can transfer the powder from a container to the water-soluble foam substrate or the packet. In yet another embodiment, the powder is applied by dissolving or suspending the powder in a non-aqueous solvent or carrier which is then atomized and sprayed onto the water-soluble foam substrate or packet. In one embodiment, the solvent or carrier subsequently evaporates, leaving the active agent powder behind. In certain embodiments, the powder is applied to the water-soluble foam substrate or packet in an accurate dose. These embodiments utilize closed-system dry lubricant application machinery, such as PekuTECH's powder applicator PM 700 D. In this process, the powder, optionally batch-wise or continuously, is fed to a feed trough of application machinery. The water-soluble foam substrates or packets are transferred from the output belt of a standard rotary drum pouch machine onto a conveyor belt of the powder application machine, wherein a controlled dosage of the powder is applied to the water-soluble foam substrate or packet. The water-soluble foam substrate or packet can thereafter be conveyed to a suitable secondary packaging process.

In embodiments wherein the auxiliary agents are in liquid form or in a solution, the foregoing can be dispersed in the water-soluble foam substrate, dispersed on a face of the water-soluble foam substrate, or a combination thereof, for example, by spin casting, spraying a solution such as an aerosolized solution, roll coating, flow coating, curtain coating, extrusion, knife coating, and combinations thereof.

The auxiliary agents, such as chemical exfoliants, mechanical exfoliants, fragrances and/or perfume microcapsules, aversive agents, surfactants, colorants, enzymes, skin conditioners, de-oiling agents, cosmetic agents, or a combination thereof, when present in the water-soluble foam substrate, are in an amount of at least about 0.1 wt. %, or in a range of about 0.1 wt. % to about 99 wt. %, provides additional functionality to the water-soluble foam substrate. The chemical exfoliants, mechanical exfoliants, fragrances and/or perfume microcapsules, aversive agents, surfactants, colorants, enzymes, skin conditioners, de-oiling agents, cosmetic agents, or a combination thereof, can take any desired form, including as a solid (e.g., powder, granulate, crystal, flake, or ribbon), a liquid, a mull, a paste, a gas, etc., and optionally can be encapsulated.

In embodiments, the water-soluble foam substrate can be colored, pigmented, and/or dyed to provide an improved aesthetic effect relative to water-soluble films. Suitable colorants for use in the water-soluble foam substrate can include an indicator dye, such as a pH indicator (e.g., thymol blue, bromothymol, thymolphthalein, and thymolphthalein), a moisture/water indicator (e.g., hydrochromic inks or leuco dyes), or a thermochromic ink, wherein the ink changes color when temperature increases and/or decreases. Suitable colorants include, but are not limited to, a triphenylmethane dye, an azo dye, an anthraquinone dye, a perylene dye, an indigoid dye, a food, drug and cosmetic (FD&C) colorant, an organic pigment, an inorganic pigment, or a combination thereof. Examples of colorants include, but are not limited to, FD&C Red #40; Red #3; FD&C Black #3; Black #2; Mica-based pearlescent pigment; FD&C Yellow #6; Green #3; Blue #1; Blue #2; titanium dioxide (food grade); brilliant black; and a combination thereof.

In embodiments, the water-soluble foam substrate can include any of the surfactants disclosed herein. In embodiments, the water-soluble foam substrate can comprise one or more of the group of: sodium cocoyl isethionate, glucotain, phoenamids, cola lipid, cocamides, such as cocamide ethanolamines, ethylene oxide-based surfactants, and saponified oils of avocado and palm.

The water-soluble foam substrate of the disclosure can have any thickness. Suitable thicknesses can include, but are not limited to, about 5 microns (μl) to about 10,000 μm (1 cm), about 3 μm to about 5,000 μm, about 5 μm to about 1,000 μm, about 5 μm to about 500 μm, about 200 μm to about 500 μm, about 5 μm to about 200 μm, about 20 μm to about 100 μm, or about 40 μm to about 90 μm, or about 50 μm to 80 μm, or about or about 60 μm to 65 μm, for example, 50 μm, 65 μm, 76 μm, or 88 μm. The water-soluble foam substrate of the disclosure can be characterized as high loft or low loft. "Loft" refers to a ratio of thickness to mass per unit area (i.e., basis weight). High loft water-soluble foam substrates can be characterized by a high ratio of thickness to mass per unit area. As used herein, "high loft" refers to a water-soluble foam substrate of the disclosure having a basis weight as defined herein and a thickness exceeding 200 μm. The thickness of the water-soluble foam substrate can be determined according to ASTM D5729-97, ASTM D5736, and/or ISO 9073-2:1995 and can include, for example, subjecting the water-soluble foam substrate to a load of 2 N and measuring the thickness. High loft materials can be used according to known methods in the art, for example, cross-lapping, which uses a cross-lapper to fold the unbonded web over onto itself to build loft and basis weight.

The coefficient of dynamic friction and the ratio of the coefficient of static friction to the coefficient of dynamic friction for a water-soluble foam substrate of the disclosure will be lower than the coefficient of dynamic friction and the ratio of the coefficient of static friction to the coefficient of dynamic friction for a water-soluble film due to the increased surface roughness of the water-soluble foam substrate relative to a water-soluble film, which provides decreased surface contact to the water-soluble foam substrate. Advantageously, this surface roughness can provide an improved feel to the consumer (i.e., a cloth-like hand-feel instead of a rubbery hand-feel), improved aesthetics (i.e., less glossy than a water-soluble film), and/or facilitate processability in preparing thermoformed, and/or vertical formed, filled, and sealed, and/or multichamber packets which require drawing the water-soluble foam substrate along a surface of the processing equipment/mold. Accordingly, the water-soluble fibers and/or non-water-soluble fibers should be sufficiently coarse to provide a surface roughness to the resulting water-soluble foam substrate without being so coarse as to produce drag.

The solubility in water of the soluble foam substrate closure is a function of the type of fiber(s) used to prepare the water-soluble foam substrate as well as the basis weight of the water-soluble foam substrate. Without intending to be bound by theory, it is believed that the solubility profile of a water-soluble foam substrate follows the same solubility profile of the fiber(s) used to prepare the water-soluble foam substrate, and the solubility profile of the fiber generally follows the same solubility profile of the polymer(s) from which the fiber is prepared. For example, for the water-soluble foam substrates comprising PVOH fibers, the degree of hydrolysis of the PVOH polymer can be chosen such that the water-solubility of the water-soluble foam substrate is also influenced. In general, at a given temperature, as the degree of hydrolysis of the PVOH polymer increases from partially hydrolyzed (88% DH) to fully hydrolyzed (≥98% DH), water solubility of the polymer generally decreases. Thus, in example embodiments, the water-soluble foam substrate can be cold water-soluble. For a co-poly(vinyl acetate vinyl alcohol) polymer that does not include any other monomers (e.g., not copolymerized with an anionic monomer) a cold water-soluble web, soluble in water at a temperature of less than 10° C., can include fibers of PVOH with a degree of hydrolysis in a range of about 75% to about 90%, or in a range of about 75% to about 89%, or in a range of about 80% to about 90%, or in a range of about 85% to about 90%, or in a range of about 90% to about 99.5%. In other example embodiments, the water-soluble foam substrate can be hot water-soluble. For example, a co-poly(vinyl acetate vinyl alcohol) polymer that does not include any other monomers (e.g., not copolymerized with an anionic monomer), a hot water-soluble foam substrate can be soluble in water at a temperature of at least about 60° C., by including fibers of PVOH with a degree of hydrolysis of at least about 98%.

Modification of a PVOH polymer increases the solubility of the PVOH polymer. Thus, it is expected that at a given temperature the solubility of a water-soluble foam substrate prepared from a modified PVOH copolymer would be higher than that of a water-soluble foam substrate prepared from a PVOH copolymer having the same degree of hydrolysis as the modified PVOH copolymer. Following these trends, a water-soluble foam substrate having specific solubility characteristics can be designed by blending polymers within the fibers and/or blending fibers within the water-soluble foam substrate. Further, as described herein, the water-soluble foam substrate includes a plurality of fibers that may, in some cases, include two or more fiber types that differ in solubility.

Inclusion of non-water-soluble fiber and/or non-water-soluble fiber-forming material in the plurality of fibers of a water-soluble foam substrate can also be used to design a water-soluble foam substrate having specific solubility and/or prolonged release properties. Without intending to be bound by theory, it is believed that as the weight percent of non-water-soluble fiber included in a water-soluble foam substrate is increased (based on the total weight of the water-soluble foam substrate), the solubility of the water-soluble foam substrate generally decreases and the prolonged release properties of a pouch comprising a water-soluble foam substrate generally increases. Upon contact with water at a temperature at or above the solubility temperature of the water-soluble fiber, a water-soluble foam substrate comprising water-soluble fiber and non-water-soluble fiber will begin to disperse as the water-soluble fiber dissolves, thereby breaking down the foam structure and/or increasing the pore size of the pores of the water-soluble foam substrate. The larger the break-down of the foam structure or increase in the pore size, the faster the water can access the contents of the pouch and the faster the contents of the pouch will be released. Similarly, prolonged release of the contents of a pouch comprising the water-soluble foam substrate of the disclosure can be achieved by using a blend of water-soluble fibers having different solubility properties and/or different solubility temperatures. Once the faster dissolving fiber has dissolved, thereby breaking up the foam, the less soluble fibers will have a larger surface area exposed, facilitating dissolution of the less soluble fibers and release of the pouch contents. In embodiments wherein the foam substrate includes water-soluble fibers and non-water-soluble fibers, the ratio of soluble fibers to non-water-soluble fibers is not particularly limited. The water-soluble fibers can comprise about 1% to about 99%, about 20% to about 80%, about 40% to about 90%, about 50% to about 90%, or about 60% to about 90% by weight, of the total weight of the plurality of fibers, and the non-water-soluble fibers can comprise about 1% to about 99%, about 20% to about 80%, about 10% to about 60%, about 10% to about 50%, or about 10% to about 40% by weight, of the total weight of the fibers. In embodiments, the plurality of fibers comprise about 10% to about 80% water-soluble fibers by weight, based on the total weight of the fibers and the balance being non-water-soluble fibers.

In embodiments, the nonwoven web, the plurality of fibers, the foam, the water-soluble film, or a combination thereof, disclosed herein can comprises a biodegradable polymer. In certain embodiments, the plurality of fibers can comprise non-water-soluble fiber-forming materials that are biodegradable. In embodiments, the plurality of fibers can comprise first fibers that are non-water-soluble biodegradable fibers, and second fibers that are soluble in water at a temperature of about 10° C. to about 20° C. according to MSTM 205 or not soluble in water at a temperature of about 30° C. or less according to MSTM 205, according to MSTM 205. In embodiments, the nonwoven web is non-water-soluble and biodegradable.

In embodiments, the water-soluble foam substrate is biodegradable. As used herein, when the water-soluble foam substrate is said to be biodegradable, at least 50% of the water-soluble foam substrate is biodegradable, for example, at least 60%, at least 70%, at least 80%, at least 90%, or 100%, of the water-soluble foam substrate is biodegradable.

In example embodiments, the water-soluble foam substrate as disclosed herein can comprise the plurality of fibers comprising a first fiber type and a second fiber type, wherein the first and second fiber types have a difference in diameter, length, tenacity, shape, rigidness, elasticity, solubility, melting point, glass transition temperature ($T_g$), chemical composition, color, or a combination thereof. In embodiments, the first fiber type can comprise a PVOH homopolymer fiber-forming material, a PVOH copolymer fiber-forming material, a modified PVOH copolymer fiber-forming material, or a combination thereof. In embodiments, the first fiber type can comprise two or more PVOH homopolymer fiber-forming materials, two or more PVOH copolymer fiber-forming materials, two or more modified PVOH copolymer fiber-forming materials, or a combination thereof. In embodiments, the second fiber type can comprise a PVOH homopolymer fiber-forming material, a PVOH copolymer fiber-forming material, a modified PVOH copolymer fiber-forming material, or a combination thereof. In embodiments, the second fiber type can comprise two or more PVOH homopolymer fiber-forming materials, two or more PVOH copolymer fiber-forming materials, two or more modified PVOH copolymer fiber-forming materials, or a combination thereof. In embodiments, the first fiber type and/or the second fiber type are non-water-soluble fiber-forming material. In embodiments, the first fiber type can comprise a non-water-soluble polymer fiber-forming material and the second fiber type can comprise a polyvinyl alcohol fiber-forming material that, when provided as the sole fiber-forming material of a nonwoven web or as a film, the resulting web or film is soluble in water at a temperature in a range of about 0° C. to about 20° C. according to MSTM 205. In embodiments, the first fiber type can comprise a non-water-soluble polymer fiber-forming material and the second fiber type can comprise a PVOH copolymer or modified copolymer fiber-forming material that, when provided as the sole fiber-forming material of a water-soluble foam substrate, the resulting water-soluble foam substrate is not soluble in water at a temperature of 20° C. or less according to MSTM 205. In embodiments, the first fiber type comprises two or more PVOH copolymer fiber-forming materials, two or more modified PVOH copolymer fiber-forming materials, or a combination of PVOH copolymer fiber-forming materials and modified PVOH copolymer fiber-forming materials. In embodiments, the second fiber type comprises two or more PVOH copolymer fiber-forming materials, two or more modified PVOH copolymer fiber-forming materials, or a combination of copolymer fiber-forming materials and modified PVOH copolymer fiber-forming materials.

The plurality of fibers comprised in the water-soluble foam substrate of the disclosure can have any tenacity. The tenacity of the fiber correlates to the coarseness of the fiber. As the tenacity of the fiber decreases the coarseness of the fiber increases. Fibers used to prepare the nonwoven webs of the disclosure can have a tenacity in a range of about 1 to about 100 cN/dtex, or about 1 to about 75 cN/dtex, or about 1 to about 50 cN/dtex, or about 1 to about 45 cN/dtex, or about 1 to about 40 cN/dtex, or about 1 to about 35 cN/dtex, or about 1 to about 30 cN/dtex, or about 1 to about 25 cN/dtex, or about 1 to about 20 cN/dtex, or about 1 to about 15 cN/dtex, or about 1 to about 10 cN/dtex, or about 3 to about 8 cN/dtex, or about 4 to about 8 cN/dtex, or about 6 to about 8 cN/dtex, or about 4 to about 7 cN/dtex, or about 10 to about 20, or about 10 to about 18, or about 10 to about 16, or about 1 cN/dtex, about 2 cN/dtex, about 3 cN/dtex, about 4 cN/dtex, about 5 cN/dtex, about 6 cN/dtex, about 7 cN/dtex, about 8 cN/dtex, about 9 cN/dtex, about 10 cN/dtex, about 11 cN/dtex, about 12 cN/dtex, about 13 cN/dtex, about 14 cN/dtex, or about 15 cN/dtex. In embodiments, the plurality of fibers can have a tenacity in a range of about 3 cN/dtex to about 15 cN/dtex, or about 5 cN/dtex to about 12 cN/dtex, or about 5 cN/dtex to about 10 cN/dtex.

The tenacity of the water-soluble foam substrate can be the same or different from the tenacity of the plurality of fibers used to prepare the web. Without intending to be bound by theory, it is believed that the tenacity of the water-soluble foam substrate is related to the strength of the nonwoven web, wherein a higher tenacity provides a higher strength to the nonwoven web. The tenacity of the water-soluble foam substrate can be modified by using fibers having different tenacities. The tenacity of the water-soluble foam substrate may also be affected by processing. The water-soluble foam substrate of the disclosure has relatively high tenacities, i.e., the water-soluble foam substrate is a self-supporting substrate that can be used as the sole material for preparing an article and/or pouch. In contrast, water-soluble foam substrate prepared according to melt blown, electro-spinning, and/or rotary spinning processes have low tenacities and may not be self-supporting or capable of being used as a sole substrate for forming an article or pouch.

Water-soluble foam substrates can be characterized by basis weight. The basis weight of a water-soluble foam substrate is the mass per unit area of the water-soluble foam substrate. Basis weight can be modified by varying manufacturing conditions, as is known in the art. A water-soluble foam substrate can have the same basis weight prior to and after bonding. Alternatively, the bonding method can change the basis weight of the water-soluble foam substrate. For example, wherein bonding occurs through the application of heat and pressure, the thickness of the water-soluble foam substrate (and, thus, the area of the water-soluble foam substrate) can be decreased, thereby increasing the basis weight. Accordingly, as used herein and unless specified otherwise, the basis weight of a water-soluble foam substrate refers to the basis weight of the water-soluble foam substrate after bonding.

The water-soluble foam substrate of the disclosure can have any basis weight in a range of about 0.1 $g/m^2$ to about 700 $g/m^2$, about 0.5 $g/m^2$ to about 600 $g/m^2$, about 1 $g/m^2$ to about 500 $g/m^2$, about 1 $g/m^2$ to about 400 $g/m^2$, about 1 $g/m^2$ to about 300 $g/m^2$, about 1 $g/m^2$ to about 200 $g/m^2$, about 1 $g/m^2$ to about 100 $g/m^2$, about 30 $g/m^2$ to about 100 $g/m^2$, about 20 $g/m^2$ to about 100 $g/m^2$, about 20 $g/m^2$ to about 80 $g/m^2$, or about 25 $g/m^2$ to about 70 $g/m^2$.

Further, as the basis weight of the water-soluble foam substrate increases the rate of dissolution of the water-soluble foam substrate decreases, provided the fiber composition and web thickness remain constant, as there is more material to be dissolved. For example, at a given temperature, a water-soluble foam substrate prepared from fibers comprising PVOH polymer(s) and having a basis weight of, e.g., 40 $g/m^2$, is expected to dissolve slower than an otherwise-identical water-soluble web having a basis weight of, e.g., 30 $g/m^2$. Accordingly, basis weight can also be used to modify the solubility characteristics of the water-soluble foam substrate. The water-soluble foam substrate can have any basis weight in a range of about 1 $g/m^2$ to about 700 $g/m^2$, about 1 $g/m^2$ to about 600 $g/m^2$, about 1 $g/m^2$ to about 500 $g/m^2$, about 1 $g/m^2$ to about 400 $g/m^2$, about 1 $g/m^2$ to about 300 $g/m^2$, about 1 $g/m^2$ to about 200 $g/m^2$, about 10 $g/m^2$ to about 100 $g/m^2$, about 30 $g/m^2$ to about 100 $g/m^2$, about 20 $g/m^2$ to about 100 $g/m^2$, about 20 $g/m^2$ to about 80 $g/m^2$, about 25 $g/m^2$ to about 70 $g/m^2$, or about 40 $g/m^2$ to about 60 $g/m^2$.

The water-soluble foam substrate of the disclosure can be used as a single layer or can be layered with other water-soluble foam substrates or can be in the form of a laminate with a water-soluble film. In some embodiments, the water-soluble foam substrate includes a single layer. In some embodiments, the water-soluble foam substrate is a multi-layer water-soluble foam substrate comprising two or more layers. The two or more layers can be laminated to each other. In refinements of the foregoing embodiment, the two or more layers can be the same (e.g., be prepared from the same fibers and basis weight). In refinements of the foregoing embodiment, the two or more layers can be different (e.g., be prepared from different types of fibers, fiber chemistries, and/or have different basis weights).

A multilayer water-soluble foam substrate can have a basis weight that is the sum of the basis weights of the individual layers. Accordingly, a multilayer water-soluble foam substrate will take longer to dissolve than any of the individual layers provided as a single layer.

Water-Soluble Films

The water-soluble film described herein comprises any of the water-soluble polymers disclosed herein. In embodiments, the water-soluble film of the disclosure comprises a polyvinyl alcohol (PVOH) resin, a modified polyvinyl alcohol resin, or combinations thereof. In embodiments, the water-soluble film includes a PVOH resin selected from the group consisting of a PVOH homopolymer, a PVOH copolymer, a PVOH copolymer having an anionic modification, and combinations of the foregoing. In embodiments, the water-soluble film can comprise a single PVOH polymer or a blend of PVOH polymer. In embodiments, the water-soluble film comprises a PVOH copolymer. In embodiments, the water-soluble film comprises a hot water-soluble PVOH copolymer. In embodiments wherein the nonwoven web includes a surfactant and/or an exfoliant, the water-soluble film can comprise a PVOH copolymer having an anionic modification. In embodiments, the water-soluble film can comprise a water-soluble polyvinyl alcohol copolymer or modified copolymer that, when provided in a film as the sole film forming material, the film is soluble in water at a temperature in a range of about 0° C. to about 20° C. according to MSTM 205. In embodiments, the water-soluble film can comprise a water-soluble polyvinyl alcohol copolymer or modified copolymer that, when provided in a film as the sole film forming material, the film is not water-soluble at a water temperature of 20° C. or less according to MSTM 205, according to MSTM 205.

The water-soluble film can include other film forming polymers including, but not limited to, polyvinyl alcohols, water-soluble acrylate copolymers, polyethyleneimine, pullulan, water-soluble natural polymers including, but not limited to, guar gum, gum Acacia, xanthan gum, carrageenan, and starch, water-soluble polymer modified starches, copolymers of the foregoing, or a combination of any of the foregoing. Other water-soluble polymers can include polyalkylene oxides, polyacrylamides, celluloses, cellulose ethers, cellulose esters, cellulose amides, polyvinyl acetates, polycarboxylic acids and salts thereof, polyaminoacids, polyamides, gelatines, methylcelluloses, carboxymethylcelluloses and salts thereof, dextrins, ethylcelluloses, hydroxyethyl celluloses, hydroxypropyl methylcelluloses, maltodextrins, polymethacrylates, or a combination of any of the foregoing. Such water-soluble polymers are commercially available from a variety of sources. In embodiments, the water-soluble film can include a PVOH homopolymer, PVOH copolymer, modified PVOH copolymer, or a combination thereof. In embodiments, the water-soluble film comprises a single PVOH copolymer or a blend of PVOH copolymers. In further embodiments, the water-soluble film comprises a PVOH copolymer with a viscosity in a range of 5 cP to 23 cP and a degree of hydrolysis in a range of 86% to 92%.

The film can have any suitable thickness, and a film thickness of about 76 microns (μm)) is typical and particularly contemplated. Other values and ranges contemplated include values in a range of about 5 μm to about 200 μm, or in a range of about 20 μm to about 100 μm, or about 40 μm to about 90 μm, or about 50 μm to 80 μm, or about or about 60 μm to 65 μm, for example, 65 μm, 76 μm, or 88 μm.

In embodiments, the water-soluble films can include an auxiliary agent as described above. In embodiments, the water-soluble films can be substantially free of auxiliary agents as described above. In embodiments, the water-soluble films can include a plasticizer as described above.

The total amount of the non-water plasticizer provided in the water-soluble film can be in a range of about 1 wt. % to about 45 wt. %, or about 5 wt. % to about 45 wt. %, or about 10 wt. % to about 40 wt. %, or about 20 wt. % to about 30 wt. %, about 1 wt. % to about 4 wt. %, or about 1.5 wt. % to about 3.5 wt. %, or about 2.0 wt. % to about 3.0 wt. %, for example, about 1 wt. %, about 2.5 wt. %, about 5 wt. %, about 10 wt. %, about 15 wt. %, about 20 wt. %, about 25 wt. %, about 30 wt. %, about 35 wt. %, or about 40 wt. %, based on total film weight. In embodiments, the water-soluble film comprises one or more of propylene glycol, glycerol, diglycerol, sorbitol, xylitol, maltitol, trimethylol propane (TMP), and polyethylene glycol (100-1000 molecular weight).

In embodiments, the water-soluble films can include a surfactant as described above. In various embodiments, the amount of surfactant in the water-soluble film is in a range of about 0.01 wt. %, to about 2.5 wt. %, about 0.1 wt. % to about 2.5 wt. %, about 1.0 wt. % to about 2.0 wt. %, about 0.01 wt. % to 0.25 wt. %, or about 0.10 wt. % to 0.20 wt. %. In embodiments, the water-soluble film comprises one or more of polysorbate 80, lecithin from various plant sources, and sodium lauryl sulfate (SLS) and the like or any combination thereof.

In embodiments, the auxiliary agents of the water-soluble film can include fillers/extenders/antiblocking agents/detackifying agents. Suitable fillers/extenders/antiblocking agents/detackifying agents include, but are not limited to, cross-linked polyvinylpyrrolidone, cross-linked cellulose, microcrystalline cellulose, silica, metallic oxides, calcium carbonate, talc, mica, stearic acid, and metal salts thereof, for example, magnesium stearate. Optionally, an additional unmodified starch or modified starch can be included the water-soluble in addition to one of the specific starch components described above, for example, hydroxypropylated starch present in an amount in a range of about 5 phr to about 30 phr, or modified starch having a degree of modification of greater than about 2% and is present in an amount in a range of about 2.5 phr to about 30 phr, or an unmodified starch having an amylose content in a range of about 20% to about 80%, or a hydroxypropyl modified starch having an amylose content in a range of about 23% to about 95% when the polyvinyl alcohol comprises an unmodified polyvinyl alcohol copolymer or an anionic modified polyvinyl alcohol copolymer with the proviso that the anionic modifier is not an acrylate. Preferred materials are starches, modified starches, and silica. In one embodiment, the amount of filler/extender/antiblocking agent/detackifying agent in the water-soluble film can be in a range of about 1 wt. % to about 6 wt. %, or about 1 wt. % to about 4 wt. %, or about 2 wt. % to about 4 wt. %, or about 1 phr to about 6 phr, or about 1 phr to about 4 phr, or about 2 phr to about 4 phr, for example. In embodiments, when a starch or modified starch is included in the water-soluble film in addition to one of the specific starch components described above, the additional starch component will be provided in an amount of less than about 50 wt. %, based on the total weight of all starches included in the film. Without intending to be bound by theory, it is believed that any benefit provided to the water-soluble films of the disclosure from the inclusion of the starch component described above is not affected by including an additional starch component that provides a lesser benefit to the water-soluble film or no benefit to the water-soluble film.

The water-soluble film can further have a residual moisture content of at least 4 wt. %, for example, in a range of about 4 wt. % to about 10 wt. %, as measured by Karl Fischer titration.

Methods of Preparing Fibers

Wet Cooled Gel Spinning

In embodiments, the plurality of water-soluble fibers can include water-soluble fibers prepared according to a wet cooled gel spinning process, the wet cooled gel spinning process including the steps of:

(a) dissolving the water-soluble polymer (or polymers) in solution to form a polymer mixture, the polymer mixture optionally including auxiliary agents;

(b) extruding the polymer mixture through a spinneret nozzle to a solidification bath to form an extruded polymer mixture;

(c) passing the extruded polymer mixture through a solvent exchange bath;

(d) optionally wet drawing the extruded polymer mixture; and (e) finishing the extruded polymer mixture to provide the water-soluble fibers.

The solvent in which the water-soluble polymer is dissolved can suitably be any solvent in which the water-soluble polymer is soluble. In embodiments, the solvent in which the water-soluble polymer is dissolved includes a polar aprotic solvent. In embodiments, the solvent in which the water-soluble polymer is dissolved includes dimethyl sulfoxide (DMSO).

The solidification bath includes a cooled solvent for gelling the extruded polymer mixture. The solidification bath can generally be at any temperature that facilitates solidification of the extruded polymer mixture. The solidification bath can be a mixture including a solvent in which the polymer is soluble and a solvent in which the polymer is not soluble. The solvent in which the polymer is not soluble is generally the primary solvent, wherein the solvent in which the polymer is not soluble makes up greater than 50% of the mixture by volume.

After passing through the solidification bath, the extruded polymer mixture gel can be passed through one or more solvent replacement baths. The solvent replacement baths are provided to replace the solvent in which the water-soluble polymer is soluble with the solvent in which the water-soluble polymer is not soluble to further solidify the extruded polymer mixture and, further, to replace the solvent in which the water-soluble polymer is soluble with a solvent that will more readily evaporate, thereby reducing the drying time. Solvent replacement baths can include a series of solvent replacement baths having a gradient of solvent in which the water-soluble polymer is soluble with the solvent in which the water-soluble polymer is not soluble, a series of solvent replacement baths having only the solvent in which the water-soluble polymer is not soluble, or a single solvent replacement bath having only the solvent in which the water-soluble polymer is not soluble. In embodiments, at least one solvent replacement bath can consist essentially of a solvent in which the water-soluble polymer is not soluble.

Finished fibers are sometimes referred to as staple fibers, shortcut fibers, or pulp. In embodiments, finishing includes drying the extruded polymer mixture. In embodiments, finishing includes cutting or crimping the extruded polymer mixture to form individual fibers. Wet drawing of the extruded polymer mixture can provide a substantially uniform diameter to the extruded polymer mixture and, thus, the fibers cut therefrom. Drawing is distinct from extruding, as is well known in the art. In particular, "extruding" refers to the act of making fibers by forcing the resin mixture through the spinneret head whereas drawing refers to mechanically pulling the fibers in the machine direction to promote polymer chain orientation and crystallinity for increased fiber strength and tenacity.

In embodiments wherein the water-soluble fibers are prepared from a wet cooled gel spinning process, the water-soluble polymer can be generally any water-soluble polymer or blend thereof, e.g., two or more different polymers, as generally described herein. In refinements of the foregoing embodiment, the polymer(s) can have any degree of polymerization (DP), for example, in a range of 10 to 10,000,000, for example, at least 10, at least 20, at least 50, at least 100, at least 200, at least 300, at least 400, at least 500, at least 750, or at least 1000 and up to 10,000,000, up to 5,000,000, up to 2,500,00, up to 1,000,000, up to 900,000, up to 750,000, up to 500,000, up to 250,000, up to 100,000, up to 90,000, up to 75,000, up to 50,000, up to 25,000, up to 12,000, up to 10,000, up to 5,000, or up to 2,500, for example in a range of 1000 to about 50,000, 1000 to about 25,000, 1000 to about 12,000, 1000 to about 5,000, 1000 to about 2,500, about 50 to about 12,000, about 50 to about 10,000, about 50 to about 5,000, about 50 to about 2,500, about 50 to about 1000, about 50 to about 900, about 100 to about 800, about 150 to about 700, about 200 to about 600, or about 250 to about 500. In embodiments, the DP is at least 1,000. Auxiliary agents, as described above, can be added to the fibers themselves or to the nonwoven web during the carding and/or bonding process.

Thermoplastic Fiber Spinning

Thermoplastic fiber spinning is well known in the art. Briefly, thermoplastic fiber spinning includes the steps of:

(a) preparing a polymer mixture including the fiber-forming polymer optionally including auxiliary agents;
(b) extruding the polymer mixture through a spinneret nozzle to form an extruded polymer mixture;
(c) optionally drawing the extruded polymer mixture; and
(d) finishing the extruded polymer mixture to provide the fibers.

The finished staple fibers of the thermoplastic fiber spinning process can be finished by drying, cutting, and/or crimping to form individual fibers. Drawing of the extruded polymer mixture mechanically pulls the fibers in the machine direction, promoting polymer chain orientation and crystallinity for increased fiber strength and tenacity. Preparing the polymer mixture for thermoplastic fiber spinning can include (a) preparing a solution of a fiber-forming material and a readily volatile solvent such that after extruding the solution through the spinneret when the solution is contacted with a stream of hot air, the solvent readily evaporates leaving solid fibers behind or (b) melting the polymer such that after extruding the hot polymer through the spinneret, the polymer solidifies by quenching with cool air. The thermoplastic fiber spinning method is distinct from the wet cooled gel spun method at least in that (a) in the thermoplastic fiber spinning method the extruded fibers are solidified by evaporation of the solvent or by quenching hot solid fibers with cool air, rather than by use of a solidification bath; and (b) in the wet-cool gel spun method, the optional drawing is performed while the fibers are in a gel state rather than a solid state.

Fiber-forming materials for preparing fibers from a thermoplastic fiber spinning process can be any fiber-forming polymer or blend thereof, e.g., two or more different polymers, provided that the polymer or blend thereof has suitable solubility in a readily volatile solvent and/or have a melting point lower than and distinct from their degradation temperature. Further, when a blend of fiber-forming polymers are used to make a fiber, the fiber-forming materials must have similar solubility in a readily volatile solvent and/or have similar heat profiles such that the two or more fiber-forming materials will melt at similar temperatures. In contrast, the fiber-forming materials for preparing fibers from the wet cooled gel spinning process are not as limited and fibers can be prepared from a blend of any two or more polymers that are soluble in the same solvent system, and the solvent system need not be a single solvent or even a volatile solvent.

The fiber-forming polymer(s) for preparing thermoplastic fiber spun fibers can have a degree of polymerization (DP), for example, in a range of 10 to 10,000 for example, at least 10, at least 20, at least 50, at least 100, at least 200, at least 300, at least 400, at least 500, at least 750, or at least 1000 and up to 10,000, up to 5,000, up to 2,500, up to 1,000, up to 900, up to 750, up to 500, or up to 250. In embodiments, the DP is less than 1,000.

Melt Spinning

Melt spinning is well known in the art and is understood to refer to both spun bond processes and melt blown processes. Melt spinning is a continuous process which directly prepares a nonwoven web in-line with fiber formation. As such, the melt-spun formed fibers are not finished and cut to any consistent length (e.g., staple fibers are not prepared by these processes). Additionally, melt spinning does not include a drawing step and, therefore, the only control over the diameter of the resulting melt-spun fibers is the size of the holes through which the fiber-forming materials are extruded, and the polymer chains are not oriented in any specific direction.

In example embodiments, melt spinning includes the steps of:

(a) preparing a polymer mixture including the fiber-forming polymer optionally including auxiliary agents;
(b) extruding the polymer mixture into a die assembly to form an extruded polymer mixture;
(c) quenching the extruded polymer mixture;
(d) depositing the quenched, extruded polymer mixture on a belt to form a nonwoven web; and
(e) bonding the nonwoven web.

In the spun bond process, the extruded polymer mixture is pumped into the die assembly as molten polymer and quenched with cold air once passed through the die assembly. In the melt blown process, the extruded polymer mixture is pumped into a die assembly having hot air blown through it and is quenched upon exiting the die assembly and coming into contact with ambient temperature air. In both processes, the fibers are continuously dropped onto a belt or drum, usually facilitated by pulling a vacuum under the belt or drum.

The diameter of melt-spun fibers are in a range of about 0.1 to about 50 micron, for example, at least about 0.1 micron, at least about 1 micron, at least about 2 micron, at least about 5 micron, at least about 10 micron, at least about 15 micron, or at least about 20 micron and up to about 50 micron, up to about 40 micron, up to about 30 micron, up to about 25 micron, up to about 20 micron, up to about 15 micron, up to about 10 micron, about 0.1 micron to about 50 micron, about 0.1 micron to about 40 micron, about 0.1 micron to about 30 micron, about 0.1 micron to about 25 micron, about 0.1 micron to about 20 micron, about 0.1 micron to about 15 micron, about 0.1 micron to about 10 micron, about 0.1 micron to about 9 micron, about 0.1 micron to about 8 micron, about 0.1 micron to about 7 micron, about 0.1 micron to about 6 micron, about 0.1 micron to about 6 micron, about 5 micron to about 35 micron, about 5 micron to about 30 micron, about 7.5 micron to about 25 micron, about 10 micron to about 25 micron, or about 15 micron to about 25 micron. It is well known in the art that melt blown processes can provide micro-fine fibers having an average diameter in a range of about 1-10 micron, however, the melt blown process has very high variation in fiber-to-fiber diameter, e.g., 100-300% variation. Further, it is well known in the art that spun bond fibers can have larger average fiber diameters, e.g., about 15 to about 25 micron, but improved uniformity between fibers, e.g., about 10% variation.

The fiber-forming material for heat extruded processes (e.g., melt-spun, thermoplastic fiber spinning) is more limited than for the wet-cooled gel spun process. For example, the degree of polymerization for heat extruding processes is limited to a range of about 200 to about 500. As the degree of polymerization decreases below 200, the viscosity of the fiber-forming material is too low and the individual fibers prepared by pumping the material through the die assembly do not maintain adequate separation after exiting the die assembly. Similarly, as the degree of polymerization increases above 500, the viscosity is too high to efficiently pump the material through sufficiently small holes in the die assembly to run the process at high speeds, thus losing process efficiency and fiber and/or nonwoven uniformity. Further, processes requiring heating of the fiber-forming material, are unsuitable for polyvinyl alcohol homopolymers as the homopolymers generally do not have the thermal stability required.

The wet cooled gel spinning process advantageously provides one or more benefits such as providing a fiber that includes a blend of water-soluble polymers, providing control over the diameter of the fibers, providing relatively large diameter fibers, providing control over the length of the fibers, providing control over the tenacity of the fibers, providing high tenacity fibers, providing fibers from polymers having a large degree of polymerization, and/or providing fibers which can be used to provide a self-supporting nonwoven web. Continuous processes such as spun bond, melt blown, electro-spinning and rotary spinning generally do not allow for blending of water-soluble polymers (e.g., due to difficulties matching the melt index of various polymers), forming large diameter (e.g., greater than 50 micron) fibers, controlling the length of the fibers, providing high tenacity fibers, and the use of polymers having a high degree of polymerization. Further, the wet cooled gel spinning process advantageously is not limited to polymers that are only melt processable and, therefore, can access fibers made from fiber-forming materials having very high molecular weights, high melting points, low melt flow index, or a combination thereof, providing fibers having stronger physical properties and different chemical functionalities compared to fibers prepared by a heat extrusion process. Further still, advantageously, the wet cooled gel spinning process is not limited by the viscosity of the polymer. In contrast, it is known in the art that processes that require melting of the fiber-forming material are limited to fiber-forming materials having viscosities of 5 cP or less. Thus, fibers including polymers, including polyvinyl alcohol homopolymers and copolymers, having a viscosity of greater than 5 cP are only accessible by wet cooled gel spinning.

Methods of Preparing Nonwoven Webs

The nonwoven webs of the disclosure are sheet-like structures having two exterior surfaces, the nonwoven webs including a plurality of fibers. The nonwoven webs of the disclosures can be prepared from fibers using any known methods in the art. As is known in the art, when fibers are spun bond or melt blown, the fibers are continuously laid down to form the nonwoven web, followed by bonding of the fibers.

Staple fibers can be carded or airlaid and bonded to provide a nonwoven web. Methods of carding and airlaying are well known in the art.

Methods of bonding nonwoven webs are well known in the art. For example, bonding can include thermal, mechanical, and/or chemical bonding. Thermal bonding can include, but is not limited to calendering, embossing, air-through, and ultra-sound. Mechanical bonding can include, but is not limited to, hydro-entangling (spunlace), needle-punching, and stitch-bonding. Chemical bonding can include, but is not limited to, solvent bonding and resin bonding.

Thermal bonding is achieved by applying heat and pressure, and maintains the pore size, shape, and alignment produced by the carding process. The conditions for thermal bonding can be readily determined by one of ordinary skill in the art. If the heat and/or pressure applied is too low, the fibers will not sufficiently bind to form a free-standing web and if the heat and/or pressure is too high, the fibers will begin to meld together. The fiber chemistry dictates the upper and lower limits of heat and/or pressure for thermal bonding. Without intending to be bound by theory, it is believed that at temperatures above 235° C., polyvinyl alcohol-based fibers degrade. Methods of embossment for thermal bonding of fibers are known. The embossing can be a one-sided embossing or a double-sided embossing. Embossing of water-soluble fibers includes one-sided embossing using a single embossing roll consisting of an ordered circular array and a steel roll with a plain surface. As embossing is increased (e.g., as surface features are imparted to the web), the surface area of the web is increased. Without intending to be bound by theory it is expected that as the surface are of the web is increased, the solubility of the web is increased. Accordingly, the solubility properties of the nonwoven web can be advantageously tuned by changing the surface area through embossing.

Air-through bonding requires a high thermoplastic content in the nonwoven web and two different melting point materials. In air-through bonding, the nonbonded nonwoven web is circulated around a drum while hot air flows from the outside of the drum toward the center of the drum. Air-through bonding can provide nonwovens having low density and higher basis weight (e.g., greater than 20 to about 2000 $g/m^2$). Nonwovens bonded by air-bonding is very soft.

Chemical bonding includes solvent bonding and resin bonding. In particular, chemical bonding may use a binder solution of a solvent and a resin (e.g., latex or the waste polymer left over from preparing the fibers). The nonwoven can be coated with the binder solution and heat and pressure applied to cure the binder and bond the nonwoven. The binder solution can be applied by immersing the nonwoven in a bath of binder solution, spraying the binder solution onto the nonwoven, extruding the binder solution onto the web (foam bonding), and/or applying the binder solution as a print or gravure.

Chemical bonding can result in smaller, less ordered pores relative to the pores as carded/melt-spun. Without intending to be bound by theory, it is believed that if the resin solution used for chemical bonding is sufficiently concentrated and/or sufficient pressure is applied, a nonporous nonwoven web can be formed. The solvent used in chemical bonding induces partial solubilization of the existing fibers in the web to weld and bond the fibers together. Thus, the solvent for chemical bonding can be any solvent that can at least partially solubilize one or more fiber-forming materials of the fibers of the nonwoven. In embodiments, the solvent is selected from the group consisting of water, ethanol, methanol, DMSO, glycerin, and a combination thereof. In embodiments, the solvent is selected from the group consisting of water, glycerin, and a combination thereof. In embodiments, the binder solution comprises a solvent selected from the group consisting of water, ethanol, methanol, DMSO, glycerin, and a combination thereof and further comprises a resin selected from the group consisting of polyvinyl alcohol, latex, and polyvinylpyrrolidone. The binder provided in the solution assists in the welding process to provide a more mechanically robust web. The temperature of the polymer solution is not particularly limited and can be provided at room temperature (about 23° C.).

In some embodiments, a second layer of fibers can be used to bond the nonwoven web. In embodiments, the nonwoven layer can be bonded using thermal, mechanical, or chemical bonding, alone or in addition to bonding using an additional layer of nonwoven web/fibers.

Methods of Laminating Films to Nonwoven Webs or Foam Substrates

Methods of preparing a laminate (e.g., water-soluble film and a nonwoven) can include, but is not limited to, calender lamination (thermal with pressure) or melt adhesion.

Calender lamination is achieved by applying heat and pressure. The conditions for calender lamination can be readily determined by one of ordinary skill in the art. If the heat and/or pressure applied is too low, the fibers will not sufficiently bind to the water-soluble film to form a laminate and if the heat and/or pressure is too high, the fibers will begin to meld together with each other and the film. The fiber chemistry and film chemistry dictates the upper and lower limits of heat and/or pressure for calender lamination. Without intending to be bound by theory, it is believed that at temperatures above 235° C., polyvinyl alcohol-based fibers degrade. In embodiments, the heat added to the overlaid nonwoven and water-soluble film is about 50° C. to about 200° C., for example, about 100° C. to about 200° C., about 110° C. to about 190° C., about 120° C. to about 180° C., or about 130° C. to about 160° C. In embodiments, the pressure applied to the overlaid nonwoven and water-soluble film is about 5 psi to about 50 psi, such as, about 10 psi to about 40 psi, about 15 psi to about 30 psi, or about 20 psi to about 30 psi. In embodiments, the heat added to the overlaid nonwoven and water-soluble film is about 150° C. and the pressure applied is about 25 psi. In embodiments, the heat and pressure are applied for about 2-4 seconds. Methods of embossment for calender lamination of fibers and/or the film are contemplated. The embossing can be a one-sided embossing or a double-sided embossing. Embossing of water-soluble fibers and/or water-soluble films includes one-sided embossing using a single embossing roll consisting of an ordered circular array and a steel roll with a plain surface. As embossing is increased (e.g., increased amounts of surface features are imparted to the web and/or the film), the surface area of the laminate is increased. Without intending to be bound by theory it is believed that as the surface of the article is decreased, the solubility of the web and/or film is decreased. Accordingly, the solubility properties of the nonwoven web and/or water-soluble film can be advantageously tuned by changing the surface area through embossing. Without intending to be bound by theory, it is believed that as the degree of lamination of the unit dose article is increased, the surface area of the laminate decreases and the bonding between the water-soluble film and nonwoven increases, resulting in the solubility decreasing and the liquid release time increasing.

Melt adhesion lamination is achieved by applying an adhesive directly to the water-soluble film and the nonwoven web is then laid on top of the water-soluble film with the applied adhesive and is subjected to cold lamination for adhesion of the nonwoven web and the water-soluble film. As used herein, the term “cold lamination” refers to a lamination process that involves pressure but does not involve added heat. The adhesive can be any suitable adhesive to one of ordinary skill in the art. In embodiments, the adhesive is a Henkel National Adhesive. The application of the adhesive directly to the water-soluble film can be applied by any suitable method to one of ordinary skill in the art, such as, a hot melt-spray process. In embodiments, the melt adhesion lamination process can include a hot melt spray process at 160° C., followed by cold lamination at a pressure of 94 $N/mm^2$.

The laminate of the disclosure generally includes a water-soluble film and a nonwoven web. In embodiments, the laminates can have a degree of lamination of about 1% to about 100%, for example, the degree of lamination can be in a range of about 1% to about 90%, or about 25% to about 75%, or about 1% to about 50%, or about 5% to about 25%, or about 25% to about 100%, or about 50% to about 100%. As used herein, the term “degree of lamination” refers to the amount of total area of the water-soluble film that is bonded to the nonwoven web. For example, a laminate having a degree of lamination of about 25% or less means that about 25% or less of the water-soluble film’s area is bonded to the nonwoven web, e.g., lamination at the seals only. For example, a laminate having a degree of lamination of about 100% means that about 100% of the area of the water-soluble film is bonded to the nonwoven web. In embodiments wherein the degree of lamination is about 25% or less, the laminate can be achieved during the heat seal process wherein the lamination occurs at each seal of the unit dose article. In embodiments wherein the laminate has a degree of lamination of about 25% or less, this low degree of lamination can be advantageous as there is an interior void volume where the water-soluble film and the nonwoven web are not laminated providing physical separation for components having non-compatible chemistries, as well as providing an opportunity for a 2-step delivery system of compositions in a unit dose article. In embodiments, the degree of lamination is in a range of about 5% to about 25%. In embodiments, the degree of lamination is in a range of about 50% to about 100%.

Dissolution and Disintegration Test (Modified MSTM-205)

A nonwoven web, water-soluble film, or laminate structure can be characterized by or tested for Dissolution Time and Disintegration Time according to the MonoSol Test Method 205 (MSTM 205), a method known in the art. See, for example, U.S. Pat. No. 7,022,656. The description provided below refers to a nonwoven web, while it is equally applicable to a water-soluble film or laminate structure.

Apparatus and Materials:

600 mL Beaker
Magnetic Stirrer (Labline Model No. 1250 or equivalent)
Magnetic Stirring Rod (5 cm)
Thermometer (0 to 100° C.±1° C.)
Template, Stainless Steel (3.8 cm×3.2 cm)
Timer (0-300 seconds, accurate to the nearest second)
Polaroid 35 mm slide Mount (or equivalent)
MonoSol 35 mm Slide Mount Holder (or equivalent)
Distilled water For each nonwoven web to be tested, three test specimens are cut from a nonwoven web sample that is a 3.8 cm×3.2 cm specimen. Specimens should be cut from areas of web evenly spaced along the traverse direction of the web. Each test specimen is then analyzed using the following procedure.

Lock each specimen in a separate 35 mm slide mount.

Fill beaker with 500 mL of distilled water. Measure water temperature with thermometer and, if necessary, heat or cool water to maintain the temperature at the temperature for which dissolution is being determined, e.g., 20° C. (about 68° F.).

Mark height of column of water. Place magnetic stirrer on base of holder. Place beaker on magnetic stirrer, add magnetic stirring rod to beaker, turn on stirrer, and adjust stir speed until a vortex develops which is approximately one-fifth the height of the water column. Mark depth of vortex.

Secure the 35 mm slide mount in the alligator clamp of the 35 mm slide mount holder such that the long end of the slide mount is parallel to the water surface. The depth adjuster of the holder should be set so that when dropped, the end of the clamp will be 0.6 cm below the surface of the water. One of the short sides of the slide mount should be next to the side of the beaker with the other positioned directly over the center of the stirring rod such that the nonwoven web surface is perpendicular to the flow of the water.

In one motion, drop the secured slide and clamp into the water and start the timer. Rupture occurs when the sample has become compromised within the slide, for example, when a hole is created. Disintegration occurs when the nonwoven web breaks apart and no sample material is left in the slide. When all visible nonwoven web is released from the slide mount, raise the slide out of the water while continuing to monitor the solution for undissolved nonwoven web fragments. Dissolution occurs when all nonwoven web fragments are no longer visible and the solution becomes clear. Rupture and dissolution can happen concurrently for nonwoven samples wherein the fibers are prepared from polyvinyl alcohol polymer having a low degree of hydrolysis (e.g., about 65-88%). Dissolution times are recorded independently of rupture times when there is a 5 second or greater difference between rupture and dissolution.

Thinning time can also be determined using MSTM-205. Thinning of a nonwoven web occurs when some of the fibers making up the nonwoven web dissolve, while other fibers remain intact. The thinning of the web occurs prior to disintegration of the web. Thinning is characterized by a decrease in opacity, or increase in transparency, of the nonwoven web. The change from opaque to increasingly transparent and can be visually observed. During MSTM-205, after the secured slide and clamp have been dropped into the water the opacity/transparency of the nonwoven web is monitored. At the time point wherein no change in opacity/transparency is observed (i.e., the web does not become any less opaque or more transparent), the time is recorded as the thinning time.

The results should include the following: complete sample identification; individual and average disintegration and dissolution times; and water temperature at which the samples were tested.

$$I_{corrected}=I_{measured}\times(\text{reference thickness/measured thickness})^{1.93} \quad [1]$$

$$S_{corrected}=S_{measured}\times(\text{reference thickness/measured thickness})^{1.83} \quad [2]$$

Method for Determining Single Fiber Solubility

The solubility of a single fiber can be characterized by the water breaking temperature. The fiber breaking temperature can be determined as follows. A load of 2 mg/dtex is put on a fiber having a fixed length of 100 mm. Water temperature starts at 1.5° C. and is then raised by 1.5° C. increments every 2 minutes until the fiber breaks. The temperature at which the fiber breaks is denoted as the water breaking temperature.

The solubility of a single fiber can also be characterized by the temperature of complete dissolution. The temperature of complete dissolution can be determined as follows. 0.2 g of fibers having a fixed length of 2 mm are added to 100 mL of water. Water temperature starts at 1.5° C. and is then raised by 1.5° C. increments every 2 minutes until the fiber completely dissolves. The sample is agitated at each temperature. The temperature at which the fiber completely dissolves in less than 30 seconds is denoted as the complete dissolution temperature.

Diameter Test Method

The diameter of a discrete fiber or a fiber within a nonwoven web is determined by using a scanning electron microscope (SEM) or an optical microscope and an image analysis software. A magnification of 200 to 10,000 times is chosen such that the fibers are suitably enlarged for measurement. When using the SEM, the samples are sputtered with gold or a palladium compound to avoid electric charging and vibrations of the fiber in the electron beam. A manual procedure for determining the fiber diameters is used from the image (on monitor screen) taken with the SEM or the optical microscope. Using a mouse and a cursor tool, the edge of a randomly selected fiber is sought and then measured across its width (i.e., perpendicular to the fiber direction at that point) to the other edge of the fiber. A scaled and calibrated image analysis tool provides the scaling to get an actual reading in microns. For fibers within a nonwoven web, several fibers are randomly selected across the sample of nonwoven web using the SEM or the optical microscope. At least two portions of the nonwoven web material are cut and tested in this manner. Altogether at least 100 such measurements are made and then all data are recorded for statistical analysis. The recorded data are used to calculate average (mean) of the fibers, standard deviation of the fibers, and median fiber diameters.

Tensile Strength, Modulus, and Elongation Test

A nonwoven web, water-soluble film, or laminate structure characterized by or to be tested for tensile strength according to the Tensile Strength (TS) Test, modulus (or tensile stress) according to the Modulus (MOD) Test, and elongation according to the Elongation Test is analyzed as follows. The description provided below refers to a nonwoven web, while it is equally applicable to a water-soluble film or laminate structure. The procedure includes the determination of tensile strength and the determination of modulus at 10% elongation according to ASTM D 882 ("Standard Test Method for Tensile Properties of Thin Plastic Sheeting") or equivalent. An INSTRON tensile testing apparatus (Model 5544 Tensile Tester or equivalent) is used for the collection of nonwoven web data. A minimum of three test specimens, each cut with reliable cutting tools to ensure dimensional stability and reproducibility, are tested in the machine direction (MD) (where applicable) for each measurement. Tests are conducted in the standard laboratory atmosphere of 23±2.0° C. and 35±5% relative humidity. For tensile strength or modulus determination, 1"-wide (2.54 cm) samples of a nonwoven web are prepared. The sample is then transferred to the INSTRON tensile testing machine to proceed with testing while minimizing exposure in the 35% relative humidity environment. The tensile testing machine is prepared according to manufacturer instructions, equipped with a 500 N load cell, and calibrated. The correct grips and faces are fitted (INSTRON grips having model number 2702-032 faces, which are rubber coated and 25 mm wide, or equivalent). The samples are mounted into the tensile testing machine and analyzed to determine the 100% modulus (i.e., stress required to achieve 100% film elongation), tensile strength (i.e., stress required to break film), and elongation % (sample length at break relative to the initial sample length). In general, the higher the elongation % for a sample, the better the processability characteristics for the nonwoven web (e.g., increased formability into packets or pouches).

Fiber Shrinkage Percent Test (MSTM)

A percent shrinkage of a fiber when contacted with a suitable amount of a carrier solvent can be determined according to a Fiber Shrinkage Percent Test under MonoSol Standard Operating Procedure.

Apparatus and Materials:

1. Fiber samples (approx. 3 grams)
2. 500 mL beaker
3. Chilled deionized water (located in refrigerator)
4. Deionized water
5. Paper clip
6. Alligator clamp (solubility stand)
7. Stir plate
8. Timer Samples are prepared as follows:

1. Obtain a small bundle of fibers that isn't entangled. Enough to ensure it will hold in the paper clip and the alligator clamp, approximate weight of fiber bundle is 0.013 gram (g) to 0.015 g.

2. Take a paper clip and pull an end of the fiber through the cross sections of the paper clip.

3. Do this so each unique fiber to be tested has a replicate of N=3 for each testing temperature, 23° C. and 10° C.

Apparatus set-up:

1. Fill 500 ml beaker with 400 ml of respective temperature water. Make sure to check the water temperature with a temperature probe before and during testing.

2. Tape a ruler to the top of the alligator clamp so the ruler hangs parallel to the clamp.

3. Place the beaker on a stir plate and place the solubility stand next to the stir plate, submerging ruler into beaker so then you can read the length.

Testing procedure:

1. Attach the free end of the paper clipped fiber in the alligator clamp.

2. Submerge the test sample into the beaker so that the test sample is aligned next to the ruler.

3. Start the timer and record the initial length of the fiber. The test sample fiber length is from the end of alligator clip to the top of the paper clip.

4. After two minutes, record the final length of the fiber.

5. Lift the clamp out of the water and remove the sample from the clamp. Be sure to thoroughly dry off the outside of the clamp and the inside of clamp between each test.

Calculating Shrinkage Percent:

$$\text{Shrinked length} = \text{initial length} - \text{final length} \quad [3]$$

$$\text{Fiber Shrinkage (\%)} = (\text{shrinked length}/\text{initial length}) \times 100\% \quad [4]$$

Nonwoven Shrinkage Percent Test (MSTM)

A percent shrinkage of a nonwoven sheet when contacted with a suitable amount of a carrier solvent can be determined according to a Nonwoven Shrinkage Percent Test under MonoSol Standard Operating Procedure.

Samples are prepared as follows:

1. Using the Cricut Maker machine, 2 inch by 2 inch (5.08 cm×5.08 cm) squares of nonwoven samples were cut out.

2. Each nonwoven square was weighed. The nonwoven density of each square (in gsm) was calculated prior to testing.

3. A cleaning formulation was made and diluted to different water content concentrations.

4. A camera was set up at approximately 11¼ in. (28.6 cm) in height to record the shrinkage of the WSNW.

Shrinkage Testing on nonwoven samples were performed as follows:

5. A nonwoven square (5.08 cm×5.08 cm) was set into a 100×1 mm petri dish.

6. The cleaning solution was warmed up to a set temperature.

7. The petri dish with sample was set under the camera. For higher temperatures, a hot plate was set underneath petri dish to add heat to keep at constant temperature.

8. Once the cleaning solution reached the ideal temperature, the camera was started to record.

9. 10 mL of the cleaning solution was syringed on the nonwoven square. Once the cleaning solution was covering the square, a 5-minute timer was started.

10. After 5 minutes, the final shrinkage was recorded along with any observations.

11. The shrinkage was calculated using an initial area and a final area of the square.

12. Replicates of 3 were done for each set.

13. For shrinkage at 1 hour, the nonwoven samples were measured after 1 hour after initial exposure to the cleaning composition. For higher temperatures, exposed samples were placed in the oven at a set temperature and then removed after 1 hour for shrinkage measurements.

Uses of Single Unit Dose Articles

The single unit dose articles of the disclosure are suitable for a variety of commercial applications. Suitable commercial applications for the single unit dose articles of the disclosure can include pouches and packets for delivering cleaning formulations including, without limitation, a laundry detergent, a soap, a fabric softener, a bleaching agent, a laundry booster, a stain remover, an optical brightener, or a water softener. In example embodiments, the active cleaning formulation may include, without limitation, actives, detergents, surfactants, emulsifiers, chelants, dirt suspenders, stain releasers, enzymes, pH adjusters, builders, soil release polymers, structurants, free fragrance, encapsulated fragrance, preservatives, solvent, minerals, and/or any ingredients suitable in personal care, laundry detergent, dish detergent, and/or home surface cleaners or cleansers. Other examples include a dish detergent, soap or cleaner, a shampoo, a conditioner, a body wash, a face wash, a skin lotion, a skin treatment, a body oil, fragrance, a hair treatment, a bath salt, an essential oil, a bath bomb, or an enzyme. The active cleaning formulation may be in the form of a solid, e.g., a powder or a plurality of granules or particles, a gel, a liquid, or a slurry formulation, or any suitable combination of a powder, a solid, a gel, a liquid, or a slurry formulation, for example.

Additional applications for the unit dose articles of the disclosure can include pouches and packets for delivering personal care products such as exfoliating materials, shampoo, conditioner, body wash, face wash, skin lotion, skin treatment, hair treatment, bath salts, essential oil, or a combination thereof.

Additional contemplated applications include those that can involve a constant flow of water, for example, automotive cleaning applications and/or dish cleaning applications. Advantageously, in such applications, once at least a portion of the composition is released form the unit dose, the nonwoven web can be used to facilitate foaming and/or scrubbing hard to remove grime without damaging the surface being cleaned, for example, the paint on a car or a non-stick cooking surface.

Additional contemplated applications include those that require keeping active agents separated until the point of use. Advantageously, unit dose articles of the disclosure can contain a first active agent within the first interior volume formed by the water-soluble film and a second active agent can be contained within the second interior volume formed by the nonwoven web. The unit dose can be designed to: (a) release the second active agent upon exposure to colder water and the first active agent upon exposure to warmer water such that the second active agent does not come in contact with the first active agent prior to the second active agent being released into the water; or (b) release the first active agent from the first interior volume prior to substantial dissolution of the nonwoven web such that the first active agent and the second active agent will come into contact/mix in the second interior volume prior to either composition being substantially released from the unit dose.

Additional contemplated applications can include those wherein the composition contained in the unit dose can become stale or otherwise unsuitable over time when exposed to, e.g., oxygen, and otherwise require release of the extract of the composition upon use. Such applications can include, but are not limited to, tea leaves and pouched tobacco products. Advantageously, the unit dose of the disclosure can provide a gas barrier in the water-soluble film to maintain freshness, which can dissolve at the point of use (e.g., hot water or placement in the mouth of consumer and contacted with saliva), allowing the release of the extract (e.g., caffeine, flavor, and/or tobacco extracts) while keeping the solid portions of the composition (e.g., leaves) contained within the non-water-soluble, biodegradable, or compostable, nonwoven web. The nonwoven web can then be disposed of as appropriate and allowed to biodegrade or compost.

Methods of Making Unit Dose Articles

The unit dose articles comprising pouches and packets may be made using any suitable equipment and method. For example, single compartment pouches may be made using vertical form filling, horizontal form filling, or rotary drum filling techniques commonly known in the art. Such processes may be either continuous or intermittent. The layered nonwoven web, film, or laminate structure may be dampened, and/or heated to increase the malleability thereof. The method may also involve the use of a vacuum to draw the layered nonwoven web, film, or laminate structure into a suitable mold. The vacuum drawing the nonwoven web, film, or laminate into the mold can be applied for about 0.2 to about 5 seconds, or about 0.3 to about 3, or about 0.5 to about 1.5 seconds, once the layered nonwoven web, film, or laminate structure is on the horizontal portion of the surface. This vacuum can be such that it provides an under-pressure in a range of 10 mbar to 1000 mbar, or in a range of 100 mbar to 600 mbar, for example.

The molds, in which packets may be made, can have any shape, length, width and depth, depending on the required dimensions of the pouches. The molds may also vary in size and shape from one to another, if desirable. For example, the volume of the final pouches may be about 5 ml to about 300 ml, or about 10 ml to 150 ml, or about 20 ml to about 100 ml, and that the mold sizes are adjusted accordingly.

Thermoforming

A thermoformable nonwoven web, film, or laminate is one that can be shaped through the application of heat and a force. Thermoforming a nonwoven web, film, or laminate structure is the process of heating the nonwoven web, film, or laminate structure, shaping it (e.g., in a mold), and then allowing the resulting nonwoven web, film, or laminate to cool, whereupon the nonwoven web, film, or laminate will hold its shape, e.g., the shape of the mold. The heat may be applied using any suitable means. For example, the nonwoven web, film, or laminate may be heated directly by passing it under a heating element or through hot air, prior to feeding it onto a surface or once on a surface. Alternatively, it may be heated indirectly, for example by heating the surface or applying a hot item onto the nonwoven web, film, or laminate. In embodiments, the nonwoven web, film, or laminate is heated using an infrared light. The nonwoven web, film, or laminate may be heated to a temperature in a range of about 50° C. to about 150° C., about 50° C. to about 120° C., about 60° C. to about 130° C., about 70° C. to about 120° C., or about 60° C. to about 90° C. Thermoforming can be performed by any one or more of the following processes: the manual draping of a thermally softened nonwoven web, film, or laminate over a mold, or the pressure induced shaping of a softened nonwoven web, film, or laminate to a mold (e.g., vacuum forming), or the automatic high-speed indexing of a freshly extruded sheet having an accurately known temperature into a forming and trimming station, or the automatic placement, plug and/or pneumatic stretching and pressuring forming of a nonwoven web, film, or laminate.

Alternatively, the nonwoven web, film, or laminate can be wetted by any suitable means, for example directly by spraying a wetting agent (including water, a polymer composition, a plasticizer for the nonwoven web, film, or laminate composition, or any combination of the foregoing) onto the nonwoven web, film, or laminate, prior to feeding it onto the surface or once on the surface, or indirectly by wetting the surface or by applying a wet item onto the nonwoven web, film, or laminate.

Once a nonwoven web, film, or laminate has been heated and/or wetted, it may be drawn into an appropriate mold, preferably using a vacuum. The filling of the molded nonwoven web, film, or laminate can be accomplished by utilizing any suitable means. In embodiments, the most preferred method will depend on the product form and required speed of filling. In embodiments, the molded nonwoven web, film, or laminate is filled by in-line filling techniques. The filled, open packets are then closed forming the pouches, using a second nonwoven web, film, or laminate, by any suitable method. This may be accomplished while in horizontal position and in continuous, constant motion. The closing may be accomplished by continuously feeding a second nonwoven web, film, or laminate, over and onto the open packets and then sealing the first and second nonwoven web, film, or laminate together, typically in the area between the molds and thus between the packets.

Sealing

Any suitable method of sealing the packet and/or the individual compartments thereof may be utilized. Non-limiting examples of such means include heat sealing, solvent welding, solvent or wet sealing, and combinations thereof. Typically, only the area which is to form the seal is treated with heat or solvent. The heat or solvent can be applied by any method, typically on the closing material, and typically only on the areas which are to form the seal. If solvent or wet sealing or welding is used, it may be preferred that heat is also applied. Preferred wet or solvent sealing/welding methods include selectively applying solvent onto the area between the molds, or on the closing material, by for example, spraying or printing this onto these areas, and then applying pressure onto these areas, to form the seal. Sealing rolls and belts (optionally also providing heat) can be used, for example.

In embodiments, an inner nonwoven web, foam, film, or laminate is sealed to outer nonwoven web(s), film(s), or laminate(s) by solvent sealing. The sealing solution is generally an aqueous solution. In embodiments, the sealing solution includes water. In embodiments, the sealing solution includes water and further includes one or more diols and/or glycols such as 1,2-ethanediol (ethylene glycol), 1,3-propanediol, 1,2-propanediol, 1,4-butanediol (tetramethylene glycol), 1,5-pantanediol (pentamethylene glycol), 1,6-hexanediol (hexamethylene glycol), 2,3-butanediol, 1,3-butanediol, 2-methyl-1,3-propanediol, various polyethylene glycols (e.g., diethylene glycol, triethylene glycol), and combinations thereof. In embodiments, the sealing solution includes erythritol, threitol, arabitol, xylitol, ribitol, mannitol, sorbitol, galactitol, fucitol, iditol, inositol, volemitol, isomal, maltitol, lactitol. In embodiments, the sealing solution includes a water-soluble polymer.

The sealing solution can be applied to the interfacial areas of the inner nonwoven web, foam, film, or laminate in any amount suitable to adhere the inner and outer nonwoven webs or laminates. As used herein, the term "coat weight" refers to the amount of sealing solution applied to the nonwoven web, foam, film, or laminate in grams of solution per square meter of nonwoven web, foam, film, or laminate. In general, when the coat weight of the sealing solvent is too low, the nonwoven webs, foam, films, or laminates do not adequately adhere and the risk of pouch failure at the seams increases. Further, when the coat weight of the sealing solvent is too high, the risk of the solvent migrating from the interfacial areas increases, increasing the likelihood that etch holes may form any films comprising the sides of the pouches. The coat weight window refers to the range of coat weights that can be applied to a given film or laminate while maintaining both good adhesion and avoiding the formation of etch holes. A broad coat weight window is desirable as a broader window provides robust sealing under a broad range of operations. Suitable coat weight windows are at least about 3 $g/m^2$, or at least about 4 $g/m^2$, or at least about 5 $g/m^2$, or at least about 6 $g/m^2$.

Cutting the Unit Dose Articles

Formed pouches may be cut by a cutting device. Cutting can be accomplished using any known method. It may be preferred that the cutting is also done in continuous manner, and preferably with constant speed and preferably while in horizontal position. The cutting device can, for example, be a sharp item, or a hot item, or a laser, whereby in the latter cases, the hot item or laser 'burns' through the film/sealing area.

Vertical Form, Fill and Seal

In embodiments, the nonwoven web, foam, film, or laminate of the disclosure can be formed into a sealed article. In embodiments, the sealed article is a vertical form, filled, and sealed article. The vertical form, fill, and seal (VFFS) process is a conventional automated process. VFFS includes an apparatus such as an assembly machine that wraps a single piece of the nonwoven web, foam, film, or laminate around a vertically oriented feed tube. The machine heat seals or otherwise secures the opposing edges of the nonwoven web, foam, film, or laminate together to create the side seal and form a hollow tube of nonwoven web, foam, film, or laminate. Subsequently, the machine heat seals or otherwise creates the bottom seal, thereby defining a container portion with an open top where the top seal will later be formed. The machine introduces a specified amount of flowable product, e.g., the active cleaning formulation, into the container portion through the open top end. Once the container includes the desired amount of product, the machine advances the nonwoven web, foam, film, or laminate to another heat-sealing device, for example, to create the top seal. Finally, the machine advances the nonwoven web, film, or laminate to a cutter that cuts the film immediately above the top seal to provide a filled package.

During operation, the assembly machine advances the nonwoven web, foam, film, or laminate from a roll to form the package. Accordingly, the nonwoven web, foam, film, or laminate must be able to readily advance through the machine and not adhere to the machine assembly or be so brittle as to break during processing.

EXAMPLES

As described herein, the single unit dose article may include one of the following constructions:

(a) a single-use cold water-soluble nonwoven sheet is folded or stacked in a plied construction and saturated with an active cleaning formulation and, in certain embodiments, the nonwoven sheet is wrapped in a water-soluble nonwoven web or water-soluble foam or film material layer to act as a barrier and transfer the active cleaning formulation to a consumer's hand or body or to a surface, for example;

(b) a single-use cold water-soluble cleaning sachet including a water-soluble nonwoven substrate containing a bulk or loose active cleaning formulation, in a liquid, slurry, or solid, e.g., powder, form;

(c) a foam sheet, e.g., an open-cell or closed-cell foam sheet, folded or stacked in a plied construction and saturated with an active cleaning formulation, and, in certain embodiments, the foam sheet is wrapped in a water-soluble nonwoven web or water-soluble foam or film material layer to act as a barrier and transfer the active cleaning formulation to a consumer's hand or body or to a surface, for example;

(d) a single-use water-soluble nonwoven sheet containing an active cleaning formulation, or having an active cleaning formulation adhered to a surface of the nonwoven sheet;

(e) a water-soluble nonwoven sheet is folded or stacked in a plied construction and saturated with an active cleaning formulation and, in certain embodiments, the nonwoven sheet is wrapped in a water-soluble nonwoven web or water-soluble foam or film material layer not containing an active agent to act as a barrier and transfer the active cleaning formulation to a consumer's hand or body or to a surface, for example;

(f) a single use cold water-soluble foam substrate (open cell or closed cell) having low moisture or substantially no moisture laundry detergent on a surface of the foam substrate for cleaning clothes, the foam substrate is dissolvable upon contact with the cold water to deliver one or more cleansing agents, the outer surface of the foam substrate may be at least partially covered by or enclosed in a water-soluble nonwoven fabric for a "plastic free" or "natural" aesthetic for completion of the clothes washing cycle;

(g) a single-use cold water-soluble foam substrate (open cell or closed cell) having low moisture or substantially no moisture laundry detergent in the core or matrix of the foam substrate for cleaning clothes, the foam substrate is dissolvable upon contact with cold water to deliver one or more cleansing agents, the outer surface of the foam substrate may be at least partially covered by or enclosed in a water-soluble nonwoven fabric for a "plastic free" or "natural" aesthetic for completion of the clothes washing cycle;

(h) a single-use cold water-soluble foam substrate (open cell or closed cell) having low moisture or substantially no moisture laundry detergent on a surface of the foam substrate for cleaning clothes, the foam substrate is dissolvable upon contact with the cold water to deliver one or more cleansing agents for completion of the clothes washing cycle;

(i) a single-use cold water-soluble foam substrate (open cell or closed cell) having low moisture or substantially no moisture laundry detergent in the core or matrix of the foam substrate for cleaning clothes, the foam substrate is dissolvable upon contact with cold water to deliver one or more cleansing agents for completion of the clothes washing cycle; and (j) a core substrate including a water-soluble nonwoven web or sheet, a water-soluble foam substrate, or a water-soluble film substrate having an active cleaning formulation in the form of a solid, a liquid, or a slurry disposed or coated on a surface of the core substrate, adhered to a surface of the core substrate, embedded in the core substrate, or dispersed in a matrix of the core substrate, or a suitable combination thereof.

Example embodiments of the disclosure are described in the following numbered paragraphs. These example embodiments are intended to be illustrative in nature and not intended to be limiting.

In example embodiments, a single unit dose article includes a water-soluble core substrate comprising a water-soluble resin. The water-soluble core substrate contains an active cleaning formulation. When the water-soluble core substrate is contacted with water having a temperature greater than 20° C., the water-soluble core substrate is soluble to release the active cleaning formulation. In example embodiments, a water-soluble nonwoven material and/or a water-soluble film encloses the water-soluble nonwoven substrate. In certain embodiments, the water-soluble film is laminated to the water-soluble nonwoven material. A bonding interface is configured to create a seal to enclose the water-soluble core substrate. The active cleaning formulation is in the form of at least one of a powder, a solid, a liquid, a gel, or a slurry form. In example embodiments, the active cleaning formulation is one or disposed on or embedded in the water-soluble core substrate. In example embodiments, the water-soluble core substrate is at least one of saturated with the active cleaning formulation, coated with the active cleaning formulation or impregnated with the active cleaning formulation. In example embodiments, the active cleaning formulation is present in the water-soluble core substrate.

In example embodiments, a single unit dose article includes a water-soluble nonwoven substrate comprising a water-soluble resin. The water-soluble nonwoven substrate contains an active cleaning formulation. When the water-soluble nonwoven substrate is contacted with water having a temperature greater than 20° C., the water-soluble nonwoven substrate is soluble to release the active cleaning formulation. In example embodiments, a water-soluble nonwoven material and/or a water-soluble film encloses the water-soluble nonwoven substrate. In example embodiments, the water-soluble film is laminated to the water-soluble nonwoven material. In certain embodiments, a bonding interface is configured to create a seal to enclose the water-soluble nonwoven substrate and the active cleaning formulation. The active cleaning formulation is in the form of at least one of a powder, a solid, a liquid, a gel, or a slurry formulation. In example embodiments, the water-soluble nonwoven substrate includes a plurality of fibers, wherein the plurality of fibers is saturated with the active cleaning formulation, the active cleaning formulation is embedded in the plurality of fibers, and/or the active cleaning formulation is disposed between adjacent layers of the plurality of layers. In example embodiments, the water-soluble nonwoven substrate is a continuous sheet of a water-soluble nonwoven web folded in a serpentine construction to form the plurality of layers. In other embodiments, the water-soluble nonwoven substrate includes a plurality of separate substrate sheets in a plied construction. The plurality of fibers may be saturated with the active cleaning formulation, the active cleaning formulation may be embedded in the plurality of fibers, or the active cleaning formulation may be disposed on, e.g., coated on, a surface of the water-soluble nonwoven substrate or disposed on, e.g., coated on, a surface of the plurality of fibers. In example embodiments, a water-soluble nonwoven material defines an interior volume to enclose and contain the water-soluble nonwoven substrate and the active cleaning formulation, e.g., a liquid active cleaning formulation.

In example embodiments, a single unit dose article includes a water-soluble foam substrate comprising a water-soluble resin. The water-soluble foam substrate contains an active cleaning formulation. When the water-soluble foam substrate is contacted with water having a temperature greater than 20° C., the water-soluble foam substrate is soluble to release the active cleaning formulation. In example embodiments, a water-soluble nonwoven material and/or a water-soluble film at least partially encloses the water-soluble foam substrate. In certain embodiments, the water-soluble film is laminated to the water-soluble nonwoven material. In certain embodiments, a bonding interface is configured to create a seal to enclose the water-soluble core substrate. The active cleaning formulation may be in the form of at least one of a powder, a solid, a liquid, a gel, or a slurry form. In certain embodiments, the water-soluble foam substrate is saturated with the active cleaning formulation, the active cleaning formulation may be embedded in the water-soluble foam substrate, or the active cleaning formulation may be disposed on, e.g., coated on, a surface of the water-soluble foam substrate.

In example embodiments, a single unit dose article includes a first water-soluble nonwoven web comprising a first water-soluble resin and an opposing second water-soluble nonwoven web comprising a second water-soluble resin. An active cleaning formulation is disposed between the first water-soluble nonwoven web and the second water-soluble nonwoven web. When at least one of the first water-soluble nonwoven web or the second water-soluble nonwoven web is contacted with water having a temperature greater than 20° C., the at least one of first water-soluble nonwoven web or the second water-soluble nonwoven web is soluble to release the active cleaning formulation. The active cleaning formulation may be in the form of at least one of a powder, a solid, a liquid, a gel, or a slurry form. In certain embodiments, a bonding interface is configured to create a seal between the first water-soluble nonwoven web and the second water-soluble nonwoven web to define an interior volume and enclose the active cleaning formulation within the interior volume. In example embodiments, a water-soluble film substrate disposed between the first water-soluble nonwoven web and the second water-soluble nonwoven web. The active cleaning formulation may be embedded in the water-soluble film substrate or the active cleaning formulation is disposed on, e.g., coated on, a surface of the water-soluble film substrate.

In example embodiments, a single unit dose article includes a water-soluble material comprising a water-soluble resin. The water-soluble material is bonded at a bonding interface along an edge of the water-soluble material to define an interior volume of the single unit dose article. An active cleaning formulation is disposed in the interior volume. When the water-soluble material is contacted with water having a temperature greater than 20° C., the water-soluble material is soluble to release the active cleaning formulation. In example embodiments, the water-soluble material comprises one of a water-soluble nonwoven web or a water-soluble foam material. The active cleaning formulation may be in the form of at least one of a powder, a solid, a liquid, a gel, or a slurry form. In example embodiments, the water-soluble material has a first surface facing the interior volume and an opposing second surface. The single unit dose article further includes a water-soluble film disposed on the first surface. In example embodiments, the water-soluble material includes a water-soluble composite material comprising a water-soluble film material made of a first water-soluble resin coupled to one of a water-soluble nonwoven material or a water-soluble foam material made of a second water-soluble resin.

In example embodiments, a method for making a single unit dose article containing an active cleaning formulation includes forming a water-soluble core substrate comprising a water-soluble resin, the water-soluble core substrate containing an active cleaning formulation, wherein, when the water-soluble core substrate is contacted with water having a temperature greater than 20° C., the water-soluble core substrate is soluble to release the active cleaning formulation; forming an outer water-soluble material comprising at least one of a water-soluble nonwoven material, a water-soluble foam material, a water-soluble film material, or a composite material thereof, into an open pouch defining an interior volume configured to contain the water-soluble core substrate and the active cleaning formulation; introducing the water-soluble core substrate and the active cleaning formulation into the interior volume; and sealing the outer water-soluble material to enclose the interior volume. In example embodiments, forming a water-soluble core substrate comprising a water-soluble resin, the water-soluble core substrate containing an active cleaning formulation, includes forming one of a water-soluble nonwoven substrate, a water-soluble foam substrate, or a water-soluble film substrate. In example embodiments, forming a water-soluble core substrate includes forming a water-soluble nonwoven substrate into a plurality of layers, with the active cleaning formulation disposed between adjacent layers of the plurality of layers. A continuous sheet of a water-soluble nonwoven web may be folded in a serpentine construction to form the plurality of layers of the water-soluble nonwoven-substrate or a plurality of separate substrate sheets may be stacked in a plied construction to form the water-soluble nonwoven-substrate, for example. In example embodiments, forming a water-soluble core substrate comprising a water-soluble resin, the water-soluble core substrate containing an active cleaning formulation, includes at least one of saturating the water-soluble core with the active cleaning formulation, disposing the active cleaning formulation on a surface of the water-soluble core substrate, coating a surface of the water-soluble core substrate with the active cleaning formulation, embedding the active cleaning formulation in the water-soluble core substrate, or impregnating the water-soluble core substrate with the active cleaning formulation. In example embodiments, sealing the outer water-soluble material includes forming a seal at a bonding interface to enclose the water-soluble core substrate and the active cleaning formulation in the interior volume.

In the Examples, a nonwoven substrate including an active cleaning formulation and/or a carrier solvent is described as one example of the core substrate for illustration only. The core substrate and the active cleaning formulation can have any composition and/or form as described herein. For example, the core substrate can include a water-soluble nonwoven, foam, and/or film substrate or layer, or any combination thereof. One or more additional water-soluble nonwoven, foam, or film substrate or layer, or any combination thereof, can be disposed thereon and may be used to seal the core substrate with the cleaning formulation. Such core substrate may include one or more PVOH polymers, such as a vinyl alcohol-vinyl acetate copolymer. For example, in certain embodiments, the core substrate includes at least one nonwoven substrate or layer comprising the plurality of fibers. The plurality of fibers comprise a first type of fiber comprising a polyvinyl alcohol copolymer having a degree of hydrolysis in a range of about 75% to about 89%, and a second type of fiber comprising a polyvinyl alcohol copolymer having a degree of hydrolysis in a range of about 90% to about 99.5%. The first type of fiber and the second type of fiber are at a suitable ratio, for example, in a range of from about 1:99 to about 75:25, from about 5:95 to about 75:25, from about 1:99 to about 50:50, from about 5:95 to about 50:50, from about 10:90 to about 50:50, by weight. In some embodiments, the first type of fiber and the second type of fiber are mixed together in the at least one nonwoven. In some embodiments, the at least one nonwoven substrate or layer comprises a first type of nonwoven sheet or layer made of the first type of fiber, and a second type of nonwoven sheet or layer made of the second type of fiber. The two types of fibers are in different nonwoven sheets.

In the single unit dose article described herein, the water-soluble core substrate may comprise a plurality of layers, which are selected from a nonwoven sheet, a foam layer, a film, or any combination thereof. The plurality of layers may include separate sheets, for example, nonwoven sheets in a plied construction, or a continuous layer such as one nonwoven sheet folded in a serpentine construction. The active cleaning formulation can be disposed on and/or embedded in the water-soluble core substrate. Upon contact with the carrier solvent at 20° C. for a period of time of 5 minutes or longer, for example, the single dose article described herein or the core substrate therein exhibits a degree of shrinkage in a range of from 0.5% to 65%, for example, in a range of from 0.5% to 25%.

In the single unit dose article described herein, the water-soluble core substrate may or may not contain the carrier solvent as described. In certain embodiments, the carrier solvent may be used during a manufacturing process. The carrier solvent may be dried off and a resulting single unit dose article may not contain the carrier solvent. In alternative embodiments, a carrier solvent may be used during a manufacturing process and also exist in the resulting single unit dose article.

Fibers Used

As shown in Table 1, two type of fibers, namely, Fiber 1 ("F1") and Fiber 2 ("F2"), which comprise a copolymer of vinyl acetate and vinyl alcohol having a degree of hydrolysis of 88% and 96%, respectively, were used as the starting materials. These fibers have uniform composition, and have additional properties shown in Table 1. In the Examples described herein, Fiber F1 included a 50:50 mixture of fibers having fineness—length of 1.7 dtex—38 mm and 2.2 dtex—51 mm, respectively, and Fiber F2 included a 50:50 mixture of fibers having fineness—length of 1.4 dtex—38 mm and 2.2 dtex—51 mm, respectively. In the Examples, a polymer comprising vinyl alcohol moieties is referred as "a polyvinyl alcohol polymer," and a fiber comprising such a polymer is referred as "a polyvinyl alcohol fiber."

TABLE 1

| Fiber | Viscosity (4% solution) | DH (mol %) | Fineness (dtex) | Solubility Temp (C.) | Tenacity (cN/dtex) | Elongation (%) |
|---|---|---|---|---|---|---|
| F1 | 22-23 | 88 | 1.7, 2.2 | 20 | 5 | 20 |
| F2 | 22-23 | 96 | 1.4, 2.2 | 40 | 7 | 15 |

As shown in Table 2, under different bonding conditions, such as a calender-point bonding, the two type of fibers were used to make nonwoven core substrates. The two type of fibers were also mixed to make one type of nonwoven (referred to as a "blended nonwoven") as the core substrate. Unless specified otherwise, the samples have point bonding patterns.

TABLE 2

| Experimental Samples | | Ex. 1 | Ex. 2 | Ex. 3 | Ex. 4 | Ex. 5 |
|---|---|---|---|---|---|---|
| Composition | Fiber F1 (wt. %) | 0 | 50 | 25 | 10 | 100 |
| | Fiber F2 (wt. %) | 100 | 50 | 75 | 90 | 0 |
| Process Conditions | Target gsm | 50 | 50 | 50 | 50 | 50 |
| | Calender - Point bond point per sq. cm | 8 | 8 | 8 | 8 | 8 |
| | Calender - Temperature ° C. | 122<br>132 | 124<br>134 | 124<br>134 | 124<br>134 | 160<br>153 |
| | Calender - Pressure Kg/linear cm | 40 | 40 | 40 | 40 | 40 |
| Nonwoven Properties | Measured gsm | 56 | 55 | 53 | 58 | 51 |
| | Tenacity MD N/5 cm | 26.1 | 30.2 | 27.8 | 24.4 | 8.65 |
| | Elongation MD % | 9 | 10.2 | 7.7 | 3.1 | 42.22 |
| | Tenacity CD N/5 cm | 3 | 3.3 | 2.5 | 8.1 | 2.48 |
| | Elongation CD % | 47 | 46.9 | 56.3 | 42.3 | 40.72 |
| | MD:CD Ratio | 8.7:1 | 9.1:1 | 11.1:1 | 3.0:1 | 1:3.49 |
| | Caliper 0.5 kpa | 1.005 | 1.065 | 0.83 | 0.98 | 0.6 |

As shown in Table 1, Fibers F1 and F2 used in the Experimental Samples, e.g., Ex. 1, Ex. 2, Ex. 3, Ex. 4, and Ex. 5 as shown in Table 2, are the first type of fiber and the second type of fiber comprising a polyvinyl alcohol copolymer having a degree of hydrolysis of 88% and 96%, respectively. These two fibers were mixed and bonded to form a nonwoven sheet as a core substrate for the single unit dose article as described herein. In FIGS. 16-19 and 23-24, the term "wt. % of Fiber F2" represents the content of Fiber F2 by weight in a total weight of Fiber F1 and Fiber 2 in the nonwoven sheet. The detergent formulations having a weight percent ("xx") of water are represented in a format of "MS-LLD- xx." For example, a detergent formulation MS-LLD-20 means that such a detergent contains 20 wt. % of water. The detergent formulations are thus miscible with water as-formulated or in use, and comprise active cleaning formulations and surfactants of the present disclosure, such as lauryl alcohol ethoxylates, alkali metal salts of higher fatty acids containing about 8 to 24 carbon atoms, and propylene glycol. The detergents may also comprise carrier solvents of the present disclosure, such as glycerol.

The dielectric constant of the detergent compositions used, which contained 5%, 20%, 35%, 50%, and 65% by weight of water, were also measured with a frequency of 100 KHz at 25° C. The detergent composition comprising 50% water was a gel, and it was difficult to be put into a testing cell for holding a liquid sample, unless it was heated to 45° C. The dielectric constant of such a detergent composition was measured at both 45° C. and 25° C. The measured dielectric constant values of the detergent compositions used were 38.7, 395.0, 2016, 6458, and 7320, corresponding to the water content of 5%, 20%, 35%, 50%, and 65% by weight, respectively. The dielectric constant linearly increases with the water content. For the Experimental Samples, their shrinkage in a detergent composition increases with the dielectric constant (i.e., the polarity) of the detergent composition. The range of dielectric constants also illustrates a range of carrier solvents that can be used.

Figure 16:
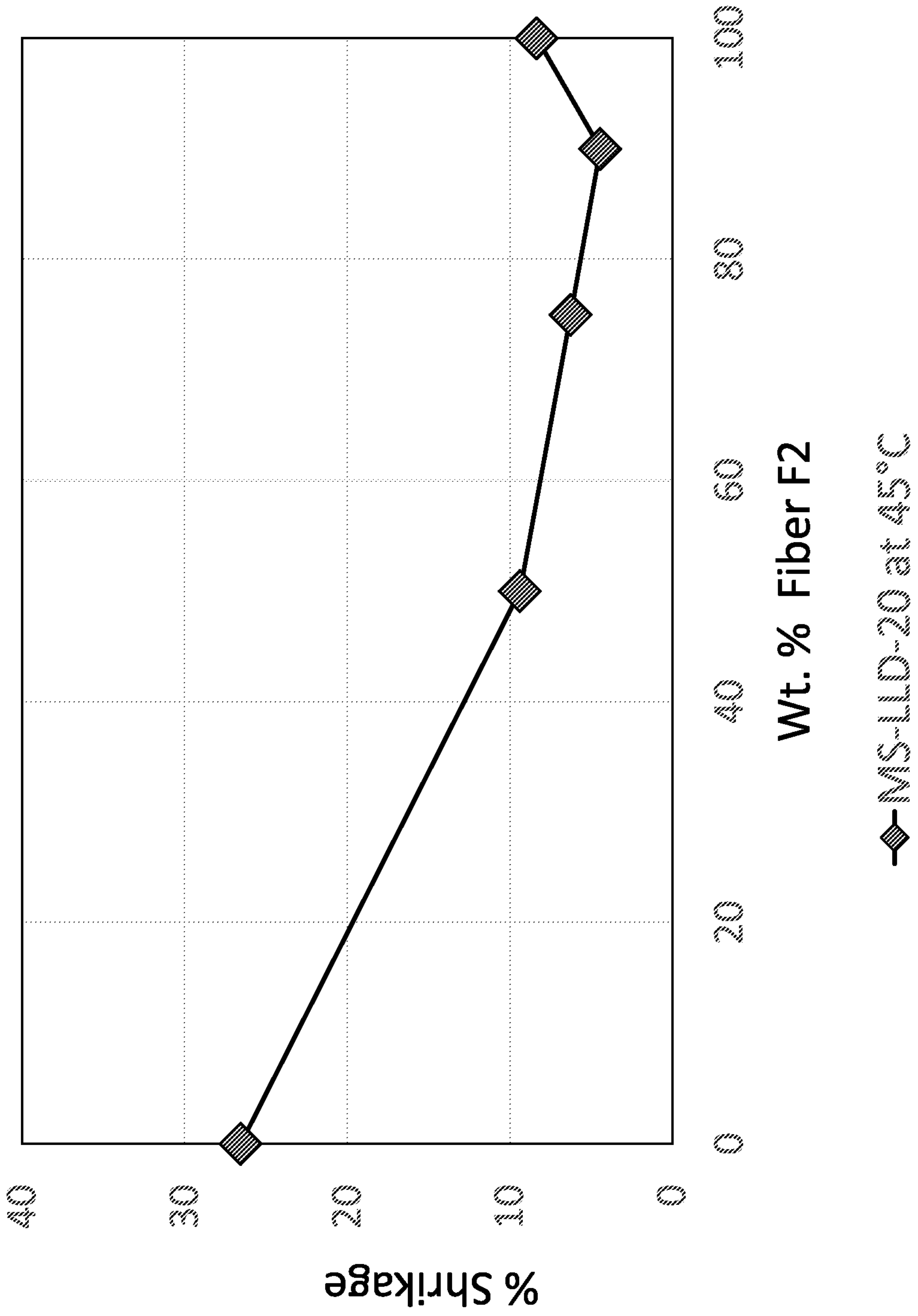
FIG. 16 shows shrinkage results (in a detergent formulation with 20% water at 45° C.) for example samples including a core substrate comprising at least one nonwoven layer or sheet having a plurality of fibers, which include a first type of fiber ("F1") comprising a polyvinyl alcohol copolymer having a degree of hydrolysis of 88% and a second type of fiber ("F2") comprising a polyvinyl alcohol copolymer having a degree of hydrolysis of 96%.

The samples did not show any shrinkage in a detergent formulation having 5 wt. % of water at 45° C. Shrinkage of these samples was observed in the detergent formulation containing water of 20 wt. % or higher. FIG. 16 shows shrinkage results for these samples in the detergent formulation with 20% water at 45° C. The testing time was 5 minutes. As shown in FIG. 16, the shrinkage with 5 minutes decreases with increasing Fiber F2 content up to 90%. The sample (i.e., Ex. 4) having a ratio of Fibers F1:F2 of 10:90 has the lowest shrinkage. The nonwoven sample having Fiber F1 only (i.e., Ex. 5) has a shrinkage about six times as high as that of Sample Ex. 4. The nonwoven sample having Fiber F2 only (i.e., Ex. 1) has a shrinkage about 1.9 times as high as that of Sample Ex. 4. These nonwoven samples continued to shrink after five minutes but at a much slower rate. For example, the nonwoven sample having Fiber F1 only (i.e., Ex. 5) showed an additional 7.8% shrinkage over one hour.

Figure 17:
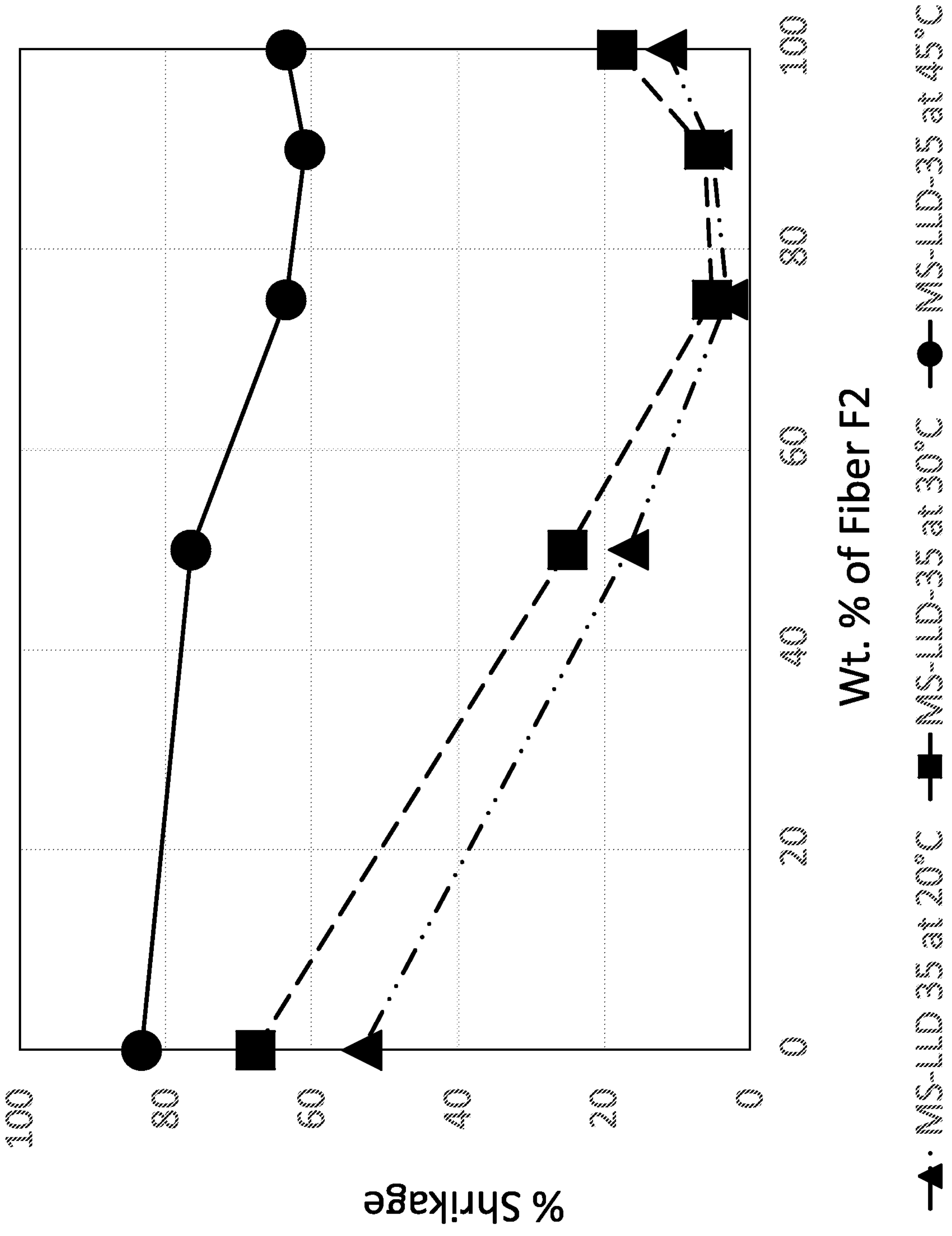
FIG. 17 shows shrinkage results (in a detergent formulation with 35% water at 20° C., 35° C., 45° C.) for example samples including a core substrate comprising at least one nonwoven layer or sheet having a plurality of fibers, which include a first type of fiber ("F1") comprising a polyvinyl alcohol copolymer having a degree of hydrolysis of 88% and a second type of fiber ("F2") comprising a polyvinyl alcohol copolymer having a degree of hydrolysis of 96%.

FIG. 17 shows shrinkage results for the Experimental Samples including Ex. 1, Ex. 2, Ex. 3, Ex. 4, and Ex. 5 in a detergent formulation with 35% water at 20° C., 35° C., and 45° C., respectively. FIG. 17 shows the effect of the content (wt. %) of Fiber F2 in the total weight of Fibers F1 and F2 on the shrinkage of the nonwoven samples. Shrinkage was observed for all the samples in the detergent formulation with 35% water at the three temperatures. Similar to what is shown in FIG. 16, the shrinkage with 5 minutes decreases with increase in the content of Fiber F2 up to 90%. The samples with the content of Fiber F2 in a range of about 75% to 90% have the minimum shrinkage. When the temperature increases, the shrinkage of the samples increases, but the difference in shrinkage between the samples with Fiber F1 and Fiber F2 decreases. A 45° C., the shrinkage of these nonwoven samples did not change after five minutes, but continued to increase at lower temperatures.

Figure 18:
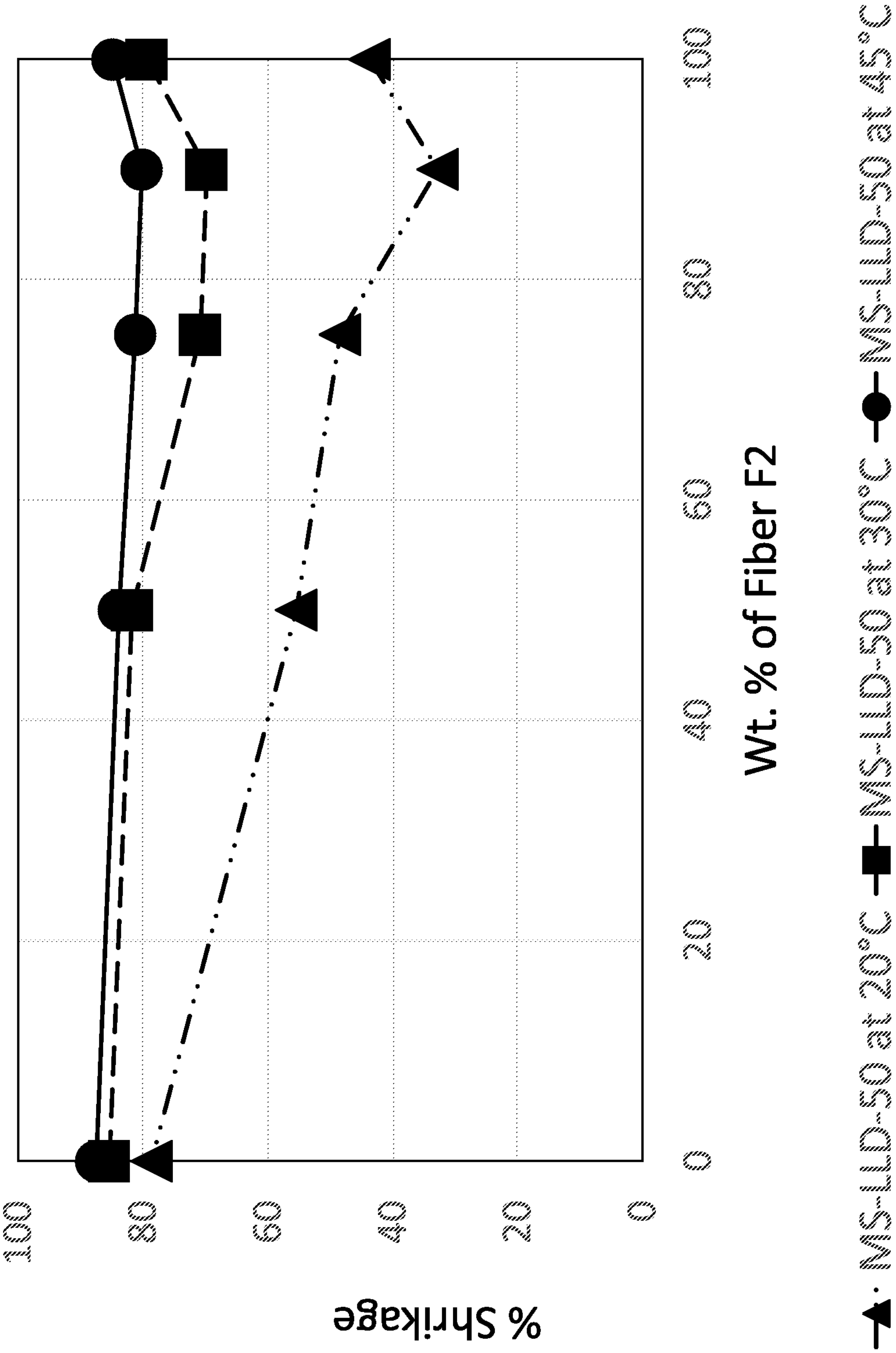
FIG. 18 shows shrinkage results (in a detergent formulation with 50% water at 20° C., 35° C., 45° C.) for the example samples as shown in FIG. 17.

Similar to FIG. 17, FIG. 18 shows shrinkage results of the Experimental Samples in a detergent formulation with 50% water at 20° C., 35° C., and 45° C., respectively. Such a detergent formulation is a gel at 20° C., while it is a fluid at 35° C. and 45° C. Shrinkage was observed for all the samples in this detergent formulation at the three temperatures. Similar to what is shown in FIG. 17, the shrinkage with 5 minutes decreases with increase in the content of Fiber F2 up to 90%. The sample with 90% of Fiber F2 has a minimum shrinkage. At 45° C., these nonwoven samples showed similar shrinkage. The shrinkage of these nonwoven samples after five minutes did not continue to increase at 30° C. and 45° C., but continued to increase at 20° C.

Figure 19:
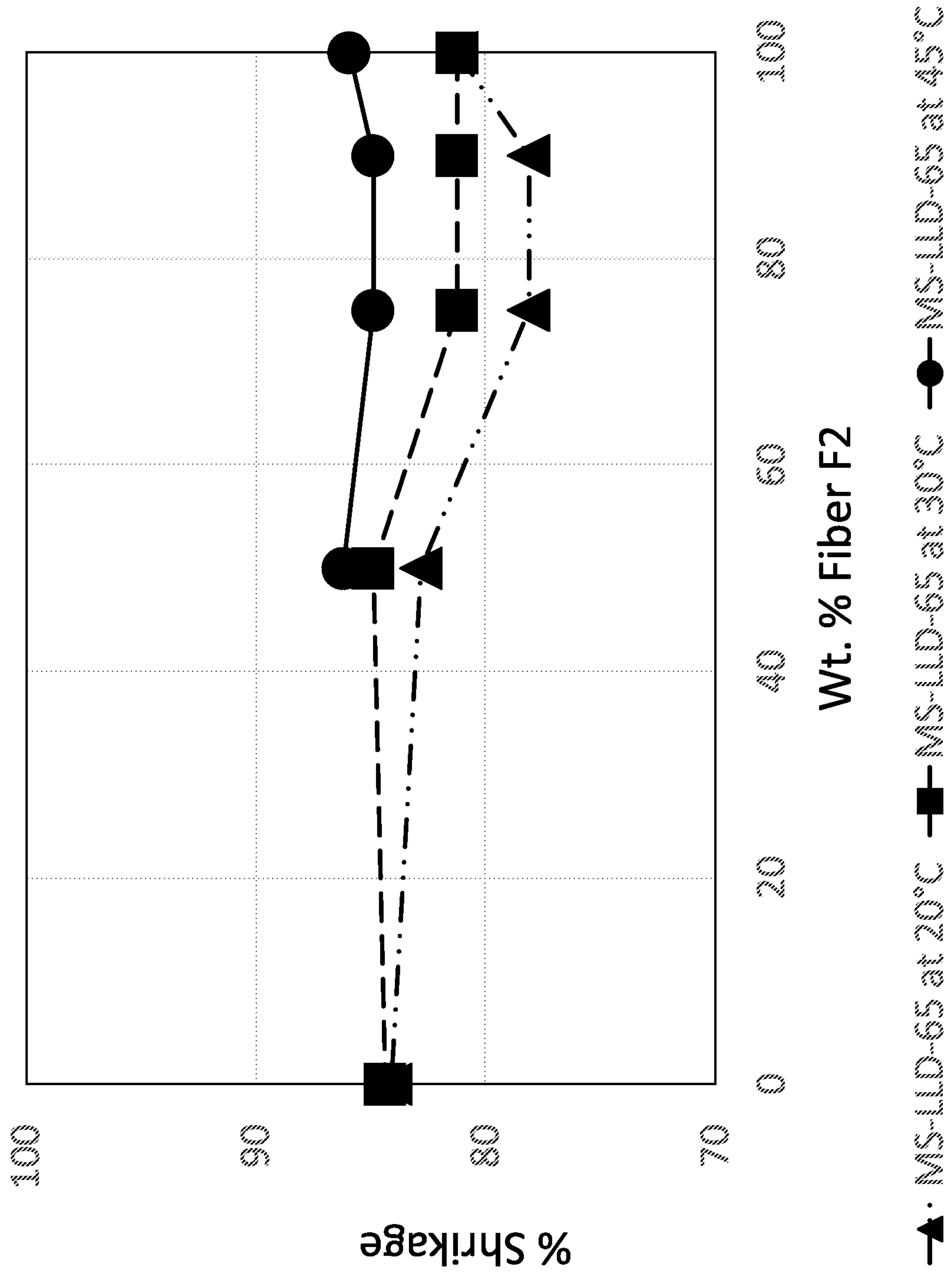
FIG. 19 shows shrinkage results (in a detergent formulation with 65% water at 20° C., 35° C., 45° C.) for the example samples as shown in FIG. 17.

Similar to FIG. 17, FIG. 19 shows shrinkage results of the Experimental Samples in a detergent formulation with 65% water at 20° C., 35° C., and 45° C., respectively. Shrinkage was observed for all the samples in this detergent formulation at the three temperatures. Similar to what is shown in FIGS. 17 and 18, the shrinkage within 5 minutes decreases with increase in the content of Fiber F2 up to 90%. The sample with 90% of Fiber F2 has a minimum shrinkage. In such a detergent formulation, shrinkage is less dependent on a testing temperature, while most of the samples have a shrinkage in a range of from 78% to 86%. At 45° C., these nonwoven samples showed similar shrinkage. The shrinkage of these nonwoven samples after five minutes did not continue to increase in such a detergent formulation at any of the three temperatures.

Figure 20:
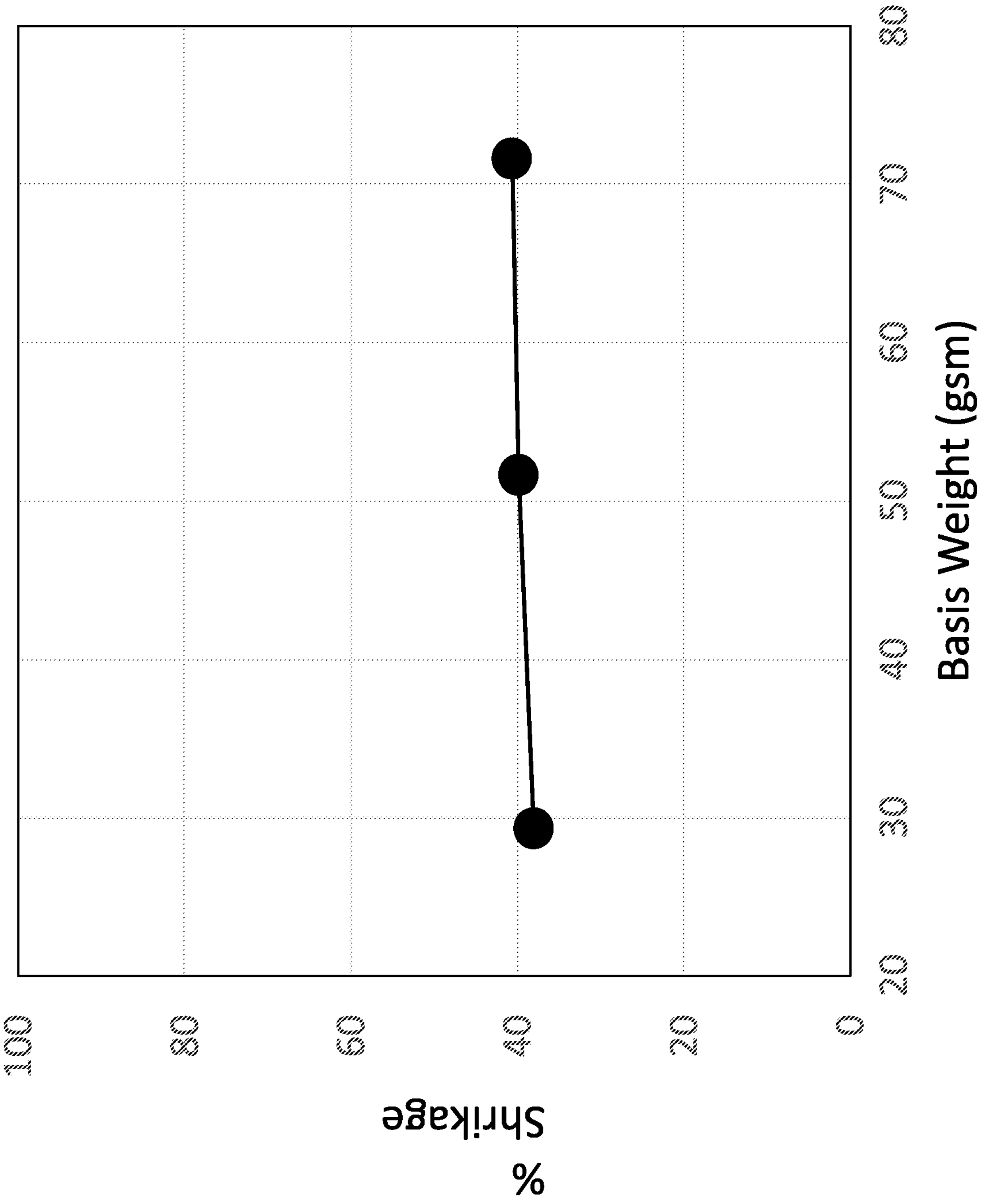
FIG. 20 shows shrinkage results (in a detergent formulation with 35% water at 20° C.) of example samples including at least one nonwoven layer having a plurality of fibers (Fiber F1) having different basis weight.

FIG. 20 shows shrinkage results of the Example Samples including at least one nonwoven layer having a plurality of fibers (Fiber F1 only) having different basis weight in a detergent formulation with 35% water at 20° C. As shown in FIG. 20, the shrinkage of the samples is independent of basis weight. This means that denser water-soluble nonwoven layers shrink at the same rate as thinner water-soluble nonwoven layers when the nonwoven layers have the same fiber content with the same bonding pattern. A same trend was observed for solubility of the samples.

Figure 21:
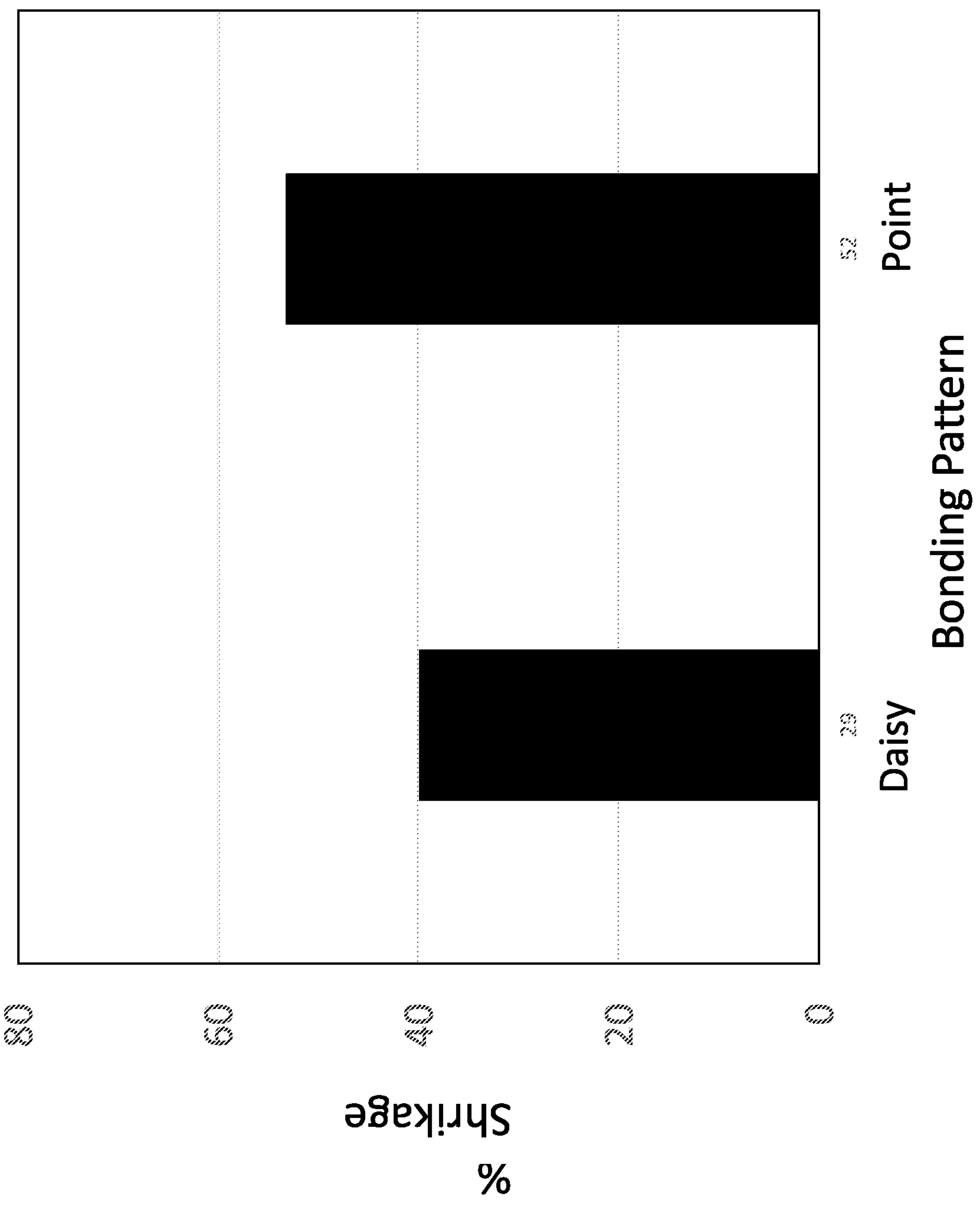
FIG. 21 shows shrinkage results (in a detergent formulation with 35% water at 20° C.) of example samples including at least one nonwoven layer having a plurality of fibers (Fiber F1) having a basis weight of 50 gsm with different bonding patterns, which include a point bonding pattern and a daisy bonding pattern with denser bonding points than the point bonding pattern.

FIG. 21 shows shrinkage results (in a detergent formulation with 35% water at 20° C.) of example samples including at least one nonwoven layer having a plurality of fibers (Fiber F1 only) having a basis weight of 50 gsm with different bonding patterns, which include a point bonding pattern and a daisy bonding pattern with denser boning points than the point bonding pattern. The point bonded nonwoven layers shrink 32.5% more than the daisy bonded nonwoven layers having the same composition under the same testing conditions. Daisy bonding is significantly denser than point bonding, resulting in a reduced surface area and less shrinkage in a detergent formulation. A similar trend was also observed for solubility of these samples.

Figure 22:
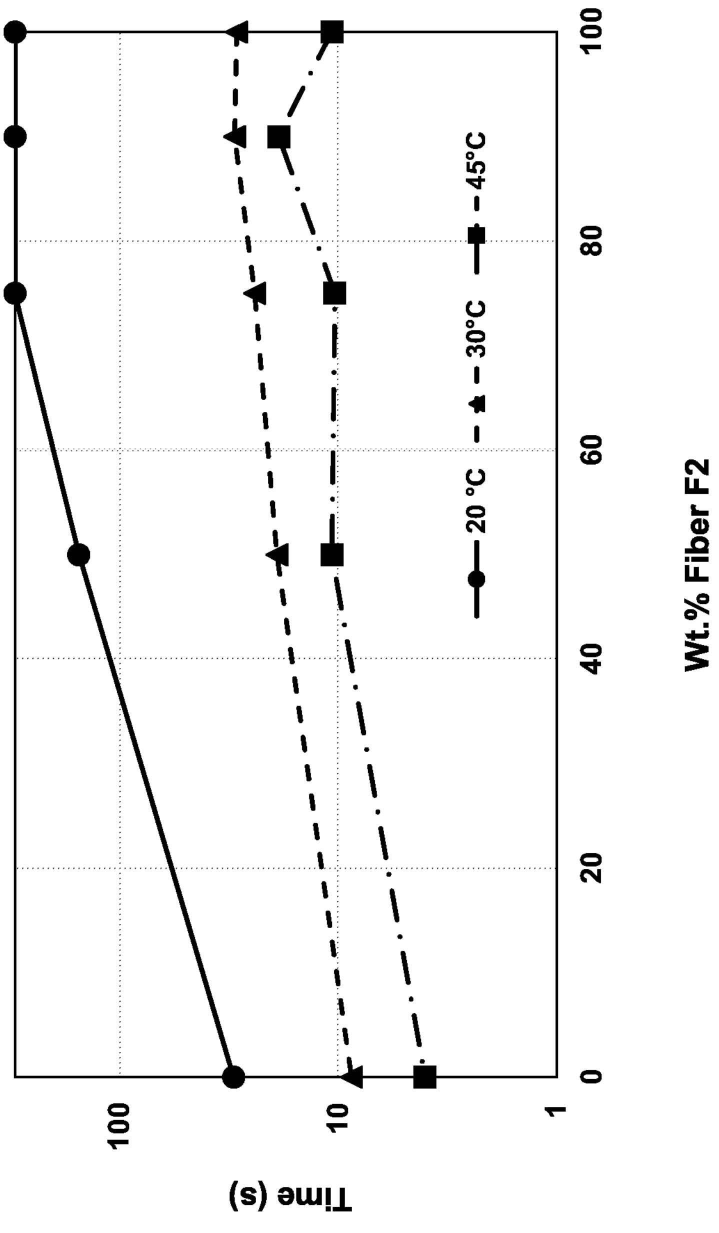
FIG. 22 shows disintegration time results (at 20° C., 35° C., 45° C.) for example samples including a core substrate comprising at least one nonwoven layer or sheet (50 gsm, point-bonded) having a plurality of fibers, which include a first type of fiber ("F, 1") comprising a polyvinyl alcohol copolymer having a degree of hydrolysis of 88% and a second type of fiber ("F2") comprising a polyvinyl alcohol copolymer having a degree of hydrolysis of 96%.
Figure 23:
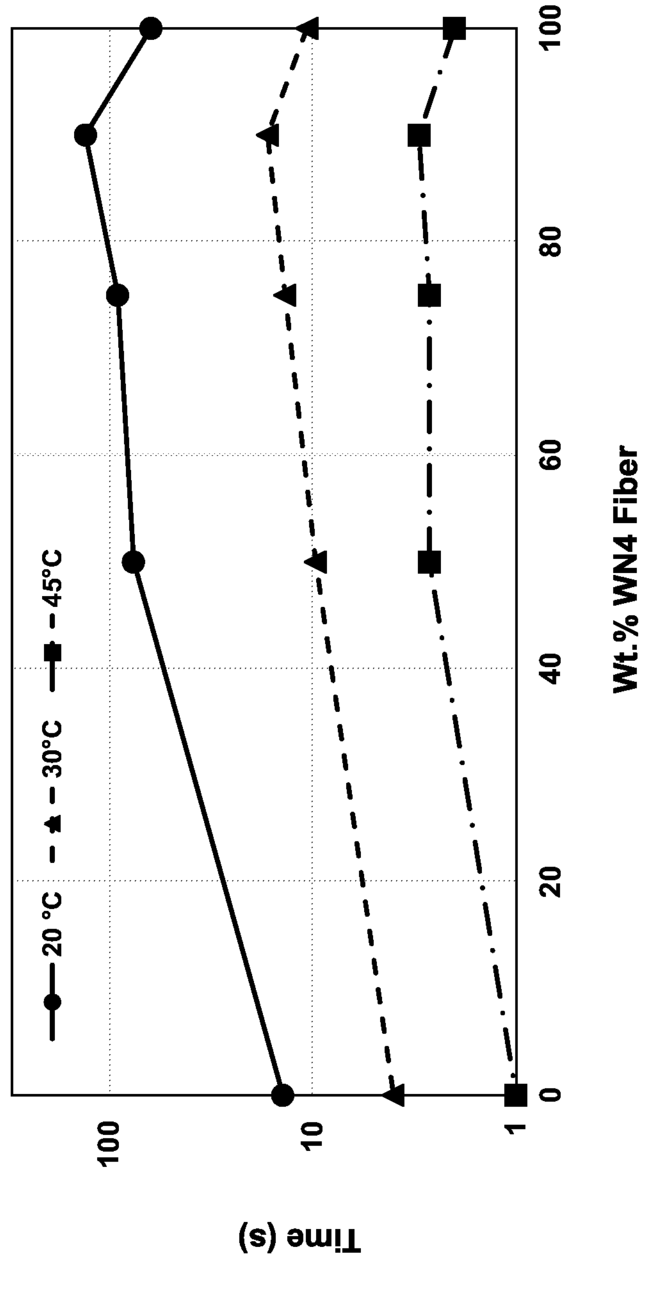
FIG. 23 shows rupture time results (at 20° C., 35° C., 45° C.) for the example samples as shown in FIG. 22.

FIG. 22 shows disintegration time results for the Experimental Samples including Ex. 1, Ex. 2, Ex. 3, Ex. 4, and Ex. 5 with point bonding patterns in water at 20° C., 35° C., and 45° C. FIG. 23 shows rupture time results of the same example samples at 20° C., 35° C., 45° C. Rupture time is defined as when a water-soluble nonwoven sample develops a hole in its structure. Disintegration time is when the water-soluble nonwoven sample fully breaks away from the side and dissolves. As shown in FIG. 22, the disintegration (solubility) time increases with the increase in the content of Fiber F2 in the F1 and F2 blended nonwovens. The solubility time decreases with increasing temperature. At 20° C., the samples with 75% or more of Fiber F2 do not disintegrate within the maximum testing time of five minutes.

Figure 24:
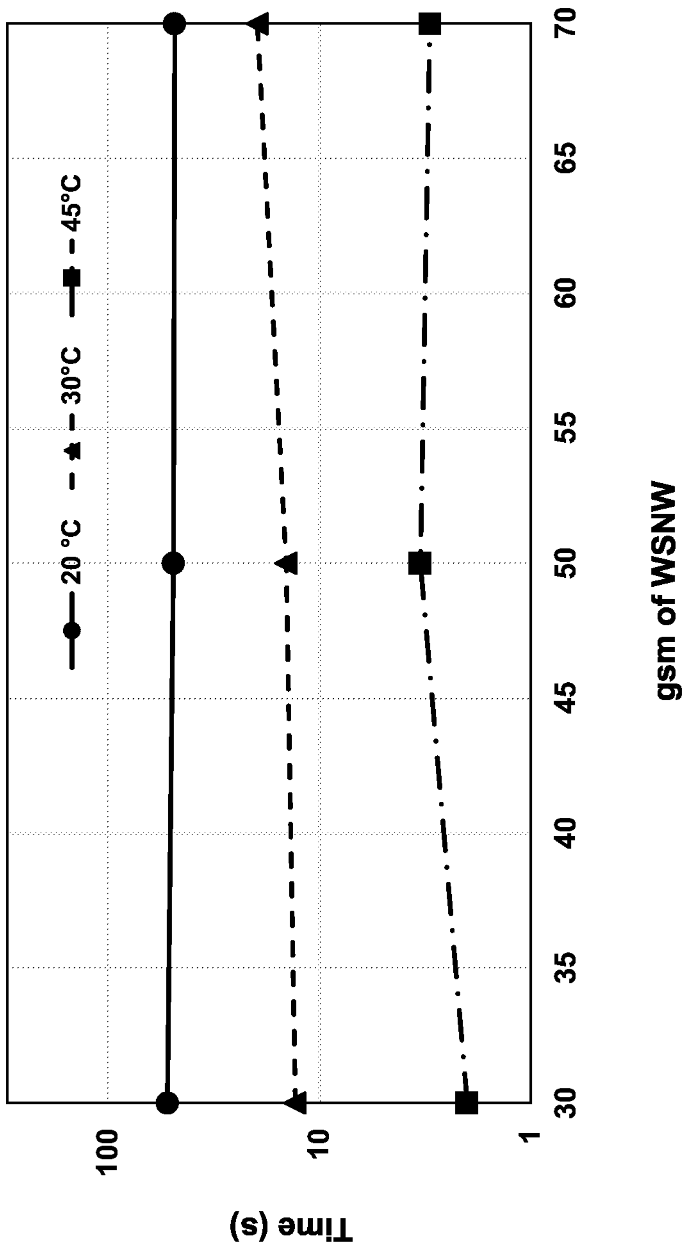
FIG. 24 shows disintegration time results (at 20° C., 35° C., 45° C.) for example samples including a core substrate comprising at least one nonwoven layer or sheet (daisy-bonded, with different basis weight) having a plurality of fibers, which include a first type of fiber ("F1") comprising a polyvinyl alcohol copolymer having a degree of hydrolysis of 88%.
Figure 25:
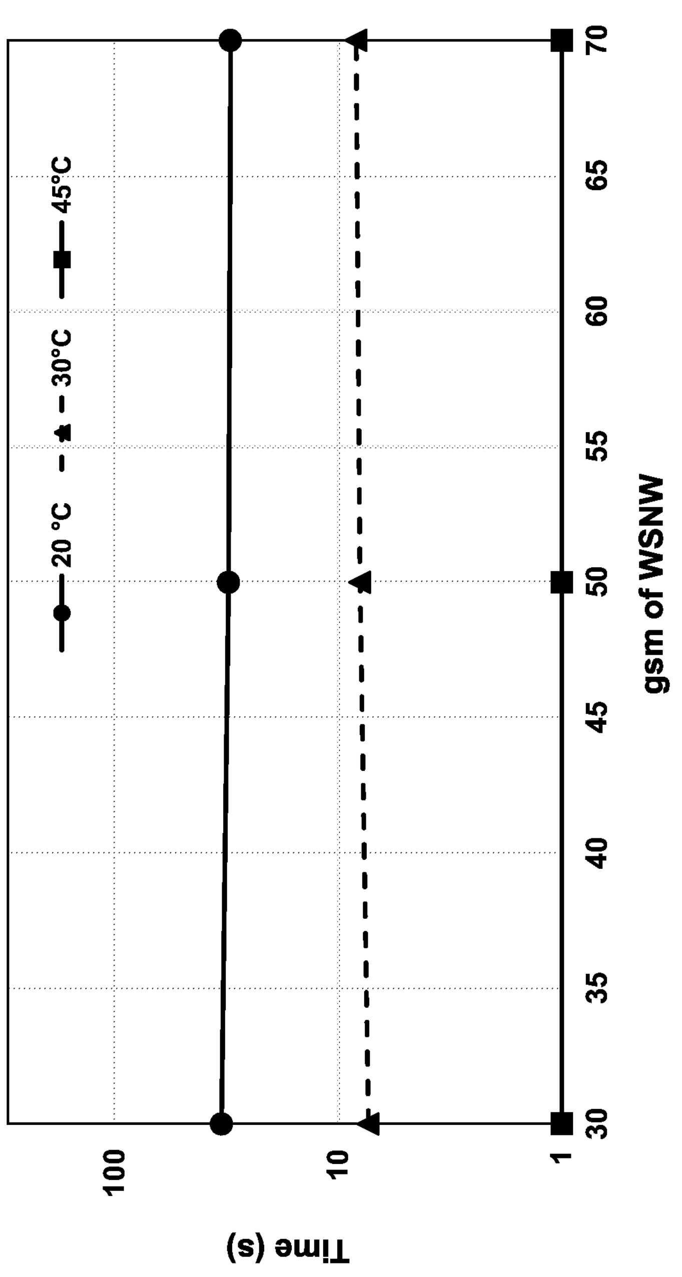
FIG. 25 shows rupture time results (at 20° C., 35° C., 45° C.) for the example samples as shown in FIG. 24.

FIG. 24 shows disintegration time results (at 20° C., 35° C., 45° C.) for example samples including a core substrate comprising at least one nonwoven layer or sheet (daisy-bonded, with different basis weight) having a plurality of fibers, which include a first type of fiber ("F1") comprising a polyvinyl alcohol copolymer having a degree of hydrolysis of 88%. FIG. 25 shows rupture time results for the same example samples at 20° C., 35° C., and 45° C. At 20° C., the samples with 75% or more of Fiber F2 do not disintegrate within the maximum testing time of five minutes. The solubility time decreases with increasing testing temperature. The solubility time is about 16 times lower than that at 20° C.

Figure 26:
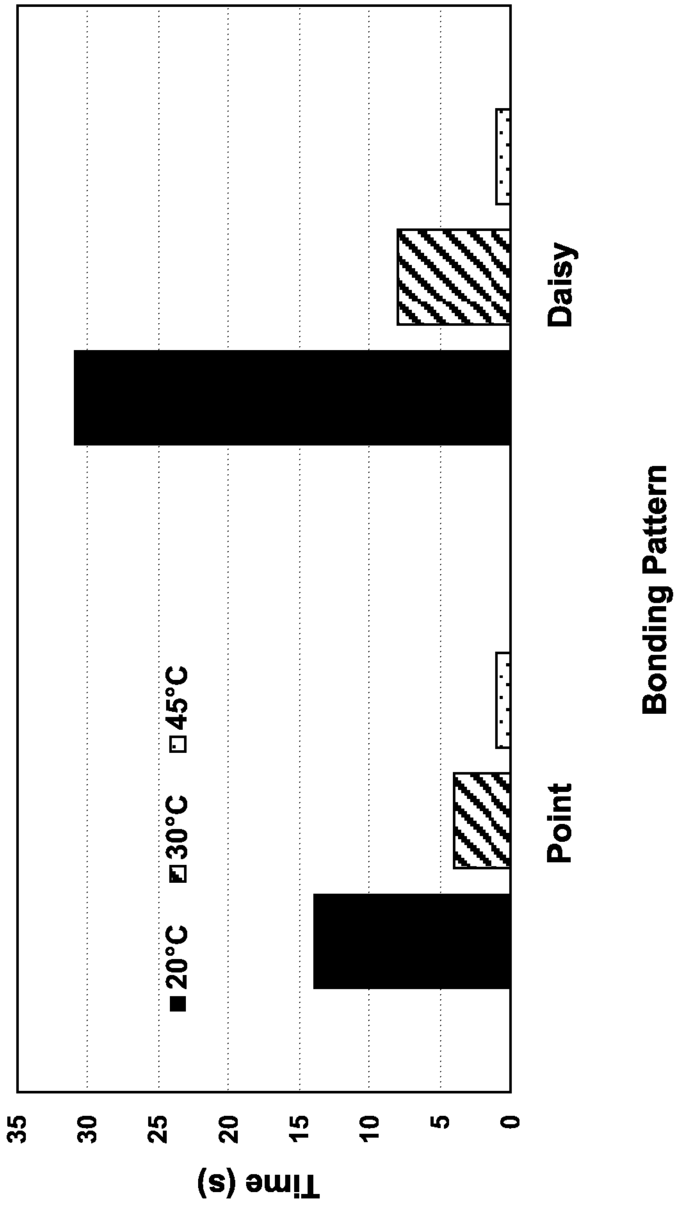
FIG. 26 shows rupture time results (in water at 20° C., 35° C., 45° C.) for example samples including at least one nonwoven layer having a plurality of fibers (Fiber F1) having a basis weight of 50 gsm with one of two different bonding patterns including a point bonding pattern and a daisy bonding pattern with denser boning points than the point bonding pattern.
Figure 27:
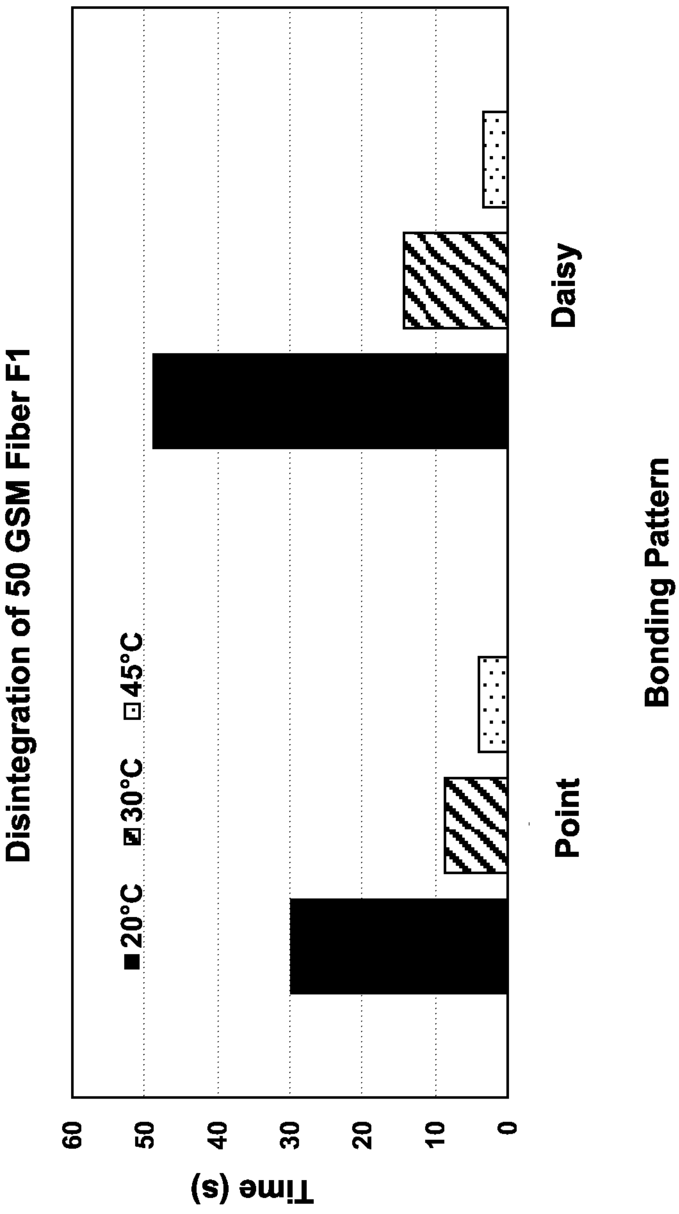
FIG. 27 shows disintegration time results (in water at 20° C., 35° C., 45° C.) for the example samples as shown in FIG. 26.

FIGS. 26 and 27 compare the results of the rupture time and the disintegration (solubility) time of the samples having the same composition but different bonding patterns in water at 20° C., 35° C., and 45° C. The example samples included one nonwoven layer having a plurality of fibers (Fiber F1 only) having a basis weight of 50 gsm. The two different bonding patterns included a point bonding pattern and a daisy bonding pattern, which has denser bonding points than the point bonding pattern. The nonwoven layer having point bonding dissolves much faster than the daisy bonded counterpart. For example, the solubility time of the daisy bonded sample nonwoven layer is 67% longer than that of the point bonded sample nonwoven layer at 20° C. Such a difference between the daisy and point bonded samples decreases with increasing temperature.

The following paragraphs describe further aspects of the disclosure:

1. A single unit dose article, comprising:

a water-soluble core substrate comprising a plurality of fibers including a water-soluble resin, the water-soluble core substrate containing a carrier solvent with an active cleaning formulation, wherein upon contact of the carrier solvent with at least one fiber of the plurality of fibers at a temperature in a range of 10° C. to 20° C. for a period of time of 5 minutes or longer, the core substrate exhibits a degree of shrinkage of 0.5% to 65%, and wherein the active cleaning formulation is disposed on or embedded in the water-soluble core substrate.

2. The single unit dose article according to clause 1, further comprising a water-soluble nonwoven material enclosing the water-soluble core substrate.

3. The single unit dose article according to clause 2, further comprising a water-soluble film enclosing the water-soluble nonwoven substrate.

4. The single unit dose article according to clause 3, wherein the water-soluble film is laminated to the water-soluble nonwoven material.

5. The single unit dose article according to clause 2, further comprising a bonding interface configured to create a seal to enclose the water-soluble core substrate.

6. The single unit dose article according to any of clauses 1-5, wherein the active cleaning formulation is in the form of at least one of the following: a solid, a gel, a liquid, a gel, or a slurry form.

7. The single unit dose article according to any of clauses 1-6, wherein the water-soluble core substrate is at least one of saturated with the active cleaning formulation, coated with the active cleaning formulation, or impregnated with the active cleaning formulation.

8. The single unit dose article according to any of clauses 1-7, wherein the active cleaning formulation is present in the water-soluble core substrate.

9. The single unit dose article according to any of clauses 1-8, wherein, when the water-soluble core substrate is contacted with water having a temperature of at least 10° C., the water-soluble core substrate is soluble according to MSTM-205 to release the active cleaning formulation.

10. The single unit dose article according to any of clauses 1-9, wherein, after contact with water having a temperature of at least 10° C. for not more than 300 seconds, the active cleaning formulation is substantially released from the water-soluble core substrate.

11. The single unit dose article according to any of clauses 1-10, wherein the resin is a polymer comprising a vinyl alcohol moiety.

12. The single unit dose article according to clause 11, wherein the polymer comprising a vinyl alcohol moiety includes a polyvinyl alcohol homopolymer, a polyvinyl alcohol copolymer, or a combination thereof.

13. The single unit dose article according to clause 12, wherein the polyvinyl alcohol copolymer is a copolymer of vinyl acetate and vinyl alcohol or an anionically modified copolymer.

14. The single unit dose article according to clause 13, wherein the anionically modified copolymer comprises a carboxylate, a sulfonate, or combinations thereof.

15. The single unit dose article according to any of clauses 11-14, wherein the plurality of fibers comprise a polyvinyl alcohol copolymer having a degree of hydrolysis in a range of about 75% to about 89%.

16. The single unit dose article according to any of clauses 11-14, wherein the plurality of fibers comprise two types of fibers comprising a polyvinyl alcohol copolymer having a degree of hydrolysis in a range of about 75% to about 89%, and the two types fibers have a difference in diameter, length, tenacity, shape, rigidness, elasticity, solubility, color, or a combination thereof.

17. The single unit dose article according to any of clauses 11-14, wherein the plurality of fibers comprise a first type of fiber comprising a polyvinyl alcohol copolymer having a degree of hydrolysis in a range of about 75% to about 89%, and a second type of fiber comprising a polyvinyl alcohol copolymer having a degree of hydrolysis in a range of about 90% to about 99.5%.

18. The single unit dose article according to clause 17, wherein a ratio of the first type of fiber to the second type of fiber is in a range of from about 1:99 to about 75:25 by weight.

19. The single unit dose article according to clause 17, wherein a ratio of the first type of fiber to the second type of fiber is in a range of from about 5:95 to about 50:50 by weight.

20. The single unit dose article according to any clauses 17-19, wherein the water-soluble core substrate comprises at least one nonwoven sheet including a mixture of the first type of fiber and the second type of fiber.

21. The single unit dose article according to any of clauses 17-19, wherein the water-soluble core substrate comprises a plurality of layers, the plurality of layers selected from a nonwoven sheet, a foam layer, a film, or any combination thereof.

The single unit dose article according to clause 21, wherein the plurality of layers includes separate sheets in a plied construction or a continuous sheet folded in a serpentine construction.

23. A single unit dose article, comprising:

a water-soluble nonwoven substrate comprising a plurality of fibers including a water-soluble resin, the water-soluble nonwoven substrate containing a carrier solvent with an active cleaning formulation, wherein upon contact of the carrier solvent with at least one fiber of the plurality of fibers at a temperature in a range of 10° C. to 20° C. for a period of time of 5 minutes or longer, the nonwoven substrate exhibits a degree of shrinkage of 0.5% to 65%, and wherein the active cleaning formulation is disposed on or embedded in the water-soluble core substrate.

24. The single unit dose article according to clause 23, further comprising a water-soluble nonwoven material enclosing the water-soluble nonwoven substrate.

25. The single unit dose article according to clause 24, further comprising a water-soluble film enclosing the water-soluble nonwoven substrate.

26. The single unit dose article according to clause 25, wherein the water-soluble film is laminated to the water-soluble nonwoven material.

27. The single unit dose article according to any of clauses 24-26, further comprising a bonding interface configured to create a seal to enclose the water-soluble nonwoven substrate.

28. The single unit dose article according to any of clauses 23-27, wherein the active cleaning formulation is in the form of at least one of the following: a solid, a gel, a liquid, or a slurry formulation.

29. The single unit dose article according to any of clauses 23-28, wherein the plurality of fibers is saturated with the active cleaning formulation.

30. The single unit dose article according to any of clauses 23-29, wherein the active cleaning formulation is embedded in the plurality of fibers.

31. The single unit dose article according to any of clauses 23-30, wherein the water-soluble nonwoven substrate includes a plurality of layers, and the active cleaning formulation is disposed between adjacent layers of the plurality of layers.

32. The single unit dose article according to clause 31, wherein the water-soluble nonwoven substrate is a continuous sheet of a water-soluble nonwoven web folded in a serpentine construction to form the plurality of layers.

33. The single unit dose article according to clause 31, wherein the water-soluble nonwoven substrate includes a plurality of separate substrate sheets in a plied construction.

34. The single unit dose article according to any of clauses 31-33, wherein the plurality of fibers is saturated with the active cleaning formulation.

35. The single unit dose article according to any of clauses 31-33, wherein the active cleaning formulation is embedded in the plurality of fibers.

36. The single unit dose article according to clause 32, wherein the active cleaning formulation is disposed on a surface of the water-soluble nonwoven substrate, and/or on a surface of the plurality of fibers.

37. The single unit dose article according to any of clauses 31-36, further comprising a water-soluble nonwoven material enclosing the water-soluble nonwoven substrate.

38. The single unit dose article according to any of clauses 23-37, further comprising a water-soluble nonwoven material defining an interior volume, wherein the active cleaning formulation is a liquid active cleaning formulation contained within the interior volume.

39. The single unit dose article according to any of clauses 23-38, wherein, when the water-soluble nonwoven substrate is contacted with water having a temperature of at least 10°

C., the water-soluble nonwoven substrate is soluble according to MSTM-205 to release the active cleaning formulation.

40. The single unit dose article according to clause 39, wherein, when the water-soluble nonwoven substrate is contacted with water having a temperature of at least 10° C. for not more than 300 seconds, the active cleaning formulation is substantially released from the water-soluble nonwoven substrate.

41. The single unit dose article according to any of clauses 23-40, wherein the water-soluble resin is a polyvinyl alcohol homopolymer, a polyvinyl alcohol copolymer, or a combination thereof.

42. The single unit dose article according to clause 41, wherein the polyvinyl alcohol copolymer is a copolymer of vinyl acetate and vinyl alcohol or an anionically modified copolymer of vinyl acetate and vinyl alcohol.

43. The single unit dose article according to clause 23, wherein the plurality of fibers comprise a first type of fiber comprising a polyvinyl alcohol copolymer having a degree of hydrolysis in a range of about 75% to about 89%, and a second type of fiber comprising a polyvinyl alcohol copolymer having a degree of hydrolysis in a range of about 90% to about 99.5%.

44. The single unit dose article according to clause 43, wherein a ratio of the first type of fiber to the second type of fiber is in a range of from about 1:99 to about 75:25 by weight.

45. A single unit dose article, comprising:

a first water-soluble nonwoven web comprising a first water-soluble resin and a second water-soluble nonwoven web comprising a second water-soluble resin; and a carrier solvent with an active cleaning formulation disposed between the first water-soluble nonwoven web and the second water-soluble nonwoven web, wherein, when at least one of the first water-soluble nonwoven web or the second water-soluble nonwoven web is contacted with water having a temperature greater than 10° C., the at least one of first water-soluble nonwoven web or the second water-soluble nonwoven web is soluble according to MSTM-205 to release the active cleaning formulation disposed between the first water-soluble nonwoven web and the second water-soluble nonwoven web.

46. The single unit dose article according to clause 45, wherein the first water-soluble nonwoven web comprises a plurality of fibers including the first water-soluble resin, wherein upon contact of the carrier solvent with at least one fiber of the plurality of fibers at 20° C. for a period of time of five minutes or longer, the first water-soluble nonwoven web exhibits a degree of shrinkage of 0.5% to 65%.

47. The single unit dose article according to any of clauses 45-46, wherein the active cleaning formulation is in the form of at least one of the following: a solid, a gel, a liquid, or a slurry form.

48. The single unit dose article according to any of clauses 45-47, further comprising a bonding interface configured to create a seal between the first water-soluble nonwoven web and the second water-soluble nonwoven web to define an interior volume and enclose the active cleaning formulation within the interior volume.

49. The single unit dose article according to any of clauses 45-48, further comprising a water-soluble film substrate disposed between the first water-soluble nonwoven web and the second water-soluble nonwoven web.

50. The single unit dose article according to clause 49, wherein the active cleaning formulation is embedded in the water-soluble film substrate.

51. The single unit dose article according to any of clauses 49-50, wherein the active cleaning formulation is disposed on a surface of the water-soluble film substrate.

52. The single unit dose article according to any of clauses 45-51, wherein, when the at least one of the first water-soluble nonwoven web or the second water-soluble nonwoven web is contacted with water having a temperature of at least 10° C. for not more than 300 seconds, the active cleaning formulation is substantially released from between the first water-soluble nonwoven web and the second water-soluble nonwoven web.

53. A single unit dose article, comprising:

a water-soluble material comprising a plurality of fibers including a water-soluble resin, the water-soluble material bonded at a bonding interface along an edge of the water-soluble material to define an interior volume of the single unit dose article; and a carrier solvent with an active cleaning formulation disposed in the interior volume, wherein, when the water-soluble material is contacted with water having a temperature greater than 10° C., the water-soluble material is soluble according to MSTM-205 to release the active cleaning formulation from the interior volume.

54. The single unit dose article according to clause 53, wherein upon contact of the carrier solvent with at least one fiber of the plurality of fibers, the at least one fiber exhibits a degree of shrinkage of 0.5% to 65%.

55. The single unit dose article according to any of clauses 53-54, wherein the water-soluble material comprises one of a water-soluble nonwoven web, a water-soluble foam material or a water-soluble film material.

56. The single unit dose article according to any of clauses 53-55, wherein the active cleaning formulation is in the form of at least one of the following: a solid, a gel, a liquid, or a slurry form.

57. The single unit dose article according to any of clauses 53-56, wherein the water-soluble material has a first surface facing the interior volume and an opposing second surface, the single unit dose article further comprising a water-soluble film disposed on the first surface.

58. The single unit dose article according to any of clauses 53-57, wherein the water-soluble material includes a water-soluble composite material comprising a water-soluble film material made of a first water-soluble resin coupled to one of a water-soluble nonwoven material or a water-soluble foam material made of a second water-soluble resin.

59. The single unit dose article according to any of clauses 53-58, wherein the water-soluble resin is a polyvinyl alcohol homopolymer, a polyvinyl alcohol copolymer, or a combination thereof.

60. The single unit dose article according to clause 59, wherein the polyvinyl alcohol copolymer is a copolymer of vinyl acetate and vinyl alcohol or an anionically modified copolymer of vinyl acetate and vinyl alcohol.

61. The single unit dose article according to any of clauses 53-60, wherein the plurality of fibers comprise a first type of fiber comprising a polyvinyl alcohol copolymer having a degree of hydrolysis in a range of about 75% to about 89%, and a second type of fiber comprising a polyvinyl alcohol copolymer having a degree of hydrolysis in a range of about 90% to about 99.5%.

62. The single unit dose article according to clause 61, wherein a ratio of the first type of fiber to the second type of fiber is in a range of from about 1:99 to about 75:25 by weight.

63. A method for making a single unit dose article containing a carrier solvent with an active cleaning formulation, the method comprising:

forming a water-soluble core substrate comprising a plurality of fibers including a water-soluble resin, the water-soluble core substrate containing a carrier solvent with an active cleaning formulation, wherein upon contact of the carrier solvent with at least one fiber of the plurality of fibers at a temperature in a range from 10° C. to 20° C. for five minutes or longer, the water-soluble core substrate exhibits a degree of shrinkage of 0.5% to 65%;

forming an outer water-soluble material comprising at least one of a water-soluble nonwoven material, a water-soluble foam material, a water-soluble film material, or a composite material thereof, into an open pouch defining an interior volume configured to contain the water-soluble core substrate and the carrier solvent with the active cleaning formulation;

introducing the water-soluble core substrate and the carrier solvent with the active cleaning formulation into the interior volume; and sealing the outer water-soluble material to enclose the interior volume.

64. The method according to clause 63, wherein forming a water-soluble core substrate comprising a plurality of fibers including a water-soluble resin comprises forming one of a water-soluble nonwoven substrate, a water-soluble foam substrate, or a water-soluble film substrate.

65. The method according to any of clauses 63-64, wherein forming a water-soluble core substrate comprising a plurality of fibers including a water-soluble resin comprises at least one of saturating the water-soluble core substrate with the active cleaning formulation, disposing the active cleaning formulation on a surface of the water-soluble core substrate, coating a surface of the water-soluble core substrate with the active cleaning formulation, embedding the active cleaning formulation in the water-soluble core substrate, or impregnating the water-soluble core substrate with the active cleaning formulation.

66. The method according to any of clauses 63-65, wherein sealing the outer water-soluble material comprises forming a seal at a bonding interface to enclose the water-soluble core substrate and the carrier solvent with the active cleaning formulation in the interior volume.

67. The method according to any of clauses 63-66, wherein forming a water-soluble core substrate comprising a plurality of fibers including a water-soluble resin comprises forming a water-soluble nonwoven substrate into a plurality of layers, with the carrier solvent and the active cleaning formulation disposed between adjacent layers of the plurality of layers.

68. The method according to clause 67, wherein forming a water-soluble nonwoven-substrate into a plurality of layers comprises folding a continuous sheet of a water-soluble nonwoven web in a serpentine construction to form the plurality of layers.

69. The method according to clause 67, wherein forming a water-soluble nonwoven substrate into a plurality of layers comprises stacking a plurality of separate substrate sheets in a plied construction.

70. The method according to clause 67, further comprising applying the carrier solvent comprising glycerol with the active cleaning formulation to a surface of the water-soluble nonwoven substrate to a maximum coat weight of 120 gsm for the carrier solvent with the active cleaning formulation.

71. The method according to clause 70, wherein the carrier solvent comprising glycerol with the active cleaning formulation is applied to the surface of the water-soluble nonwoven substrate until the single unit dose article comprises 55% by weight of the active cleaning formulation.

72. The method according to clause 71, further comprising forming the water-soluble nonwoven substrate into 25 layers to 110 layers.

73. The method according to any of clauses 63-72, wherein the water-soluble resin is a polyvinyl alcohol homopolymer, a polyvinyl alcohol copolymer, or a combination thereof.

74. A single unit dose article, comprising:

a water-soluble core substrate comprising a plurality of fibers including a water-soluble resin, the water-soluble core substrate containing an active cleaning formulation; and a water-soluble nonwoven material enclosing the water-soluble core substrate, wherein the active cleaning formulation is disposed on or embedded in the water-soluble core substrate.

75. The single unit dose article according to clause 74, further comprising a water-soluble film laminated on and enclosing the water-soluble nonwoven substrate.

76. The single unit dose article according to any of clauses 74-75, wherein the water-soluble core substrate further comprises a carrier solvent including the active cleaning formulation.

The single unit dose article according to any of clause 74-76 may further include any of the features described in any of clauses 1-73.

All percentages, parts and ratios referred to herein are based upon the total dry weight of the fiber composition, film composition, or total weight of the packaging material composition of the present disclosure, as the case may be, and all measurements made are at about 25° C., unless otherwise specified. All percentages, parts and ratios referred to herein for liquid formulations are based upon the total weight of the liquid formulation. All such weights as they pertain to listed ingredients are based on the active level and therefore do not include carriers or by-products that may be included in commercially available materials, unless otherwise specified.

All ranges set forth herein include all possible subsets of ranges and any combinations of such subset ranges. By default, ranges are inclusive of the stated endpoints, unless stated otherwise. Where a range of values is provided, it is understood that each intervening value between the upper and lower limit of that range and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also contemplated to be part of the disclosure.

It is expressly contemplated that for any number value described herein, e.g., as a parameter of the subject matter described or part of a range associated with the subject matter described, an alternative which forms part of the description is a functionally equivalent range surrounding the specific numerical value (e.g., for a dimension disclosed as “40 millimeters (mm)” an alternative embodiment contemplated is “about 40 mm”).

Reference throughout this specification to “example embodiment” or “an embodiment” may mean that a particular feature, structure, or characteristic described in connection with a particular embodiment may be included in at least one embodiment of claimed subject matter. Thus, appearances of the phrase "example embodiments" or "an example embodiment" in various places throughout this specification is not necessarily intended to refer to the same embodiment or to any one particular embodiment described. Further, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter is not limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

What is claimed is:

1. A single unit dose article, comprising:

a water-soluble material comprising a plurality of fibers including a water-soluble resin, the water-soluble material bonded at a bonding interface along an edge of the water-soluble material to define an interior volume of the single unit dose article; and a single layer of a water-soluble film substrate and carrier solvent with an active cleaning formulation in a solid phase adhered, adsorbed or bound to a surface of the water-soluble film substrate and disposed in the interior volume, wherein, when the water-soluble material is contacted with water having a temperature greater than 10° C., the water-soluble material is soluble according to MSTM-205 to release the active cleaning formulation from the interior volume.

2. The single unit dose article according to claim 1, wherein upon contact of the carrier solvent with at least one fiber of the plurality of fibers, the at least one fiber exhibits a degree of shrinkage of 0.5% to 65%.

3. The single unit dose article according to claim 1, wherein the water-soluble material comprises a water-soluble nonwoven web.

4. The single unit dose article according to claim 1, wherein the active cleaning formulation in a solid phase is in the form of powder or granules.

5. The single unit dose article according to claim 1, wherein the water-soluble material has a first surface facing the interior volume and an opposing second surface, the single unit dose article further comprising a water-soluble film disposed on the first surface.

6. The single unit dose article according to claim 1, wherein the water-soluble material includes a water-soluble composite material comprising a water-soluble film material made of a first water-soluble resin coupled to one of a water-soluble nonwoven material or a water-soluble foam material made of a second water-soluble resin.

7. The single unit dose article according to claim 1, wherein the water-soluble resin is a polyvinyl alcohol homopolymer, a polyvinyl alcohol copolymer, or a combination thereof.

8. The single unit dose article according to claim 7, wherein the polyvinyl alcohol copolymer is a copolymer of vinyl acetate and vinyl alcohol or an anionically modified copolymer of vinyl acetate and vinyl alcohol.

9. The single unit dose article according to claim 1, wherein the plurality of fibers comprise a first type of fiber comprising a polyvinyl alcohol copolymer having a degree of hydrolysis in a range of about 75% to about 89%, and a second type of fiber comprising a polyvinyl alcohol copolymer having a degree of hydrolysis in a range of about 90% to about 99.5%.

10. The single unit dose article according to claim 9, wherein a ratio of the first type of fiber to the second type of fiber is in a range of from about I: 99 to about 75:25 by weight.

* * * * *